US011157463B2

(12) United States Patent
Barabas et al.

(10) Patent No.: US 11,157,463 B2
(45) Date of Patent: Oct. 26, 2021

(54) UNDERSTANDING DATA IN DATA SETS

(71) Applicant: Miosoft Corporation, Madison, WI (US)

(72) Inventors: Albert B. Barabas, Fitchburg, WI (US); Mark D. A. van Gulik, Madison, WI (US); Terry Raymond, Tiverton, RI (US); Ernst M. Siepmann, Pembroke Pines, FL (US)

(73) Assignee: Miosoft Corporation, Madison, WI (US)

( * ) Notice: Subject to any disclaimer, the term of this patent is extended or adjusted under 35 U.S.C. 154(b) by 918 days.

(21) Appl. No.: 14/789,216

(22) Filed: Jul. 1, 2015

(65) Prior Publication Data

US 2015/0302032 A1    Oct. 22, 2015

Related U.S. Application Data

(63) Continuation of application No. 12/542,969, filed on Aug. 18, 2009, now Pat. No. 9,092,411.

(51) Int. Cl.
*G06F 16/21* (2019.01)
*G06F 16/28* (2019.01)
*G06F 40/18* (2020.01)
*G06F 40/177* (2020.01)
*G06F 16/16* (2019.01)

(52) U.S. Cl.
CPC .......... *G06F 16/21* (2019.01); *G06F 16/289* (2019.01); *G06F 40/177* (2020.01); *G06F 40/18* (2020.01); *G06F 16/16* (2019.01)

(58) Field of Classification Search
CPC ............................. G06F 16/21; G06F 16/289
See application file for complete search history.

(56) References Cited

U.S. PATENT DOCUMENTS

| 5,047,959 A | * | 9/1991 | Phillips | G06F 3/023 715/853 |
| 6,037,938 A | | 3/2000 | Wolké | |

(Continued)

FOREIGN PATENT DOCUMENTS

| CN | 101278279 A | 10/2008 |
| CN | 102612681 A | 7/2012 |

(Continued)

OTHER PUBLICATIONS

Response to Office Action with English translation in Chinese App. Ser. No. 201510438086.0, filed Apr. 10, 2018 (100 pages).

(Continued)

*Primary Examiner* — Eliyah S. Harper
(74) *Attorney, Agent, or Firm* — Fish & Richardson P.C.

(57) ABSTRACT

Among other things, there are two or more data sets. Each of the data sets contains data that can be interpreted as records each having data values for data fields. Each of the data sets contains at least some data that is related to data in at least one of the other data sets. The data in different data sets is organized or expressed possibly differently. Each of the data sets is susceptible to a definition of a key for the records of the data set. The data sets are characterized by repetitions of at least one of (a) records, (b) portions of keys, or (c) instances of values for data fields. Information about at least one of the repetitions is provided to a user.

42 Claims, 49 Drawing Sheets

(56) References Cited

U.S. PATENT DOCUMENTS

Figure 1:
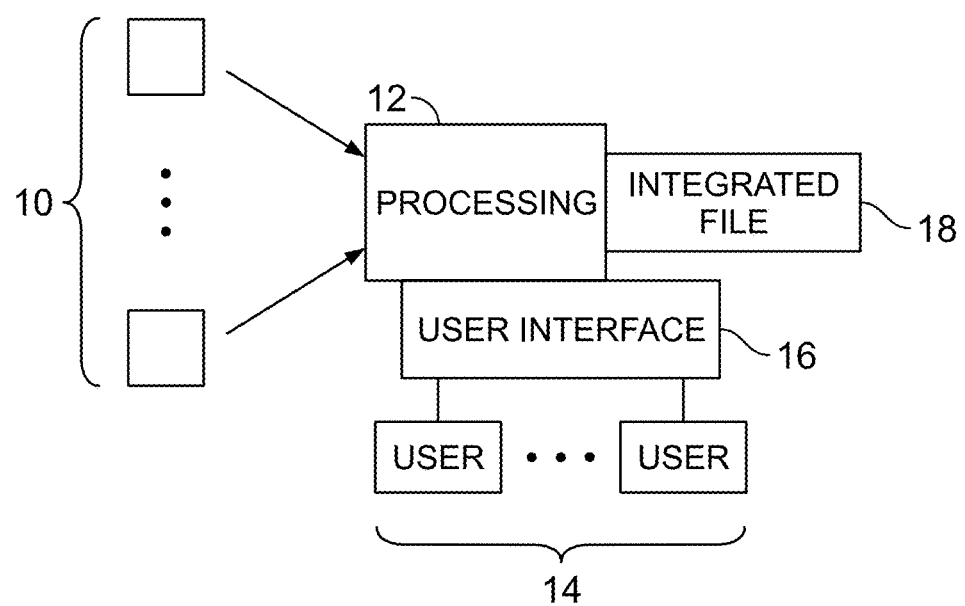

| | | | |
|---|---|---|---|
| 6,236,986 B1 | 5/2001 | Gestrelius et al. | |
| 7,117,207 B1* | 10/2006 | Kerschberg | G06F 16/337 |
| 7,216,132 B1 | 5/2007 | Flam | |
| 7,310,635 B2 | 12/2007 | Tucker | |
| 7,461,077 B1* | 12/2008 | Greenwood | G06F 3/0482 |
| 7,512,610 B1 | 3/2009 | Barabas et al. | |
| 7,783,655 B2 | 8/2010 | Barabas et al. | |
| 9,092,411 B2 | 7/2015 | Barabas et al. | |
| 2002/0078012 A1* | 6/2002 | Ryan | G06Q 10/06 |
| 2002/0107841 A1* | 8/2002 | Hellerstein | G06K 9/62 |
| 2003/0014391 A1 | 1/2003 | Evans et al. | |
| 2006/0026199 A1 | 2/2006 | Crea | |
| 2006/0089924 A1* | 4/2006 | Raskutti | G06F 16/355 |
| 2008/0033960 A1 | 2/2008 | Banks et al. | |
| 2009/0063557 A1* | 3/2009 | MacPherson | G06N 5/02 |
| 2009/0132234 A1* | 5/2009 | Weikel | G06F 40/45 704/3 |
| 2010/0010960 A1* | 1/2010 | Singh | G06F 16/2456 707/E17.005 |
| 2011/0047186 A1 | 2/2011 | Barabas et al. | |

FOREIGN PATENT DOCUMENTS

| | | |
|---|---|---|
| CN | 105095169 A | 11/2015 |
| WO | WO 2011/022446 | 2/2011 |

OTHER PUBLICATIONS

Office Action with English translation in Chinese App. Ser. No. 201510438086.0, dated Aug. 13, 2018 (7pages).
Response to Office Action with English translation in Chinese App. Ser. No. 201510438086.0, filed Sep. 14, 2018, 2018 (15 pages).
Voluntary Amendment with English translation filed in Chinese App. Ser. No. 201080036870.4 dated Dec. 14, 2012 (19 pages).
Office Action in Chinese App. Ser. No. 201080036870.4, dated Apr. 18, 2014 (13 pages).
Response to Office Action with English translation in Chinese App. Ser. No. 201080036870.4, dated Jun. 18, 2014 (29 pages).
Office Action in Chinese App. Ser. No. 201080036870.4, dated Sep. 19, 2014 (14 pages).
Response to Office Action with English translation in Chinese App. Ser. No. 201080036870.4, dated Dec. 5, 2014 (16 pages).
Voluntary Amendment with English translation filed in Chinese App. Ser. No. 201510438086.0 dated Mar. 17, 2016 (37 pages).
Office Action with English translation in Chinese App. Ser. No. 201510438086.0, dated Jun. 28, 2017 (16 pages).
Response to Office Action with English translation in Chinese App. Ser. No. 201510438086.0, dated Sep. 21, 2017 (27 pages).
Office Action with English translation in Chinese App. Ser. No. 201510438086.0, dated Jan. 26, 2018 (14 pages).
European Supplemental Search Report from European App. 10810522.2 dated Oct. 23, 2017 (4 pages).
European Communication from European App. 10810522.2 dated Nov. 15, 2017 (7 pages).
Transaction history from PAIR of U.S. Appl. No. 12/542,969, filed Aug. 18, 2009.
Business Data Tool™ Overview from MioSoft Corporation of Madison, Wisconsin [online], [retrieved on Feb. 8, 2010]. Retrieved from the Internet: http://www.miosoft.com/index.php?id=27.
MioSoft® Business Data Tool™ User Guide, Version 9.3, MioSoft Corporation, Madison, Wisconsin, 318 pp. (2009).
International Search Report for App. Ser. No. PCT/US10/045823, dated Oct. 8, 2010, 12 pages.
International Preliminary Report on Patentability for App. Ser. No. PCT/US10/045823, dated Feb. 21, 2012, 7 pages.
U.S. Appl. No. 11/241,571, filed Sep. 30, 2005—U.S. Pat. No. 7,512,610, Mar. 31, 2009, U.S. Pat. No. 7,512,610 cited on Jul. 1, 2015, U.S. Pat. No. 7,512,610, cited on Jul. 1, 2015.
U.S. Appl. No. 12/413,751, filed Mar. 30, 2009, Issued U.S. Pat. No. 7,783,655, Aug. 24, 2010, U.S. Pat. No. 7,783,655, cited on Jul. 1, 2015, U.S. Pat. No. 7,783,655 cited on Jul. 1, 2015.
U.S. Appl. No. 12/542,969, filed Aug. 18, 2009—U.S. Pat. No. 9,092,411, Jul. 28, 2015, U.S. Pat. No. 9,092,411 cited on 1449 form, U.S. Pat. no. 9,092,411 cited on 1449 form.

* cited by examiner

|  | ▸ | fx | 69.102 | | | |
|---|---|---|---|---|---|---|
| A1 | | | | | | |
| | A | B | C | D | E | F |
| 1 | 69.102 | Data Migrator | | | | |
| 2 | 69.208 | Configurable Parser | | | | |
| 3 | 95.105 | Viewer and Analyzer | | | | |
| 4 | 95.106 | Business Intelligence Creator | | | | |
| 5 | 95.204 | Context Server | | | | |
| 6 | 95.202 | Business Data Tools Workshops 1 | | | | |
| 7 | 95.402 | Business Data Tools Workshops 2 | | | | |
| 8 | | | | | | |
| 9 | | | | | | |
| 10 | | | | | | |

FIG. 3

| | A | B | C | D | E | f |
|---|---|---|---|---|---|---|
| 1 | 103327885 | ZABRINA | WIECKS | 10300 W BLUEMOUND RD APT 310|TURING|UTAH~10300 W BLUEMOUND RD APT 310|TURING|UTAH|69.208 | b | 4 |
| 2 | 103327885 | ZABRINA | WIECKS | 10300 W BLUEMOUND RD APT 310|TURING|UTAH~10300 W BLUEMOUND RD APT 310|TURING|UTAH|95.106 | a | 3 |
| 3 | 106048507 | CONN | SECREASE | 6522 MAYBERRY RD|TURING|UTAH~5697 N HANSON ST|SOUTH MILWAUKEE|DELAWARE|95.204 | b | 2.5 |
| 4 | 112359804 | DANNIELL | STEFFERUD | 614 RUSK ST|TURING|UTAH~W3162 650TH AVE|LACONA|ILLINOIS|95.106 | a | 2.5 |
| 5 | 118623511 | REGINA | TOPALOVIC | 3859 E WHITTAKER AVE|TURING|UTAH~411 ROGERS ST APT 1|BIRNAMWOOD|NEW YORK|69.102 | a | 4 |
| 6 | 125053428 | ROD | THEIS | 5153 N 76TH ST|TURING|UTAH~34 230TH ST|FORESTVILLE|VERMONT|69.102 | a | 4 |
| 7 | 125070889 | GAIGE | ZIEBLER | W2249 OAK FOREST LN|TURING|UTAH~4 AND 1 HALF E FULTON APT 1|NEKOOSA|NEBRASKA|69.102 | a | 1.5 |
| 8 | 125070889 | GAIGE | ZIEBLER | W2249 OAK FOREST LN|TURING|UTAH~4 AND 1 HALF E FULTON APT 1|NEKOOSA|NEBRASKA|69.208 | b | 4 |
| 9 | 128857509 | JOSEPHIT | LILLROSE | 3054 CANAL RD|TURING|UTAH~W287 CTY HIGHWAY HW|AUNAKEE|SOUTH CAROLINA|95.105 | a | 3.5 |
| 10 | 143017784 | KENAN | METKOWSKI | 1807 STONEBRIDGE RD APT 101|TURING|UTAH~1807 STONEBRIDGE RD APT 101|TURING|UTAH|95.204 | a | 3 |
| 11 | 149685290 | CARLEE | SUREE | 328 ANTOINE DR|TURING|UTAH~512 VINE ST APT 2|HAMBURG|ARIZONA|95.204 | a | 2 |
| 12 | 158828479 | KEENON | MATALIK | 8895 STATE HIGHWAY 32|TURING|UTAH~2206 JACKSON ST|OGDENSBURG|IDAHO|69.208 | a | 2 |
| 13 | 170007404 | TODARO | LORFILS | W367 S2680 MILL POND RD|TURING|UTAH~2313 S WALDEN AVE|ANKENY|DELAWARE|95.204 | b | 2.5 |
| 14 | 172785691 | YVONNE | IBBETSON | N1862 HWY 49|TURING|UTAH~3622 CRESCENT VIEW AVE|FERRYVILLE|ILLINOIS|69.102 | b | 2.5 |
| 15 | 173097990 | LILY | CROMP | 1624 KEARNEY AVE|TURING|UTAH~1201 W WINNEBAGO ST|KEYSTONE|WYOMING|95.204 | a | 2 |
| 16 | 184060019 | KIRSTY | WHIRR | W7037 135TH AVE|TURING|UTAH~845 N KNOWLES AVE|ANKENY|NORTH DAKOTA|69.102 | a | 2 |
| 17 | 184060019 | KIRSTY | WHIRR | W7037 135TH AVE|TURING|UTAH~845 N KNOWLES AVE|ANKENY|NORTH DAKOTA|69.208 | b | 3.5 |
| 18 | 186111196 | SAMANTH | CHAY | 5375 N 34TH ST|TURING|UTAH~830 HARDING ST APT 208|GRANTON|WYOMING|95.204 | a | 3.5 |
| 19 | 191402327 | DARIAS | MILKOWSKA | 9707 W NATIONAL AVE|TURING|UTAH~2268 COBBLESTONE LN|CYLINDER|NORTH CAROLINA|95.105 | a | 2.5 |
| 20 | 191402327 | DARIAS | MILKOWSKA | 9707 W NATIONAL AVE|TURING|UTAH~2268 COBBLESTONE LN|CYLINDER|NORTH CAROLINA|95.204 | a | 1.5 |
| 21 | 191497373 | NICOLLET | DIBLIK | 430 STRATFORD AVE|TURING|UTAH~111 N HAMILTON ST APT 204|GLENFLORA|MARYLAND|95.204 | a | 2 |
| 22 | 194455834 | LINDSEY | GALIONE | 3013 15TH ST ST|TURING|UTAH~1215 DOUGLAS AVE|PILOTMOUND|INDIANA|95.204 | b | 3 |
| 23 | 213081528 | SHMUEL | TIMION | 6220 14TH AVE|TURING|UTAH~301 ROYCE HALL|LAPORTECITY|MASSACHUSETTS|95.204 | a | 3.5 |
| 24 | 215763057 | RANDELL | TURBERT | 21 FERRY LN|TURING|UTAH~1223 N 26TH ST|DUNCOMBE|ALABAMA|95.204 | a | 2 |
| 25 | 232790124 | MABELLE | OTHMER | 504 MONROE ST|TURING|UTAH~3246 WINDLAND DR|NORTHHUDSON|INDIANA|95.204 | a | 4 |
| 26 | 233087455 | STANLY | PARFIJEWICZ | 235 WINNEBAGO DR APT 215|TURING|UTAH~235 WINNEBAGO DR APT 215|TURING|UTAH|95.204 | a | 4 |
| 27 | 242411141 | LATEISHA | ADITYA | W6346 STATE HIGHWAY 95|TURING|UTAH~2847 WOODALE AVE|BEAMAN|SOUTH DAKOTA|95.204 | a | 3 |
| 28 | 261754166 | RACHEL | SOULARD | 501 1/2 N 4TH ST APT 4|TURING|UTAH~111 W DIVISION ST BOX 1045|KENT|HAWAII|69.102 | a | 3.5 |
| 29 | 282388092 | GINGER | REYESCASTRO | 5735 TUDOR DR|TURING|UTAH~1961 75TH AVE|TONY|VIRGINIA|69.102 | a | 2 |
| 30 | 282388092 | GINGER | REYESCASTRO | 5735 TUDOR DR|TURING|UTAH~1961 75TH AVE|TONY|VIRGINIA|69.208 | a | 3.5 |

| | | | | | | | |
|---|---|---|---|---|---|---|---|
| 0 rows | | | | Key: C8,C9,C1 = B1,B2 | | Data file... | Make list... |
| | | ☐ Regex ☑ A=a ☐ Not ☑ In | | → ← Mark Unmark Invert Filter Unfilter | | | |
| ecord] [repeat *] | | | | | | | |
| C4^AAA to "" ⏜ 119 | | | | | | | |
| to "" ⏜ 117 | | | | | | | |
| eat *] | 126 | | | | | | |
| C5 City to "" | C6 State ...end | C7 ...end | C8 Course Number ...end | C9 Course Letter to "R , | C10 Grade ...end | | |
| ((TURING|TURING)))) | (((UTAH|UTAH)))) | ((()) | ((69.208)) | ((b)) | ((4)) | | |
| ((TURING|TURING)))) | (((UTAH|UTAH)))) | ((()) | ((95.106)) | ((a)) | ((3)) | | |
| ((TURING|SOUTHMILWAUKEE)))) | (((UTAH|DELAWARE)))) | ((()) | ((95.204)) | ((b)) | ((2.5)) | | |
| ((TURING|LACONA)))) | (((UTAH|ILLINOIS)))) | ((()) | ((95.106)) | ((a)) | ((2.5)) | | |
| ((TURING|BIRNAMWOOD)))) | (((UTAH|NEW YORK)))) | ((()) | ((69.102)) | ((a)) | ((4)) | | |
| ((TURING|FORESTVILLE)))) | (((UTAH|VERMONT)))) | ((()) | ((69.102)) | ((a)) | ((4)) | | |
| ((TURING|NEKOOSA)))) | (((UTAH|NEBRASKA)))) | ((()) | ((69.208)) | ((b)) | ((1.5)) | | |
| ((TURING|NEKOOSA)))) | (((UTAH|NEBRASKA)))) | ((()) | ((69.102)) | ((a)) | ((4)) | | |
| ((TURING|WAUNAKEE)))) | (((UTAH|SOUTH CAROLINA)))) | ((()) | ((95.105)) | ((a)) | ((3.5)) | | |
| ((TURING|TURING)))) | (((UTAH|UTAH)))) | ((()) | ((95.204)) | ((a)) | ((3)) | | |
| ((TURING|HAMBURG)))) | (((UTAH|ARIZONA)))) | ((()) | ((95.204)) | ((a)) | ((2)) | | |
| ((TURING|OGDENSBURG)))) | (((UTAH|IDAHO)))) | ((()) | ((69.208)) | ((a)) | ((2)) | | |

Analysis

Statistics | Frequencies | Meta-frequencies | Line

| | C4 Street |
|---|---|
| Count of distinct values | 295 |
| Count of distinct patterns | 195 |
| Count of empty strings | 0 |
| Count of alphabetic strings | 0 |
| Count of alpha-numeric strings | 0 |
| Count of repeated-character strings | 0 |
| Count of positive integers | 0 |
| Count of numeric values | 0 |
| Length of shortest string | 9 |
| Length of longest string | 29 |
| Minimum sort value | 10023 YETTER RD |
| Maximum sort value | W9788 HWY 96 |
| Minimum frequency | 1 |
| Maximum frequency | 4 |
| Minimum numeric value | no numeric values |
| Maximum numeric value | no numeric values |
| Mean of numeric values | no numeric values |
| Standard deviation | no numeric values |
| Sum of numeric values | no numeric values |

◉ Show values    ○ Show patterns

| | Frequencies |
|---|---|
| 4 | 1.149% | 10300+W+BLUEMOUND+RD+APT+310 |
| 4 | 1.149% | 621+E+DECORAH+RD+APT+104 |
| 3 | 0.862% | 10714+HIGHWAY+133+#+4 |
| 3 | 0.862% | 127+W+SHEBOYGAN+ST |
| 3 | 0.862% | 157+STATE+ROAD+35+TRLR+36 |
| 3 | 0.862% | W11610+LONGVIEW+RD |
| 2 | 0.575% | 1101+FARWELL+DR |
| 2 | 0.575% | 11618+W+JASEK+RD |
| 2 | 0.575% | 1250+ORCHARD+ST |
| 2 | 0.575% | 1315+S+10TH+ST |
| 2 | 0.575% | 1331+BELLEVUE+ST+LOT+133 |
| 2 | 0.575% | 17730+MUNGER+LAKE+RD |
| 2 | 0.575% | 1807+STONEBRIDGE+RD+APT+101 |
| 2 | 0.575% | 1961+75TH+AVE |
| 2 | 0.575% | 1971+16 1/2+AVE+TRL+40 |
| 2 | 0.575% | 2268+COBBLESTONE+LN |
| 2 | 0.575% | 235+WINNEBAGO+DR+APT+215 |
| 2 | 0.575% | 236+E+SECOND+ST+#A |
| 2 | 0.575% | 2413+DAHLE+ST |
| 2 | 0.575% | 24703+FISHER+LN |
| 2 | 0.575% | 252+TMBLIN+DR |
| 2 | 0.575% | 2622+N+51ST+ST |
| 2 | 0.575% | 2934+W+PIERCE+ST+#+A |
| 2 | 0.575% | 309+PARK+WAY |

| | Meta-frequencies |
|---|---|
| 4 × 2 | = 8 | 2.299% |
| 3 × 4 | = 12 | 3.448% |
| 2 × 39 | = 78 | 22.414% |
| 1 × 250 | = 250 | 71.839% |

FIG. 8

Analysis

| Statistics | Frequencies | Meta-frequencies | Line |
| --- | --- | --- | --- |

| | D28 Body |
| --- | --- |
| Count of distinct values | 17 |
| Count of distinct patterns | 17 |
| Count of empty strings | 0 |
| Count of alphabetic strings | 0 |
| Count of alpha-numeric strings | 0 |
| Count of repeated-character strings | 0 |
| Count of positive integers | 0 |
| Count of numeric values | 0 |
| Length of shortest string | 93 |
| Length of longest string | 117 |
| Minimum sort value | 103327885,ZABRINA,WECKS,10300 W BLUEMOUND |
| Maximum sort value | 999027000,GERARDO,COLEYONEAL,N1314 SUGAR |
| Minimum frequency | 1 |
| Maximum frequency | 1 |
| Minimum numeric value | no numeric values |
| Maximum numeric value | no numeric values |
| Mean of numeric values | no numeric values |
| Standard deviation | no numeric values |
| Sum of numeric values | no numeric values |

● Show values   ○ Show patterns

| | | Frequencies | | Meta-frequencies |
| --- | --- | --- | --- | --- |
| 1 | 5.882% | 103327885,ZABRINA,W | 1 x17 =17 100.0% |
| 1 | 5.882% | 125070889,GAIGE,ZIEBL | |
| 1 | 5.882% | 158828479,KEENON,MA | |
| 1 | 5.882% | 184060019,KIRSTY,WHIF | |
| 1 | 5.882% | 282388092,GINGER,REY | |
| 1 | 5.882% | 292028847,TESSIE,SIMM | |
| 1 | 5.882% | 319026534,TED,MATITZ | |
| 1 | 5.882% | 481017467,TRACY,SPO | |
| 1 | 5.882% | 535019838,LEENA,TUBB | |
| 1 | 5.882% | 538364155,MALLARY,W | |
| 1 | 5.882% | 550345614,LANCE,LOVA | |
| 1 | 5.882% | 59015662,JEROD,HARIT | |
| 1 | 5.882% | 605468103,BRANDT,DEE | |
| 1 | 5.882% | 748178078,DENZIL,IDINC | |
| 1 | 5.882% | 798342082,LAMOND,RU | |
| 1 | 5.882% | 995037713,MALISSA,KU | |
| 1 | 5.882% | 999027000,GERARDO,C | |

FIG. 13

FIG. 33

Marked source keys

| Key |
|---|
| 584802793 |
| 604804183 |
| 791807073 |
| 790801373 |
| 886809763 |
| ...etc... |

Sorted marked source keys

| Key |
|---|
| 001002492 |
| 001015330 |
| 001020143 |
| 001029611 |
| 001039851 |
| ...etc... |

FIG. 40

| Target pairs | |
|---|---|
| Key | Record# |
| 897199607 | #1 |
| 284441332 | #2 |
| 669415051 | #3 |
| 612358330 | #4 |
| 147052401 | #5 |
| 367480475 | #6 |
| 102875716 | #7 |
| ...etc... | |

| Sorted target pairs | |
|---|---|
| Key | Record# |
| 001002492 | #11,095 |
| 001015330 | #18,764 |
| 001020143 | #23,493 |
| 001029611 | #35,814 |
| 001039851 | #59,834 |
| 001040651 | #18,766 |
| 001044330 | #10,268 |
| ...etc... | |

FIG. 41

UNDERSTANDING DATA IN DATA SETS

BACKGROUND

This description relates to data sets.

A table of a typical relational database, for example, represents a dataset of records. Each record has data values in fields that have been defined for the table. Each field can have at most one value for the attribute represented by the field. The table has a unique key that distinguishes the records from one another unambiguously. The relationships of the tables of the database are normally defined in advance and all of the data and the tables are represented in a commonly shared native format. In addition to performing transactions in the database, a user typically can view the records of each table, and combinations of data contained in related tables through an interface provided by a database application.

Sometimes, related data of an enterprise are not held in a predefined well-disciplined database but are generated as separate files, data sets, or data streams that may have different unrelated formats. Although the data in each of these sources may be construed as records, the delimitation of the records into fields, for example, may not be defined within the sources. Sometimes the data in different sources, though related, may be inconsistent or repetitive.

U.S. Pat. No. 7,512,610, issued Mar. 31, 2009, owned by the same company as this patent application, and incorporated here by reference in its entirety (and at least partially set forth below), described a way to process a source file, data stream, or data set, to make its data easily accessible and viewable as records that can be manipulated and analyzed by a user.

In a typical database, for example, each record contains values for each attribute or field in a set of fields. For example, an address list database could have name, street number, street name, city, state, and zip code fields (or attributes). Each record would hold the name and address of one person and could (but need not) include values for all of the fields. One record could be for John Jones and include a street number (37) and street name (Portland Street) but no values for other fields.

There are many other contexts in which data may be organized in records that share common attributes and hold values for some or all of those attributes. For example, messages sent on communication channels may each include a header, an addressee, a body, and other fields of data. Each message may be thought of as a record. Streams of such messages and other streams of records need not be organized as formal databases or even as unified files. Yet, they contain what are in effect records that share common attributes and that each include values for some of the attributes.

Typically, the records of a database or other data organized in groups are created, managed, used, displayed, altered, and removed using software for which the format and organization of the records are native. For example, a Microsoft Access database has a file format that is native to Microsoft Access and includes both the raw data (the values of the attributes) and information (metadata) about the formatting and other aspects of the data.

The raw data comprising a set of records may be represented as a stream of characters, one record after another, with values of the fields included in the stream. Typically there is some way to delineate the end of one record and the start of the next record. All of the records may have the same length, for example, or a character such as a comma or a pipe may be inserted into the stream between each pair of records. Within each record the values of the fields may also be distinguished from one another based on length or a separation character or in some other way.

The data in the records may be part of a formal file that also includes metadata about the records. The formal file can be opened and manipulated by the software for which it is native. In some cases, software programs can also import files and data having formats that are not native to the program, convert them to a file of native format, and manipulate, search, and display the records. Some programs can also export files of data records in non-native formats.

Typical common functions of database software are sorting, filtering, and searching for records. Databases may contain millions and even billions of records. Searching is typically done either by hard-coding search strategies or using a query language such as SQL. Sorting and filtering use algorithms to process sometimes large numbers of records.

The user interfaces of ordinary database software enable users to view the records, fields, and values of the database and the results of sorting, filtering, and searching in predefined ways.

SUMMARY

In general, in an aspect, there are two or more data sets. Each of the data sets contains data that can be interpreted as records each having data values for data fields. Each of the data sets contains at least some data that is related to data in at least one of the other data sets. The data in different ones of the data sets is organized or expressed possibly differently. Each of the data sets is susceptible to a definition of a key for the records of the data set. The data sets are characterized by repetitions of at least one of (a) records, (b) portions of keys, or (c) instances of values for data fields. Information about at least one of the repetitions is provided to a user.

Implementations may be characterized by one or more of the following features. At least one of the data sets includes a file having a file format. At least two of the data sets include files having different file formats. Information is received from a user about the manner in which data of at least one of the data sets may be interpreted as records each having data values for data fields. Information is received from a user from which the key for each of the data sets can be determined. The key of one of the data sets has a defined hierarchical relationship with the key of another of the data sets. The repetitions of records include duplicate records in one of the data sets. The repetitions of portions of keys include values of a key of one of the data sets corresponding to two different values of a portion of a key of another one of the data sets. The repetitions of instances of values for data fields include two or more instances of values being included in a given field. The user is enabled to perform at least one of marking, unmarking, filtering, unfiltering, and frequency analysis for values of records of at least one of the data sets.

Providing of the information to the user includes displaying the information. Displaying includes displaying records of the data sets, identifications of the fields of the records, and indications of the repetitions in data sets. Displaying of information about the repetitions includes displaying repeated instances of values for data fields. Displaying of information about the repetitions includes noting the existence of repeated records in a data set. Displaying of information about the repetitions includes noting the existence of repetitions of a portion of a key.

Providing information to the user includes enabling the user to create an integrated file of records that includes the data of the data sets and information about the repetitions. The integrated file contains records governed by a key. The key of the integrated file includes a hierarchical concatenation of fields of the data sets. The repetitive data values are included in a given field of a record of the integrated file. Records of the integrated file are displayed to the user. Views are displayed of the data of the integrated file that correspond to the data of the data sets from which the integrated file was created. The method of claim also enabling a user to perform at least one of marking, unmarking, filtering, unfiltering, and frequency analysis for values of records of at least one of the data sets. A user is enabled to perform at least one of marking, unmarking, filtering, unfiltering, and frequency analysis for values of records of the integrated file, the marking, unmarking, filtering, and frequency analysis being applied automatically to the other views of the data In general, in an aspect, a data set is received containing data that can be interpreted as records each having data values for data fields. The data set is characterized by any arbitrary number of repetitions of instances of values for at least one of the data fields. Information about at least one of the repetitions is provided to a user. The data set includes a file having a file format. Information is received from a user about the manner in which data of the data set may be interpreted as records each having data values for data fields. Information is received from a user from which a key for the data set can be determined. The user is enabled to perform marking, unmarking, filtering, unfiltering, and frequency analysis for values of records of the data set. The providing of the information to the user includes displaying the information. The displaying includes displaying records of the data set, identifications of the fields of the records, and indications of the repetitions in data set. The displaying of information about the repetitions includes displaying repeated instances of values for data fields.

In general, in an aspect, a medium bears an integrated file of data records and a key for the records. Each of the records contains at least one data value for at least one data field. The data records contain information that represents data of at least two data sets. Each of the data sets contains data that can be interpreted as records each having data values for data fields. Each of the data sets contains at least some data that is related to data in at least one of the other data sets. The data in different ones of the data sets are organized or expressed possibly differently.

Each of the data sets is susceptible to a definition of a key for the records of the data set. The data sets being characterized by repetitions of at least one of (a) records, (b) portions of keys, or (c) instances of values for data fields. The integrated file includes information that identifies the repetitions.

In general, in one aspect, a user is enabled to identify arbitrary data records of interest that belong to a file of data records that are expressed in an arbitrary format, and using pre-generated information about the records of the file to enable a user to view a portion of the arbitrary data records that a machine is capable of displaying at one time, the amount of time required to enable the user to view the portion after the data records of interest have been identified being essentially independent of the number of records in the file, the file and the pre-generated information about the records of the file each being too large to be stored, as a whole, in a memory that is used by the machine in accessing the arbitrary data records in response to the user's identification of records of interest.

Implementations may include one or more of the following features. The user is enabled to cause records of interest to be marked, to filter marked records, to cause filtered records to be unmarked, to cause filtered records to be marked, and to perform sequences and iterations of two or more of the following actions: causing records to be marked, filtering records, unmarking records, causing filtered records to be marked. The user is enabled to cause marking of marked or unmarked records to be inverted. The user is enabled to initiate analytical steps on records of the file, including generating a frequency distribution of records and generating a meta-frequency distribution of entries in the frequency distribution. The user is enabled to scroll from one set of displayed records to other displayed records, to sort records of the file, and to scroll to records not currently displayed.

The pre-generated information comprises an index file. The records of the file are delimited, e.g., by length, one or more XML, tags, or other delimiters. The delimiters are nested to any arbitrary degree.

The portion of the arbitrary data records that the machine is capable of displaying at one time is limited by a width of a display window, and the action of receiving the indication from the user includes receiving an indication from the user to scroll displayed information horizontally. The number of records in the file exceeds one million. The number of records in the file exceeds one billion. The time required to enable the user to view the portion after the indication has been received is less than one second. The pre-generated information is persistent. The pre-generated information associates a number of each record with a starting location of the record in the file.

In general, in one aspect, a user is enabled to mark records of interest that belong to a file that is too large to be stored, as a whole, in a memory that is used by the machine in accessing the data records in response to the marking, the records that are caused to be marked having arbitrary locations in the file.

Implementations may include one or more of the following features. The user is enabled to view a portion of the marked records of interest that a machine is capable of displaying at one time, the amount of time required to enable the user to view the portion after the user has marked the records being essentially independent of the number of records in the file. The user is enabled to cause records to be marked by specifying filter criteria, and the time required to mark the records after the filter criteria are specified is essentially independent of the number of records in the file. The user is enabled to take an action with respect to the marked records.

In general, in one aspect, a user is enabled to cause records of interest (e.g., records that belong to a file that is too large to be stored, as a whole, in a memory that is used by the machine in accessing the data records in response to the user). The user is enabled to apply a filter to cause only marked records to be subjected to a subsequent action. The user is also enabled to cause a subset of the filtered records to be marked.

Implementations may include one or more of the following features. The records of interest have arbitrary locations in the file. The amount of time required to apply the filter is essentially independent of the number of records in the file. The number of marked records is too large to be stored, as a whole, in the memory. The number of records exceeds one million. The number of records exceeds one billion.

In general, in one aspect, a file of data records that are expressed in an arbitrary format is processed to produce pre-generated information about the records of the file. The file is too large to be stored, as a whole, in a memory that is used by a machine to operate on the records in response to a user's interactions with the machine. The pre-generated information enables the machine to operate on the records in response to the user's interactions in an amount of time that is essentially independent of the number of records in the file. An enhanced file is formed that includes the data records and the pre-generated information and can be used later to permit the machine to operate on the records in response to the user's interactions without requiring a recreation of the pre-generated information.

Implementations may include one or more of the following features. The data records appear in the enhanced file as groups of data containing representations of the data records. The pre-generated information appears in the enhanced file as groups of pre-generated information. The pre-generated information is interleaved with the data records. The pre-generated information includes metadata. The pre-generated information includes frequency data.

In general, in one aspect, in response to a request by a user, data records in a file are analyzed, the data records having values for one or more fields, to determine the number of occurrences of each value of at least one of the fields. A user is enabled to view the number of occurrences of each value of the field and the locations of all records containing that value in the file. There are as many as a billion distinct values of the field.

Implementations may include one or more of the following features. The number of distinct values of the field is as large as 2**64. The user is enabled to view the number of occurrences and the locations of the records in a scrollable window of a user interface.

In general, in one aspect, in response to a request by a user, data records in a file are analyzed, the data records having values for one or more fields, to determine the number of occurrences of each value of at least one of the fields. A user is enabled to view the number of occurrences of each value of the field and the locations of all records containing that value in the file, and the user is enabled to cause records to be marked based on the information viewed by the user.

Implementations may include one or more of the following features. The user is enabled to cause records to be marked based on at least one value or the number of occurrences of one or more values. The user is enabled to cause records to be marked that contain a particular value. The user is enabled to cause records to be marked that contain all values that have the same number of appearances in the records. The user is enabled to control additional marking and filtering of records.

In general, in one aspect, a user is enabled to identify, as a key, a field in each of at least two different files expressed in potentially two different arbitrary file formats and to cause records of interest to be marked in at least one of the files. In at least a second of the files records are automatically marked for which a value of the key corresponds to a value of the key of a marked record of the one file.

Implementations of the invention may include one or more of the following features. The fields that are identified as keys in the two files are different in their structure or location in their respective files. Each of the keys comprises a composite key comprised of possible non-consecutive fields of the file. One of the composite keys comprises a partial composite key relative to the other of the composite keys. The user is enabled to perform sequences and iterations of two or more of the following actions: causing records to be marked, causing records to be filtered, causing records to be unmarked, causing filtered records to be marked. In at least a third file, records are automatically marked for which a value of the key corresponds to a value of the key of the second file. Prior to the automatic marking of records in the third file, a different field of the second file is identified as a key, and a field in the third file that corresponds to the different field of the second file is identified as a key. At least one of the files is too large to be stored, as a whole, in a memory that is used by the machine in accessing the data records in response to the user.

These and other aspects and features and combinations of them may be expressed as methods, processes, apparatus, program products, databases, methods of doing business, systems, means for performing functions, and in other ways.

Other advantages and features will be apparent from the following description, and from the claims.

DESCRIPTION

FIG. 1 is a block diagram.
FIGS. 2 through 14 are screen shots.
FIGS. 15 through 25, and 37 through 39 are screen shots.
FIGS. 26 through 36 are diagrams of record information.
FIGS. 40 and 41 show file structures.

As shown in FIG. 1, here we describe ways to process 12 independent data sets, files, or data streams 10 (sources) such as (but not limited to) flat files, IMS*, MQ, ODBC, and XML. The data sources may (a) contain related data, (b) have different organizational schemes and formats, and (c) include repetitive data. The processing described here enables users 14 to access, display, analyze, and manipulate the data display through a user interface 16. In some implementations, at least some of the processing is done based on information about the data sources provided by users. In some cases, the processing provides for access, display, analysis, and manipulation of data in records of the data sources themselves. In some implementations, an integrated file 18 is created from the source files and provides additional access, display, analysis, and manipulation capabilities for the user. The features can be provided without requiring programming or scripting by the users.

Implementations of at least some of the features described here, and others, are found in the commercial product called Business Data Tool™, available from MioSoft Corporation of Madison, Wis. That product and its manuals and description are incorporated here by reference.

Figure 2:
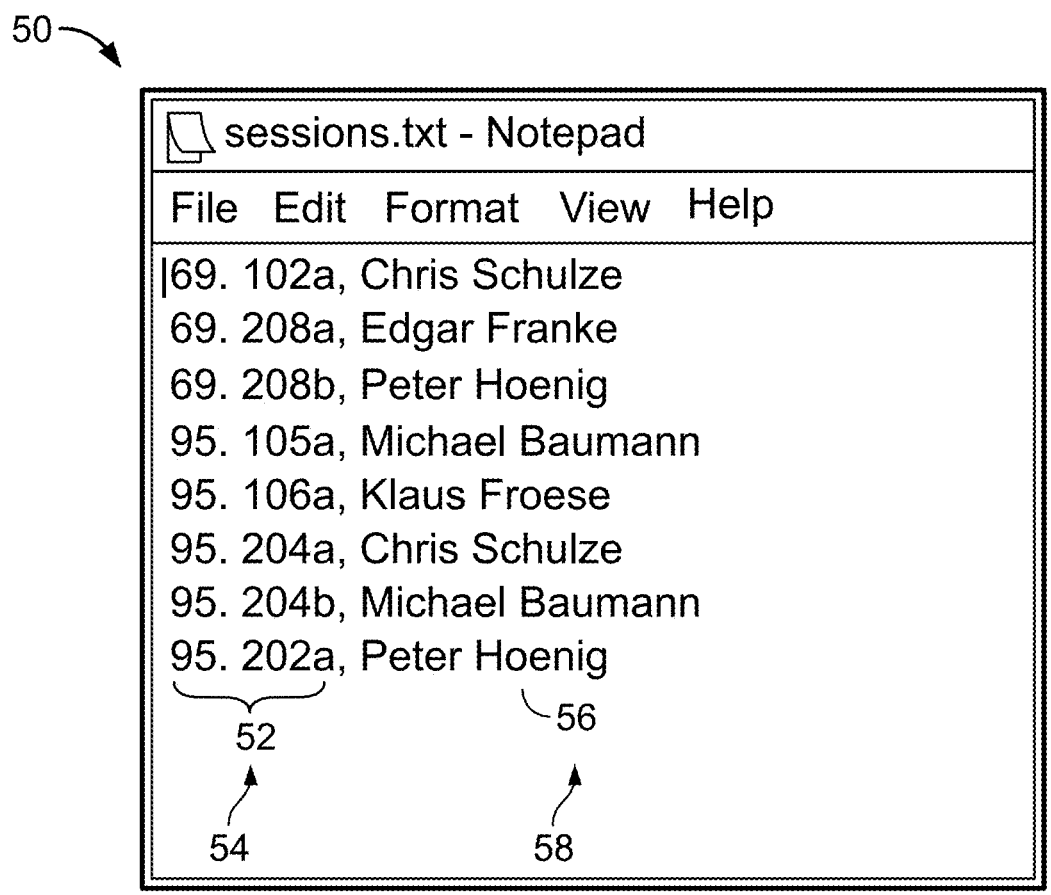

As one example of the data sources to be processed, consider three separate but related data sets (in this case contained in three data files), at least some of which are shown respectively in FIGS. 2, 3, and 4. The records of the three source data files contain information about, respectively, instructors of sessions of certain computer courses, the name of each course, and students registered for courses. We sometimes refer to data sets as files when they are expressed in predefined file formats (such as .txt or .csv). But the techniques that we describe here are broadly applicable to any kind of data set, file, or data stream in which the data can be construed as records. In some cases the delimiters of the records are predefined in the data source. In other cases, the records and their delimiters are inferred from the data source with or without assistance by a user.

We sometimes use the words file and data set (and other terms) interchangeably in a very broad sense to include any set of data of any kind, source, format, length, size, content, or other characteristics. The data set can be an organized array of data or a stream of unorganized data (or a combination of the two) that can be parsed or analyzed to infer what can be called records and delimiters of records. We mean the phrase "record of a data set" to include, very broadly, any group of data of the data set that encompasses one or more values for attributes associated with fields of the data set.

In this example, FIG. 2 shows data of a plain text file called sessions.txt. The file can be construed as including records 50 each of which includes one value 52 in a field 54 that represents a combination of a course number (69.102, for example) and a session letter of that course (such as a or b, which could correspond for example to a first semester and a second semester or to two different sections of the course given in a single semester). A second value 56 of each record in a second field 58 represents the name of the instructor (e.g., Chris Schulze).

The second file, called courses.csv and shown in FIG. 3, is expressed in comma-separated-variable (.csv) format and has records 60 each of which includes a value 61 in one field 62 identifying a course number and a corresponding value 63 in a second field 64 representing the name of the course. For example, course 69.102 has the name Data Migrator.

The third file, called students_with_addresses.csv and shown in FIG. 4, is also expressed in .csv format. Its many fields (not all shown in FIG. 4) contain values that include a value 69 of an identifying number 70 for each student (column A), a value for a first name 72 (column B), a value for a surname 74 (column C), values for one or more addresses 76, 78 separated by a tilde character (column D), a value for an identifier 80 for a session of a course (column E), and a value for a course number (column H, not shown), among others.

The three source files contain related information. For example, course numbers are used in all three files. And session identifiers (a or b) are used in the sessions.txt file and the students_with_addresses.csv file. However, the relationships among some kinds of information that appear in the three files, and in particular the nature and amount of repetition of information, are not easily understood by looking at the three separate files.

Here we describe tools that enable a user, without doing any programming or scripting or engaging in a detailed analysis of all of the relationships among the information contained in the three files, to quickly and easily have the three files analyzed and their records displayed in a way that enables the user to understand the nature and amount of repetition of information that occur in the three files, among other things.

Although the three files shown in this example contain only a relatively small number of records, the same approach could be applied to files that contain very large numbers of records (millions or even billions) and are drawn from widely distributed sources, including sources that may not all be under control of the same party. The different files or sets of records can be expressed in completely different file formats or in some cases without any formal file format.

We first describe a tool that analyses and displays repetition information (among other things) about each of the files and enables the user to quickly observe and navigate properties of the records of the files by invoking simple features of a user interface. An example of the user interface 16 is shown in FIG. 5.

Figure 5:
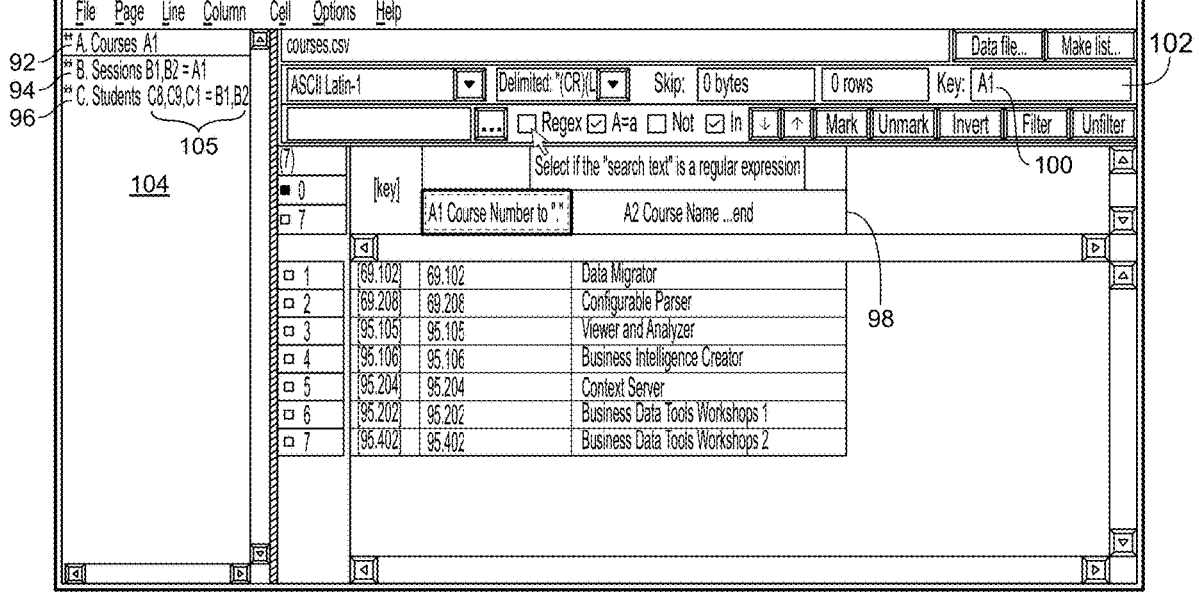

FIG. 5 represents the state of the user interface (here numbered 90) and of the software application 12 (FIG. 1) after (a) the three source data files 92, 94, 96 have been imported into the software application by the user, (b) each of the files has been parsed into fields 98 (with the assistance of the user, who can identify delimiters between fields, for example), and a key 100 has been identified for the file by the user in the key box 102. Records of file A are currently being displayed in FIG. 5.

The three imported files are listed in a pane 104. The  notation next to a file indicates that, when it is highlighted and clicked the records shown in the interface are records of that file. (In some cases, discussed later, the absence of the  notation in the pane next to an entry indicates that, when the entry is invoked, the information shown in the interface is a view of data contained in files, but is not itself drawn directly from an existing file.) Clicking on the name of the file or other entry in the pane causes its records to be displayed in a scrollable records pane 106.

The user interface illustrated in FIG. 5 (and other figures) includes display features, menu items, analytical tools, and other capabilities that are described and shown in more detail in U.S. Pat. No. 7,512,610, the entire contents of which are incorporated here by reference.

In pane 104, next to the name of each file or other entry, a key 105 for that file and its relationship to other keys for at least one of the other files is shown. When each file is imported and parsed, its fields are given identifiers that are unique across all three files. For example, the file Courses is, in this example, identified as file A and its two fields are labeled as A1 and A2.

The parsing of the fields can be done automatically in many cases, based on the information contained in the data source. In other cases, the user participates in identifying the fields and their delimiters.

A key for a file can be one or more fields of the file as identified by the user. For example, the user here has identified column A1, the unique course number, as the key for file A. This is reflected in the presence of the left hand column, titled [key].

Figure 6:
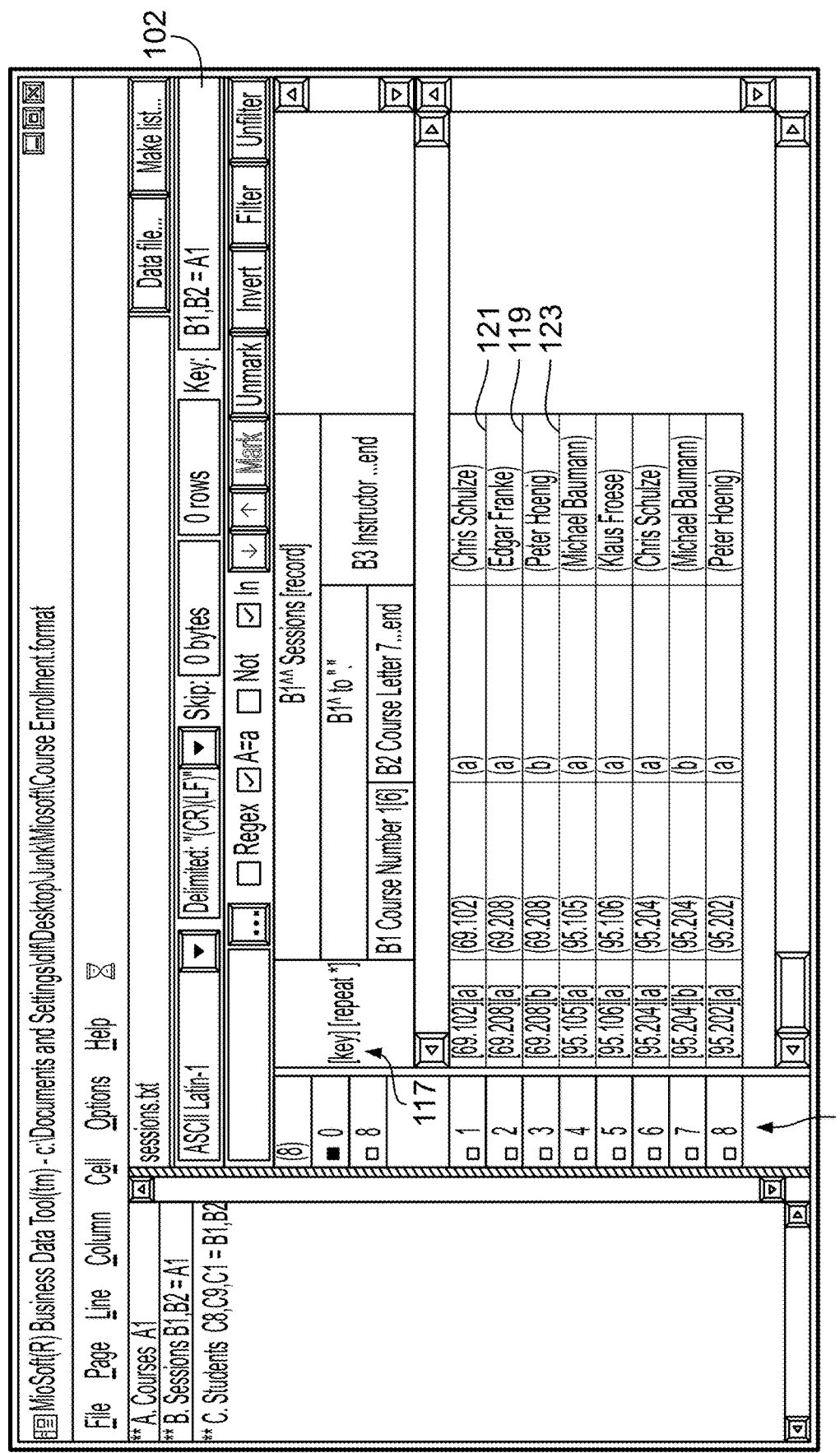

As shown in FIG. 6, the key for file B, Sessions, has been identified in box 102 by the user as a "concatenation" of columns B1 (the course number) and column B2 (the session letter). For file B, the course number alone (column B1) could not serve as a key because there can be two records bearing a given course number, one for each session or section. By "concatenating" the session letter (column B2) with column B1, a unique key can be formed. Here, when we say concatenating, we mean, for example, forming a 2-tuple from the data in the two columns. Thus, an "X" in column B1 and a "YZ" in column B2 would produce a different compound key than an "XY" in column B1 and "Z" in column B2.

The concatenated key (B1,B2) of file B is related to the key (A1) of file A. The relationship 105 is shown in pane 104 and represented by the notation B1,B2=A1. This notation expresses the fact that the key B1 is the same as the key A1 and that there is the possibility of a repetition of records that have the same value for key B1 in file B but have different values for B2. In effect B1,B2 is a hierarchical key. We refer to this hierarchical arrangement as key-level repetition. The key-level repetition is a structural feature of the three files taken together (but is not apparent by looking at file A and not necessarily easily apparent by looking at file C). The user instructs the application about the relationship of B1,B2 to A1 by entering the relationship in the key box 102 for file B.

Figure 7A:
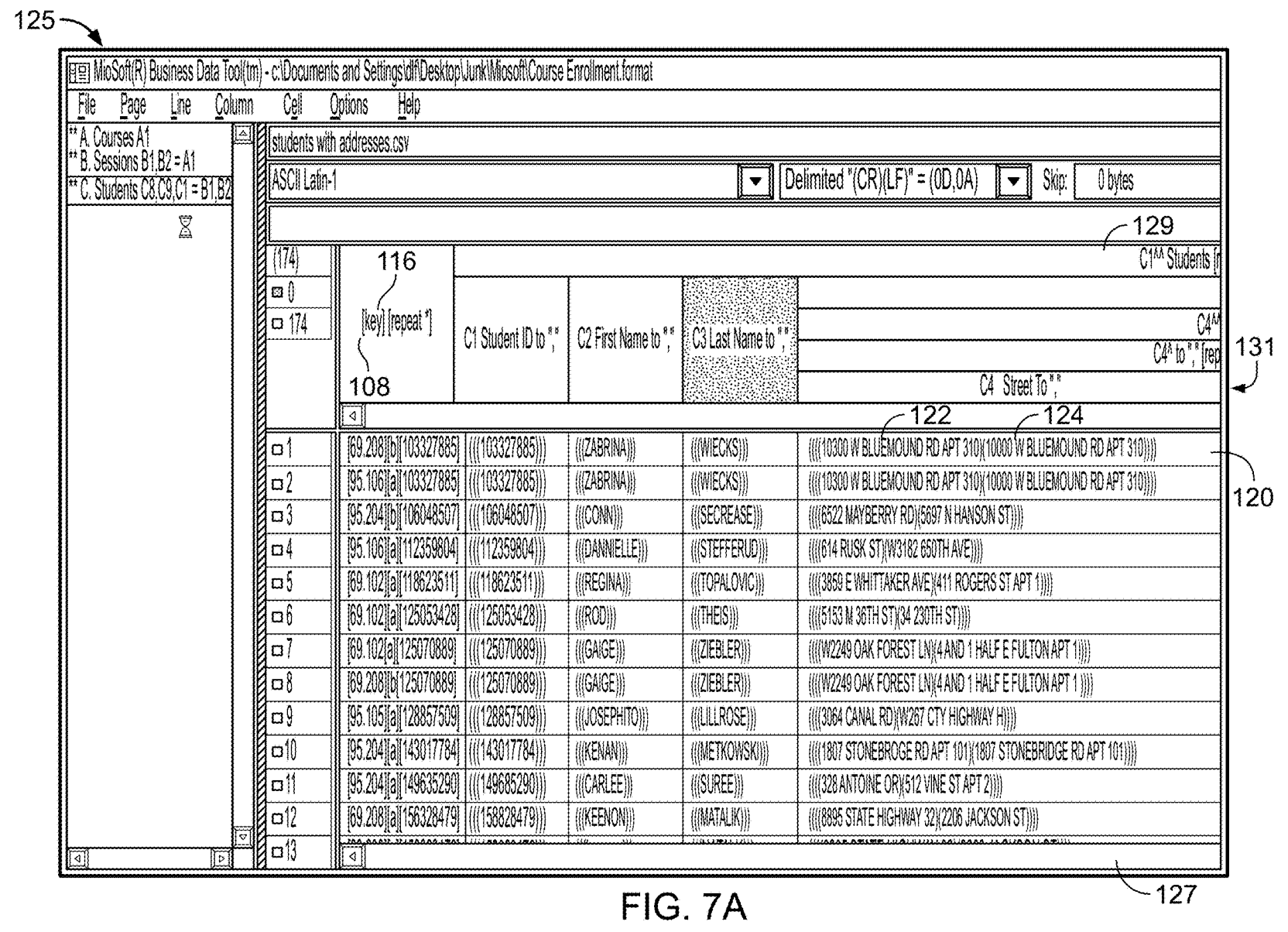

In FIGS. 7A and 7B, the students_with_addresses file C is shown. In this file, a concatenation of columns C8 (course number), C9 (session letter), and C1 (student ID) produces a unique three-level hierarchical key. C8 and C9, of course, are the same as B1 and B2 in file B, so the relationship of keys 110 can be represented as C8,C9,C1=B1,B2 to indicate that C8 and C9 are the same as B1 and B2, respectively, and that there is a further possibility of repetition of each course number and session letter combination in that concatenated key, because typically multiple students register for a given session of a given course.

In field C4 of file C, for some records 120 there are repetitions 122, 124 of instances of street addresses of students, and this possible repetition is also true of other address columns in this example. We call this field-level repetition.

In source data sets, it is also possible to have duplicate records that have the same key. In file C, for example, two records bearing the same key could have identical values in all fields (although no example of this is shown in FIGS. 7A and 7B). We call this record-level repetition. Similarly, file B might contain multiple records with the same key, perhaps to indicate a course and session that is taught by multiple instructors (an unusual arrangement). Files C and B are related by their keys, not by their records, so one should not think of a C record as having a parent B record (or multiple) but rather that a C record has a C key that has a parent B key, and B records also have B keys.

When a data set has been imported and parsed into fields and records, and the records, fields, and values are being displayed, there is a hierarchical indication in a header pane 127 (above the records pane) of the relationships of fields of the records. The uppermost header 129 spans all of the fields and represents the entire records. The headers at the level 131 immediately above the displayed records identifies each of the fields. Each of the intervening header levels shows, hierarchically, groupings of headers below it.

The repetition structure of the data sets is indicated to the user in the user interface. As mentioned earlier, key-level repetitions are called out in the pane 104 and the key box 102. A key-level repetition is identified by displaying the word "repeat" in the key header. For example, the possible repetition of the course number key A1 (of file A) depending on the session letter is indicated by the word repeat 116 that appears after the word key 118 in the header of the concatenated key column. This notation indicates to the user that the course number is a key, but there is a possibility of repetition of that key for different sessions and together B1,B2 form a unique key.

In FIGS. 7A and 7B, the field-level repetition is indicated by the word repeat 117 in the header of column C4, which tells the viewer that there can be repetitive instances of the street, city, and state address fields for a given student. The word repeat 119 in the top level header (which spans all fields) indicates the possibility of a record-level repetition, indicating to the viewer that an entire record of file C can repeat. That is, a given student may have been registered more than once in a given session of a given course.

Repetition structure is also indicated by sets of parentheses surrounding values in the records as shown in FIGS. 5, 6, 7A, and 7B. For example, in FIG. 6, in column B1 of each record, the value of the course number is enclosed in parentheses to indicate that, in file B, there can be a key-level repetition of the course number (e.g., because there may be two sessions for a given course). In FIG. 7, the values in column C2 are each surrounded by three sets of brackets to indicate that there are three possible contexts of repetition of the student first name: (1) a key-level repetition (117 in FIG. 6) implied by the relationship B1,B2=A1, indicating that there may be multiple sessions for a course, (2) a second key-level repetition 116 represented by the relationship C8,C9,C1=B1,B2, indicating that multiple students can be enrolled in a session, and (3) a record-level repetition 119 that would allow multiple student records within file C to have the same key (C8,C9,C1). In the concatenated column C4ˆ, each value in each record also carries a fourth set of parentheses to indicate the possibility of a field level repetition, because each record can include more than one instance of a student address.

Thus, the interface illustrated in FIGS. 4 through 7 (and the related application) enables a user to import separate data sets (contained, for example, in files that have potentially different file formats or having no file format or not contained in a formal file), cause fields of the records of the data sets to be parsed, and identify keys and relationships of keys among separate files that may contain related data. The application analyzes the data sets based on the keys and indicates to the user, in a display of the records of any of the data sets, the existence of repetitions in at least three levels: key-level, field-level, and record-level. The application does not form any new files and does not merge or combine data across the data sets. However, the application does reveal to the user the fields and records of each data set and the repetitions.

The application determines how and where to put repetition information into the displayed records and headers using information provided by the user by means of a "repetition" command. The "repetition" command (available by right clicking on a header and selecting parsing, then repetition) is used to specify which elements in the header reflect repeating data. In the example, on data page B, there is a repeat indication with respect to the key because the data can have a key-level repetition with respect to A, a fact that has been indicated to the application by the user by means of the repetition command. Wherever there is a repetition in a field of a record, the displayed data of the record will include at least one set of parentheses. Parent/child parentheses that are shown nested indicate the nesting of repetitions. Sibling parentheses that are shown side by side, but not nested, are used when the data in a field of a record is actually repeating.

In the display of headers and records, the parentheses are presented by the application based on key repetitions defined by the user in the "parent" files. The "[repeat *]" notation indicates each place the user has explicitly told the application to expect (and extract) repeated data, either at the key, record, or field level. If the user does not specify repetitions, no parentheses are shown. All records are still shown, however, since no inter-record processing takes place during viewing.

The display of the "[repeat *]" notation shows where the user has asked the application to expect repeated data, whether at the level of keys, records, or fields. The parentheses are an indication by the application of how many repetitions are "above" the element in the format's hierarchical decomposition for that file and in the file's key space and key space ancestry. For performance reasons, the application does not normally combine information from multiple records when viewing ordinary files, so key-level and record-level repetitions are not faithfully presented. The parentheses are still included as a reminder of the declared repetitions, but they always appear to be singular because the information from exactly one record is being shown in each row. Field-level repetitions show authentic repetition information as a sequence of zero or more parenthesized strings (e.g., "(foo)(bar)").

As a convenience, the application visually indicates consecutive records that have the same parent key using a dim horizontal separator line. For example, in FIG. 6 the line 119 separates the 69.208a record from the 69.208b record.

Because the parent key of both records is 69.208 (i.e., just column B1), the solid separator lines 121, 123 help to form a visual group of related records. When consecutive records have the same keys (e.g., both B1 and B2 the same) an even dimmer separator line is used, providing two levels of information about record grouping.

In addition, using features of the application, the user can filter, mark, and perform frequency analysis and other analytical operations on the records of the data sets that provide additional insight into the nature of the data. Many of the operations are explained in the patent referred to earlier.

Among other things, the user can perform an analysis of the portions of the data records represented by any of the headers at any level of the header hierarchy. For example, by right clicking in the header C4 street 120 of the display of the records of file C, and selecting the analysis option and then the analyze column option from the resulting pop-up menus, the user can cause the application to perform an analysis of the data in that column and display the results of the analysis, for example, in a window 150 shown in FIG. 8.

In FIG. 8, a pane 152 displays data about the values of the column street in the records of the data set. A pane 154 shows information about frequencies of occurrence of various values of street. And a third pane 156 shows meta frequencies of the frequencies of pane 156.

For example, although the file C contains only 174 records, the display pane 152 shows that the count 125 of distinct values is 295 different streets. This reflects the fact that instances of the street address can be (and in this example are) repeated in column C4 of a given record.

The pane 154 lists in ascending order of frequency the frequencies of appearances of every street address in the file, including the number of appearances, the percentages of the appearances represented by that number, and the associated values of street. For example, the first entry 127 in pane 154 indicates that the street address 10300 W. Bluemound Rd., Apt. 310 appears four times in the file C, which is 1.149% of the total number of appearances of street addresses in the file. In the pane 156, the number of times (in descending order) that a given frequency appears in pane 154 is shown as well as the total number of appearances of addresses represented by those appearances, and the percentages of the total appearances represented by that number of appearances. For example, the first entry in pane 156 indicates that street addresses that appear four times in the file C times the number of such addresses (two, in the case) equals eight, which corresponds to 2.299% of all of the appearances of street addresses in the file. On the other hand, the final entry in the pane indicates that there are 250, or 71.839% records that appear only once in the file. A similar analysis can be run and displayed for any of the columns of any of the files.

While viewing FIG. 8, if a user is interested in seeing only the records represented by one of the lines in pane 154, the user may double-click on that entry. In response, the display of records of file C changes to show only the records that contain the address that is represented by that line in the pane 154. By reviewing those displayed records, the user can infer and understand information about the records of the file and in what context the repetitions occur. The user can learn about the data values, the repetitions, the frequencies and other information for each of the data sets by repeating this process while the records of that dataset are being displayed.

In the illustrated user interface, the user can derive an understanding of the relationships among the data in the three different files. For example, in FIG. 6, the user can right click on the heading B3 instructor, then select the options analysis, and analyze column in the pop-up menus. The frequency information for instructors in those records is then displayed (but not shown here). By double-clicking on the entry that shows two records for which Chris Schulze is the instructor, the records pane is updated to show only those two records. By clicking in the mark boxes 140, both of those records are marked. Next the user can invoke a mark-across-join feature by switching to a display of the Course file A, right clicking on file A in pane 104, invoking the mark across join option, then selecting file B as the source of the marking. This causes a marking in the records pane of the two course records taught by Schulze: Data Migrator and Context Server.

The process can be repeated by the user by marking the record for the Data Migrator course in the display of the records of file B, switching the display to file C, right clicking on file C in the pane 104, selecting the mark across join option and choosing file C as the marking source. The display of the records of file C then shows as marked the records of file C of the students who are in the courses taught by Chris Schulze. By then clicking on the filter button, the user is shown only those records of the courses taught by Chris Schulze.

To summarize some of the specific examples described so far, the user can import files that have related data and are in different file formats and from different sources. The user can specify the record and field delimiters of each of the files if necessary, and the keys and key relationships for each of the files. The files may have repetitions of data at each of three levels: key level, record level, and field level. The tool can indicate the existence of levels of repetitions. In addition, using marking, filtering, and mark across join features of the application, the user can understand the relationship among elements of data in the three files. However, the process of navigating back and forth and using those functions to understand the relationships of the data elements is somewhat cumbersome.

For example, if entry 127 in pane 154 is double clicked to reveal two records that together contain the four instances of the address 10300 W Bluemound, and if the same student identification number is associated with both of those records, the user has no simple way to see more information about the sessions for which that student is registered other than by switching to a display of the sessions file and using the mark across join, filter, mark, and analytical features of the interface to find the records that show the desired information. Therefore, it is possible, but in some cases cumbersome, for the user to observe and understand the inter-relationships of the data in different data sets.

The process can be simplified and made richer by invoking a feature of the tool called join all. The join all feature processes the three files (or data sets)—which have been parsed and for which keys and their relationships have been identified by the user-to produce a new integrated file. The new file captures the data of the three source files A, B, and C in a form that permits faster and easier analysis by a user. The user causes the integrated file to be created by clicking on the menu item file and choosing the export data option and then the join all source files in the dialog box that appears.

For the records that are being joined, the join all operation creates a corresponding hierarchical record that mirrors the relationships among their keys. Because the keys are related hierarchically, the joining can be simplified by first sorting the records for each page according to their keys and then processing them sequentially. By a page we mean a portion of the file that is associated with one of the files that is joined in the join all file. For example, the original file B corresponds to a page B of the joined file. When the final joined file is created from the pages derived from the original files, an additional page is added to the format. The additional page is capable of decoding the joined records and sending each appropriate part to a corresponding page. Thus, in effect, each of the original files has been replaced by a view page that receives its information for display to the user (i.e., for use in creating a view) from another page of the join all file instead of from one of the original files.

Figure 14:
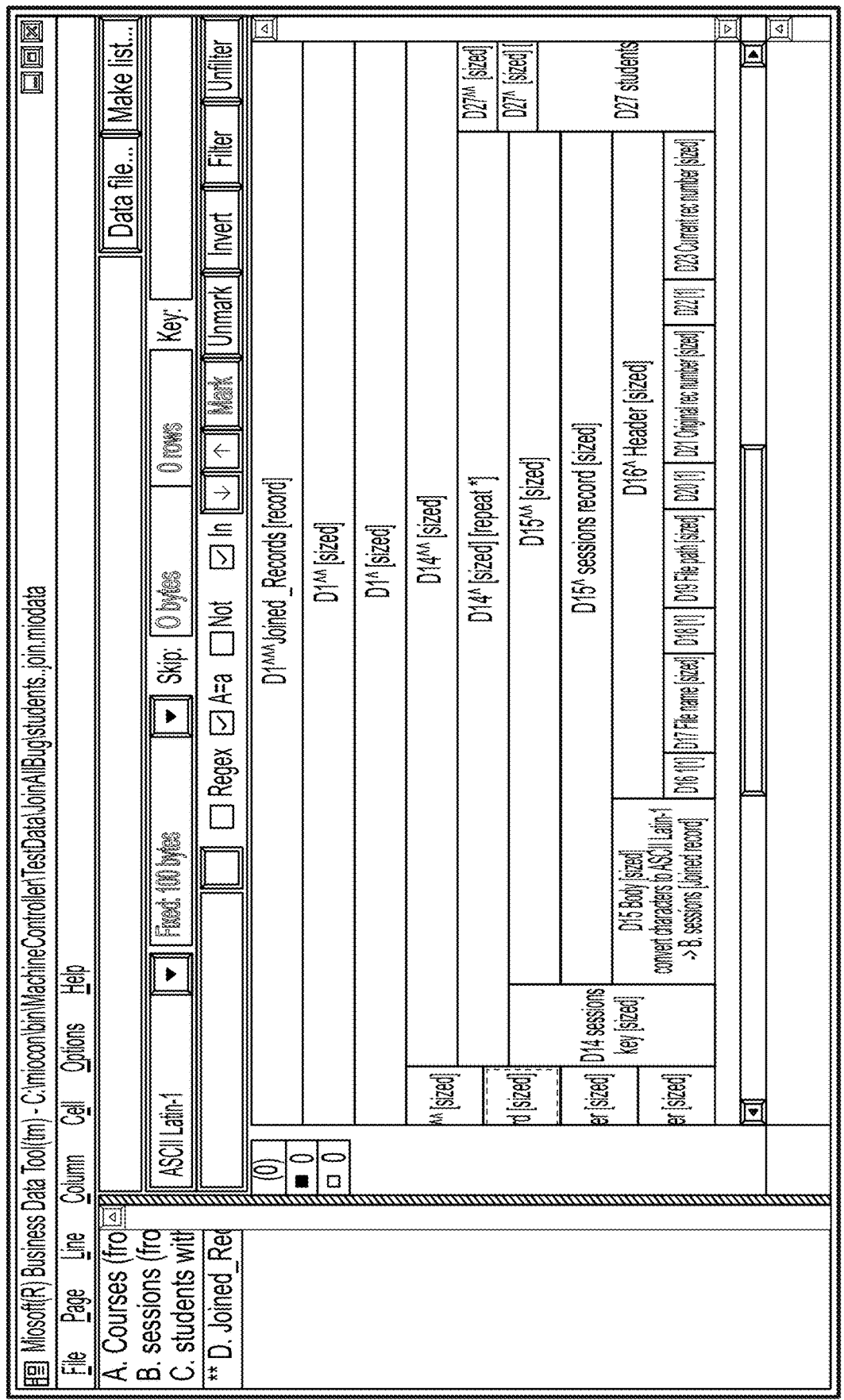

As shown in FIG. 14, the headers shown in the decode page (which is the page called **D. Joined_Records), illustrate the format of the joined records. The portion of the header structure shown in the figure shows the decoding of the records that are related to page B (by page B we mean the portion of the joined file that represents the data derived from the original sessions file B).

Beginning at the top element and proceeding downward, the header structure includes elements "D1^^^ JoinedRecords", "D1^^", "D1^", and "D14^^". The representation of the decoding of the file begins with an element "D1^^", which is a "sized" element meaning that the record contains a size field which specifies the length of the record in bytes followed by the data. (The size field itself is 4 bytes long in big-endian format.) "D1^^" and "D1^" are used to decode the records for use in data page A. "D14^^" and "D14^" are used to decode the records for use in data page B. The first element "D14^^" decodes the field that contains all the data pertaining to the data that is joined to the corresponding record that is in data page A. This element in turn contains "D14 ^" which has a "repeat", meaning that there can be multiple records, each being a sized record. Looking back at "D1^^" and "D1^" we see they follow the same pattern as "D14^^" and "D14^" except that "D1^" does not have a repeat. This is because that element is used to decode the root join record and as such it is not repeated. Strictly speaking, "D1^" is redundant but its presence provides a repetitive pattern that works for hierarchical joined data.

Beneath "D14 ^" are the elements for decoding a record of the joined data for page B. This element includes the records from page C that are joined to a specific page B record. This containment pattern is repeated for all the joined data pages.

The elements "D15^^" and "D15^" decode the data pertaining only to page B. If a record level repetition had been placed on the original data page B then "[repeat *]" would appear on element D15^. "D15^" is further composed of a body, representing the actual data, and header information. In element D15 the notation "→B. sessions [Joined record]" means the output of this element is sent to the input column of data page B.

The header that is extracted by element D16^ is further decoded by elements D16 through D23. As shown the header contains the file name, file path, and record number of the original data. It also contains the record number of the joined data. Each header field is preceded by a single byte that identifies the field.

A similar explanation would apply to other header elements that are illustrated in other figures, for example.

Figure 9:
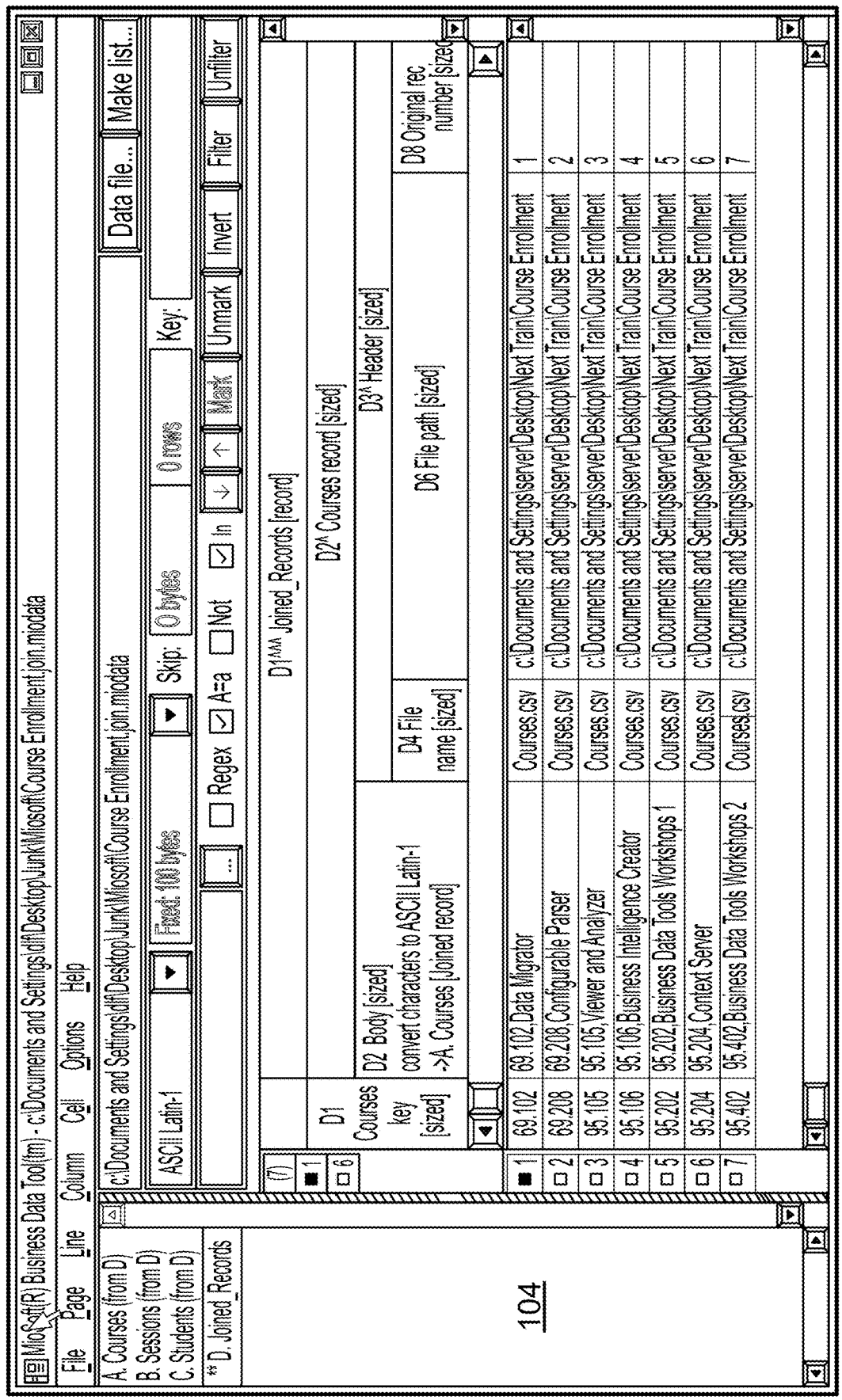
Figure 10A:
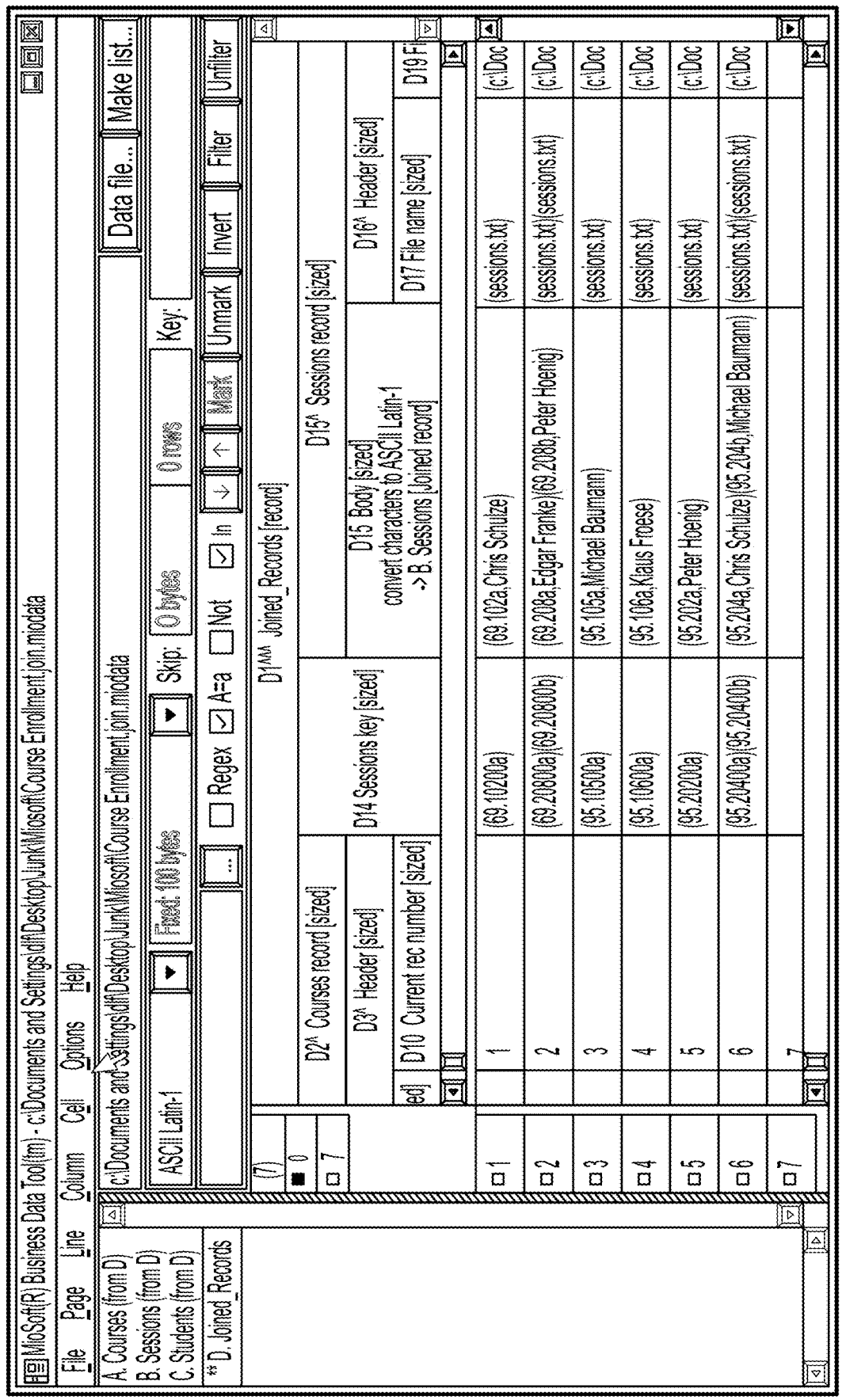
Figure 10B:
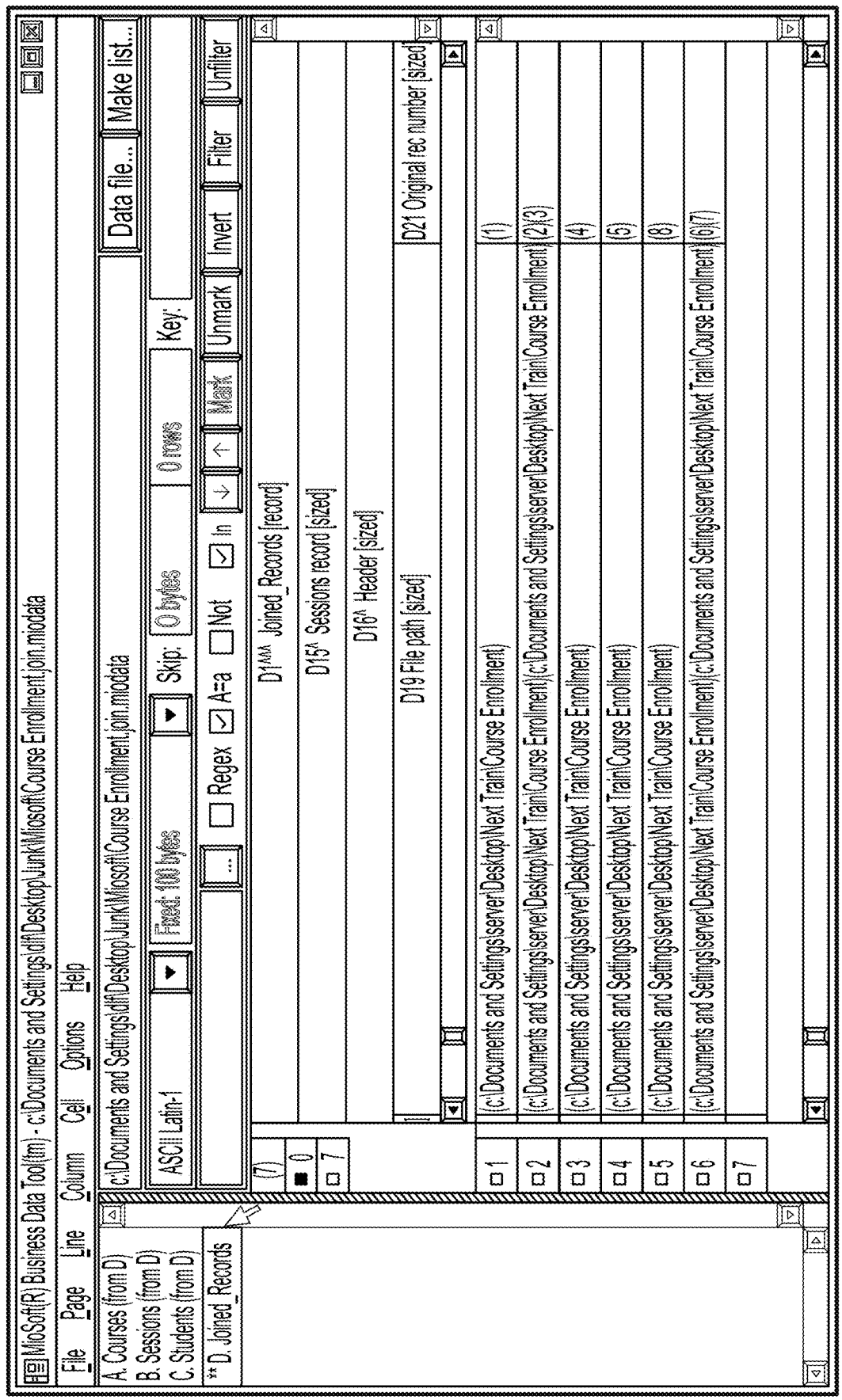
Figure 10C:
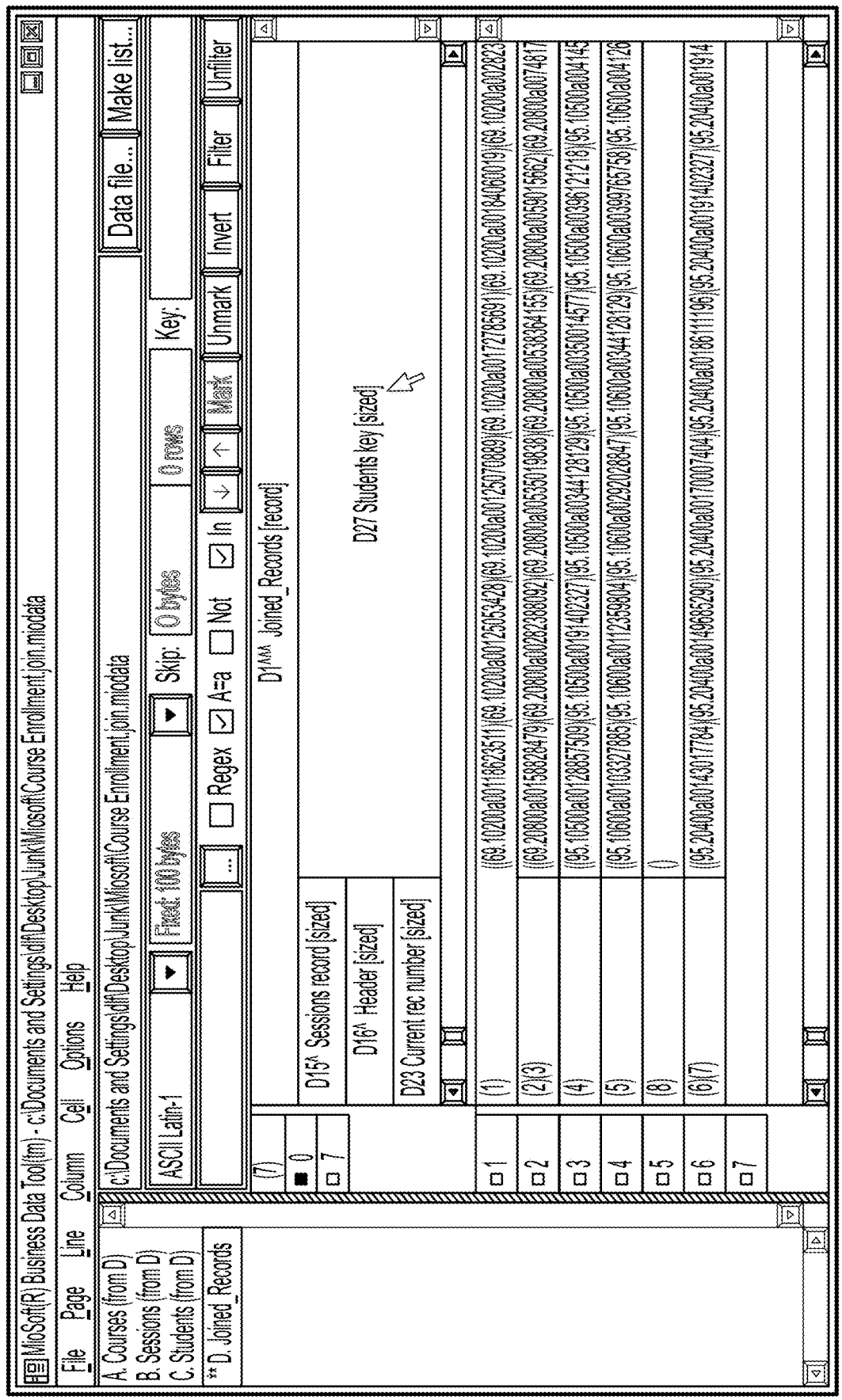
Figure 10D:
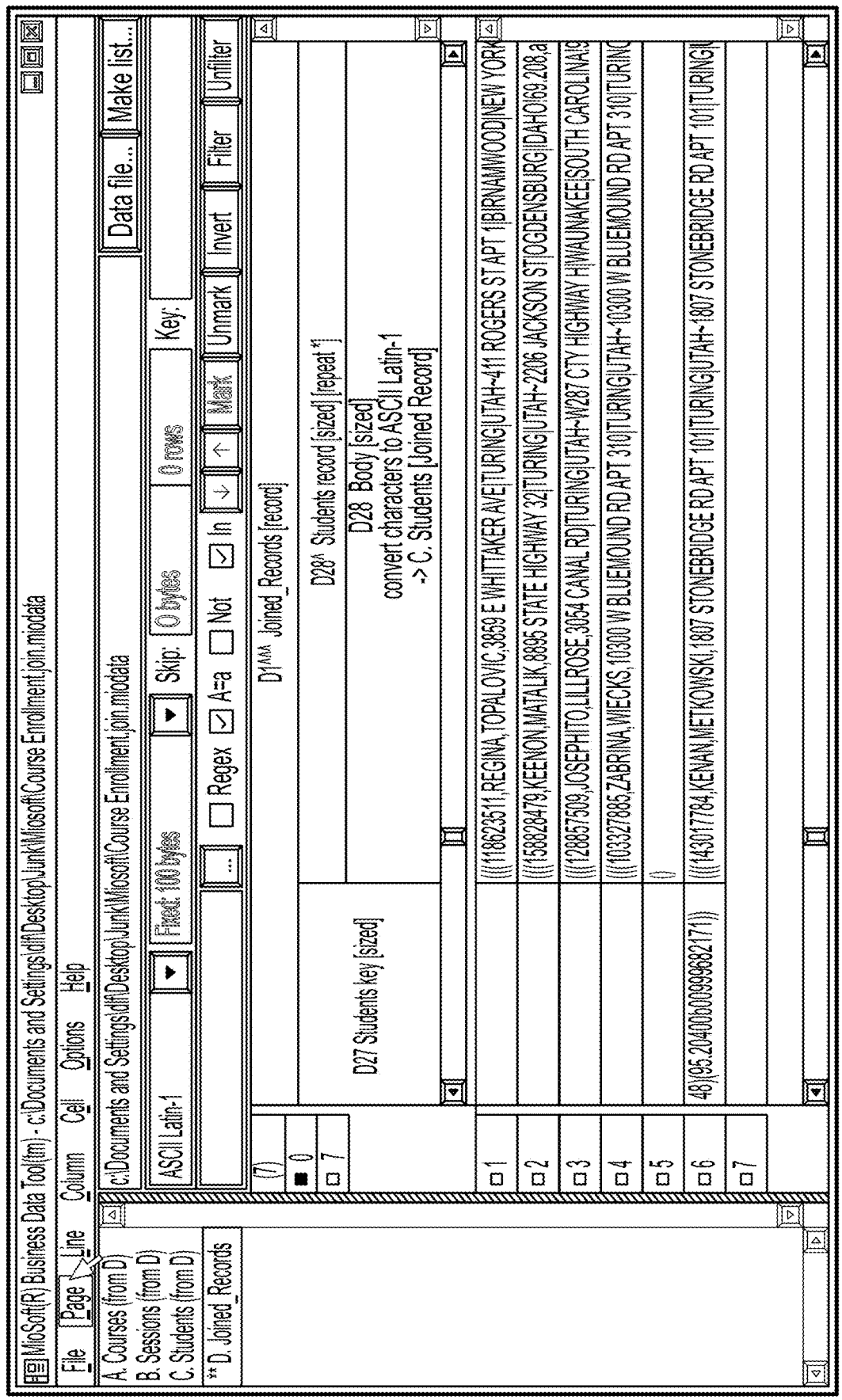
Figure 10E:
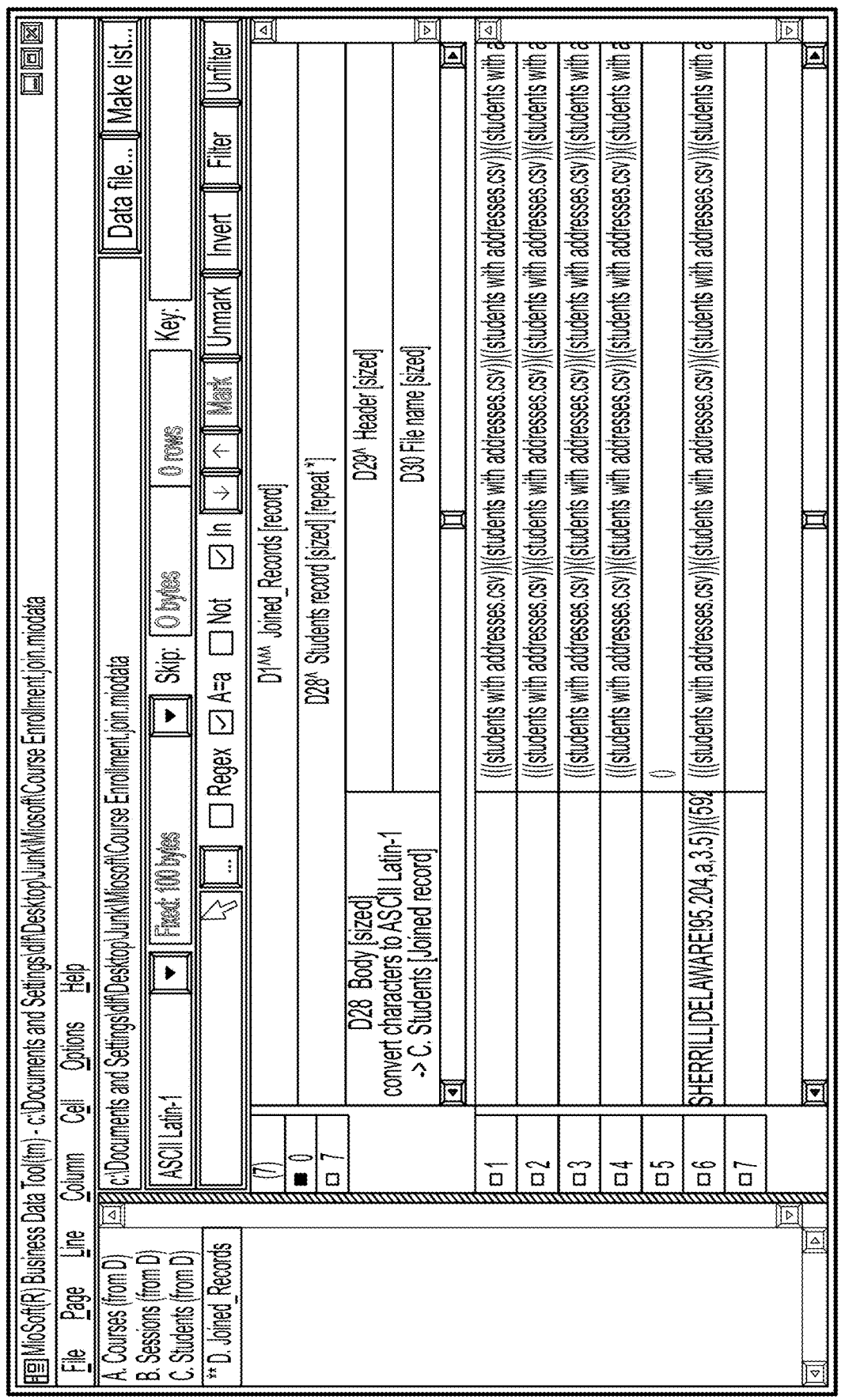
Figure 10F:
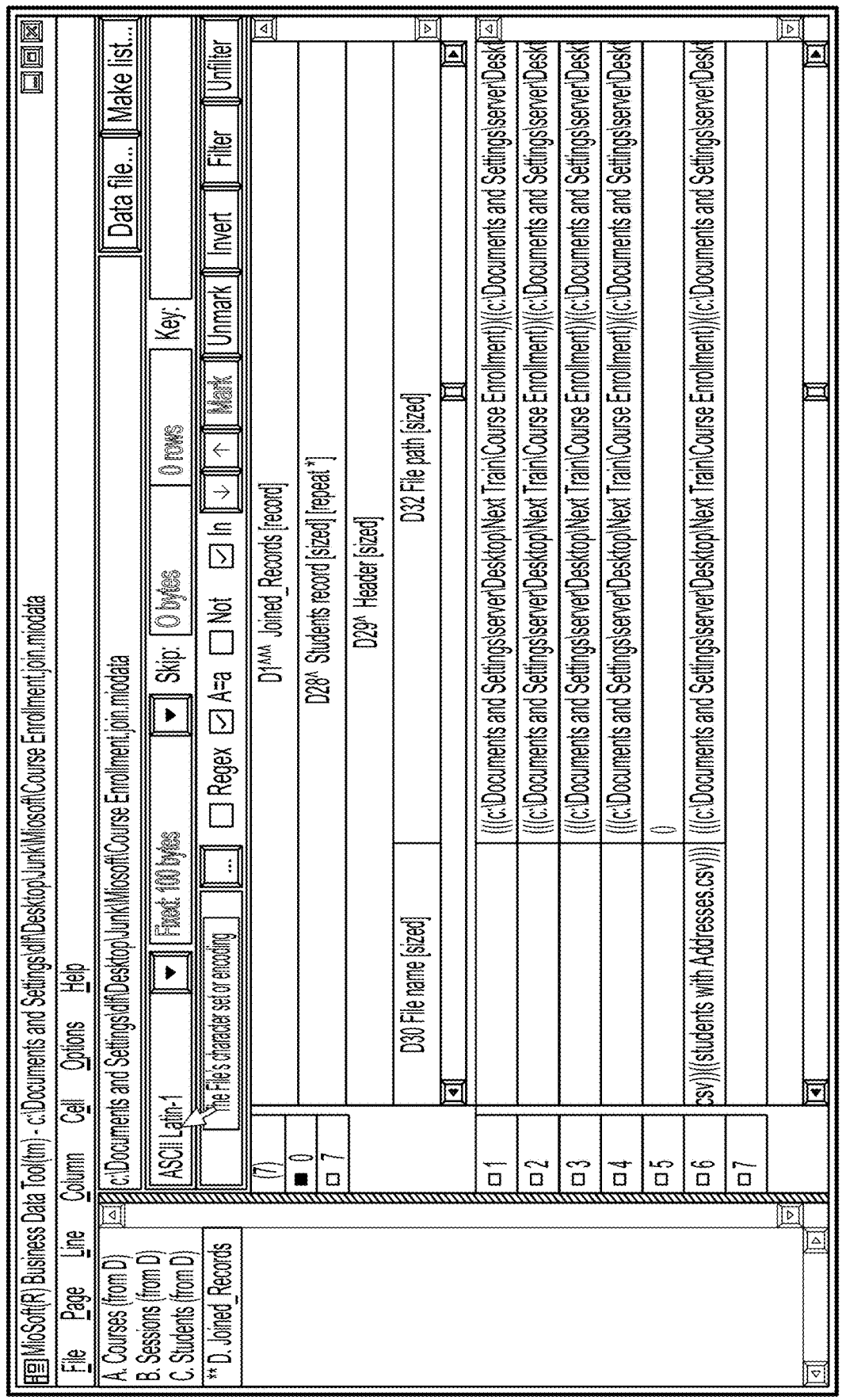
Figure 10G:
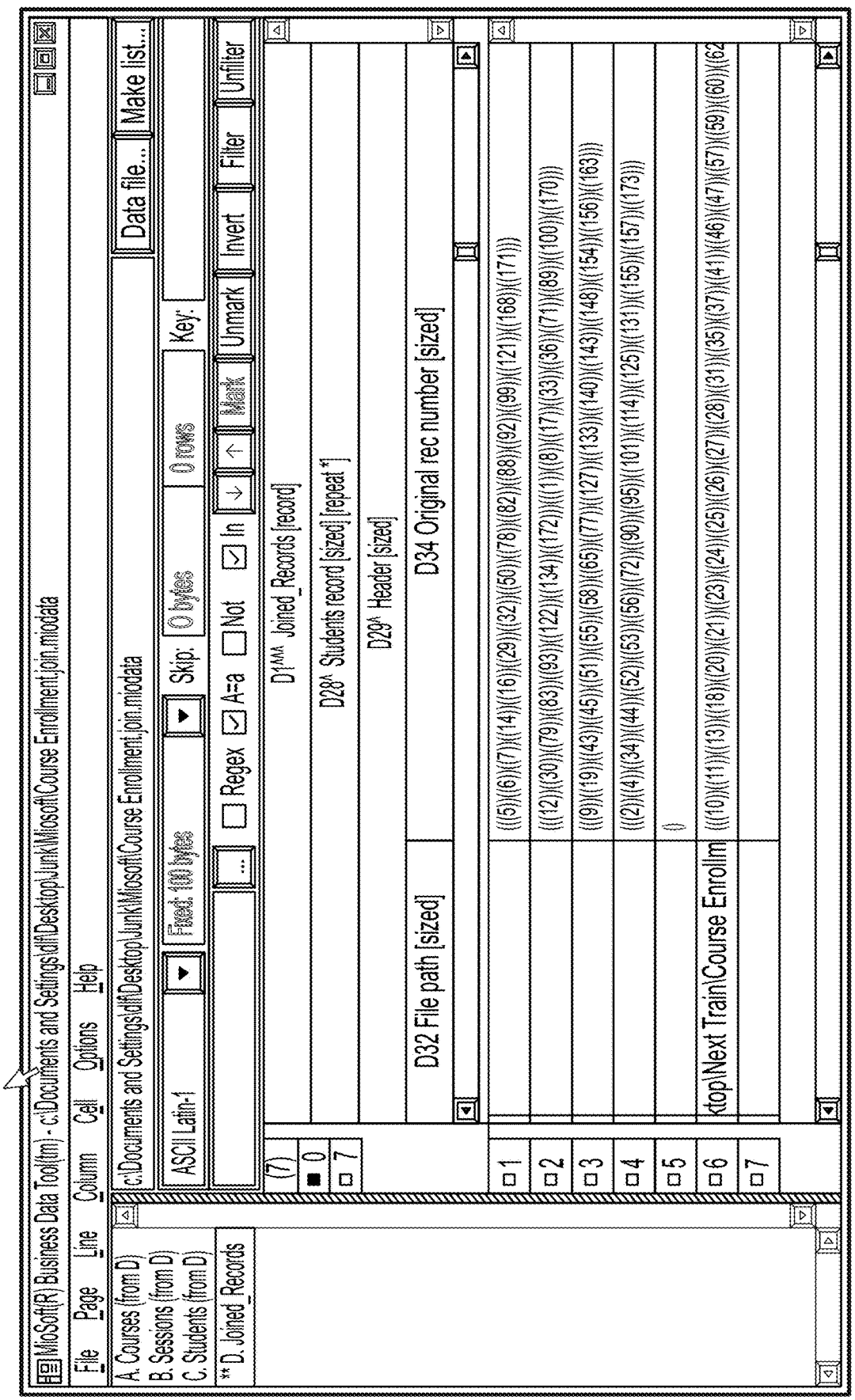
Figure 10H:
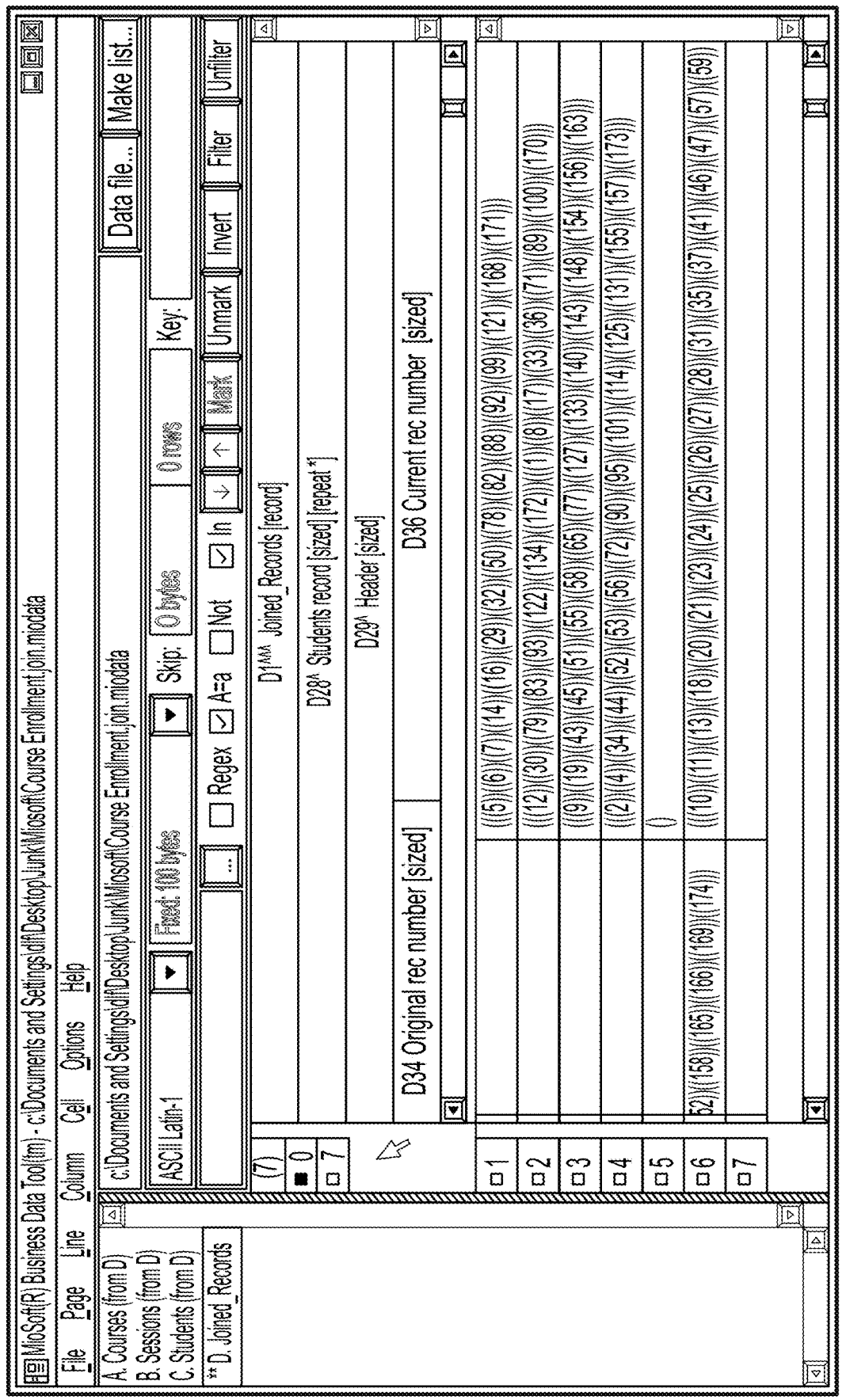

For the example that we have been discussing, FIG. 9 shows the seven records of the resulting join all integrated file which is called D. Joined_Records and is expressed, in this example, in a format called the miodata format.

As shown (in pieces) in FIGS. 10A through 10H, and indicated in the left-hand pane of those figures, the file that is being analyzed and viewed, which is indicated by two asterisks, is file D. The absence of double asterisks next to the entries for files A, B, and C, and the notation from file D indicates that when those entries are invoked and records are displayed, the records are ones that have been derived from the join_records file D rather than being direct views of the records of the three source files. For example, by clicking on the entry A in pane 104, the user is shown data that was derived from the original source file C and incorporated into the integrated file D.

File D contains exactly seven records created from the parsed and keyed source files. Each record in file D is associated with one of the courses. So, for example, column D1 contains the numbers of the seven different courses and serves as the key of the file D, as indicated by the word key in the column header. Column D2 contains the course number and course name for each course, which has been derived from (joined to) corresponding file A based on the key D1. The source of the data in column D2 is indicated in the column header by the phrase "→A. Courses [Joined record]."

Column D4 identifies the name of the file from which the data for these records was derived, column D6 the file path for the file from which the data was derived, column D8 the original record number in that file, and column D10 the current record number of the record. Columns D2 through D10 together make up what is called a courses record column D.

Column D14 contains keyed instances of the sessions of each course. For example, in record 2 of file D, there are 2 instances of sessions keys for course 69.208. The instances are separated by the separator 00 in the display for clarity. For example, "69.20800a" is really "69.208" followed by a null byte (normally shown in red as 00) followed by the letter "a". Null bytes occurring in a component of the key would be encoded as a 01 byte followed by another 01 byte. Any 01 bytes occurring in a component of the key would be encoded as a 01 byte followed by a 02 byte. This encoding preserves the sort order of compound keys and only expands the key (by more than the 00 byte separator) when a 00 or 01 byte occurs within a key component, an unlikely situation.

In column D15 Body, the names of the instructors for each of the courses and sessions are shown. A column D15 Sessions record spans columns D17, D19, D21, and D23 and captures information about the source of the sessions information. In record 2, the names of two instructors appear because there are two different sessions of course 69.208. The information in column D15 has been derived from and joined from file B (as indicated in the column header), which lists the instructor names for various sessions. Although the original file B had eight records to reflect the fact that there were eight sessions of the courses, in the file D, all eight of those records are captured in only six records of column D15, because for two of the courses, there are two sessions each and those pairs of sessions can be recorded in the same records.

Column D27 displays key information for all instances of students in each of the courses, along with associated information about the course and session in which the student is registered. As with column D14, the key information for the course, the session, and the student ID are separated by the 00 separator. Record 6, for example, holds key information for a very large number of instances of students registered in that course, each key comprising the course number, the session letter and the student ID.

Similarly, column D28 captures student address records by a join with file C. Columns D30, D32, D34, D36 capture information about the original location of the joined information.

The file D is a non-rectangular file in that, for each course record, various columns of the record can have multiple instances (repetitions) at the different levels of repetition. For example, there can be many student IDs of students registered in a course. Column D27 captures the multiple IDs and for each one the associated course and session identifiers. The information that ties the data of the source files is therefore completely captured and immediately available to permit a user to view related data in different files.

This arrangement is unlike a typical database table in which each of the records is rectangular, that is, each column has space for a single value of the attribute of that column; additional columns must be provided for additional values of that attribute. Such a table is rectangular in the sense that the lengths of all of the records, in terms of the number of entries of values, one per column, are all the same and defined by the number of columns. File D, by contrast, is non-rectangular in that the lengths of the records, in terms of the number of entries of values can be more than one per column, and therefore need not all be the same.

The application generates not only the join all integrated file in this flat form, but also the three views on the data of file D that correspond to the three source files A, B, and C. Having the data organized in non-rectangular records in file D and having the three views (A, B, and C) on the data in D permits much easier, faster, and more intuitive opportunities for a user to view and use the data in the three source files.

Figure 11:
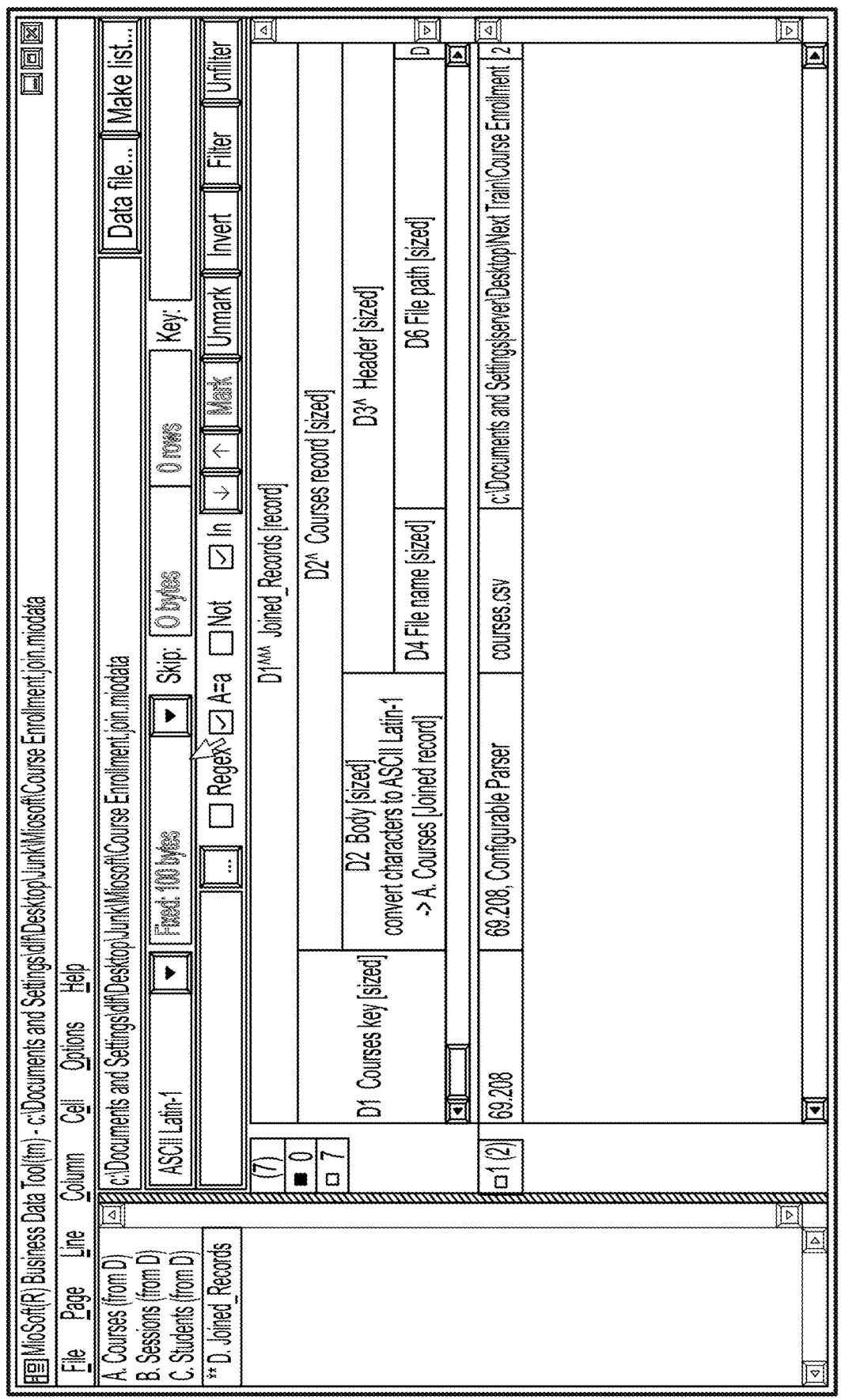
Figure 12:
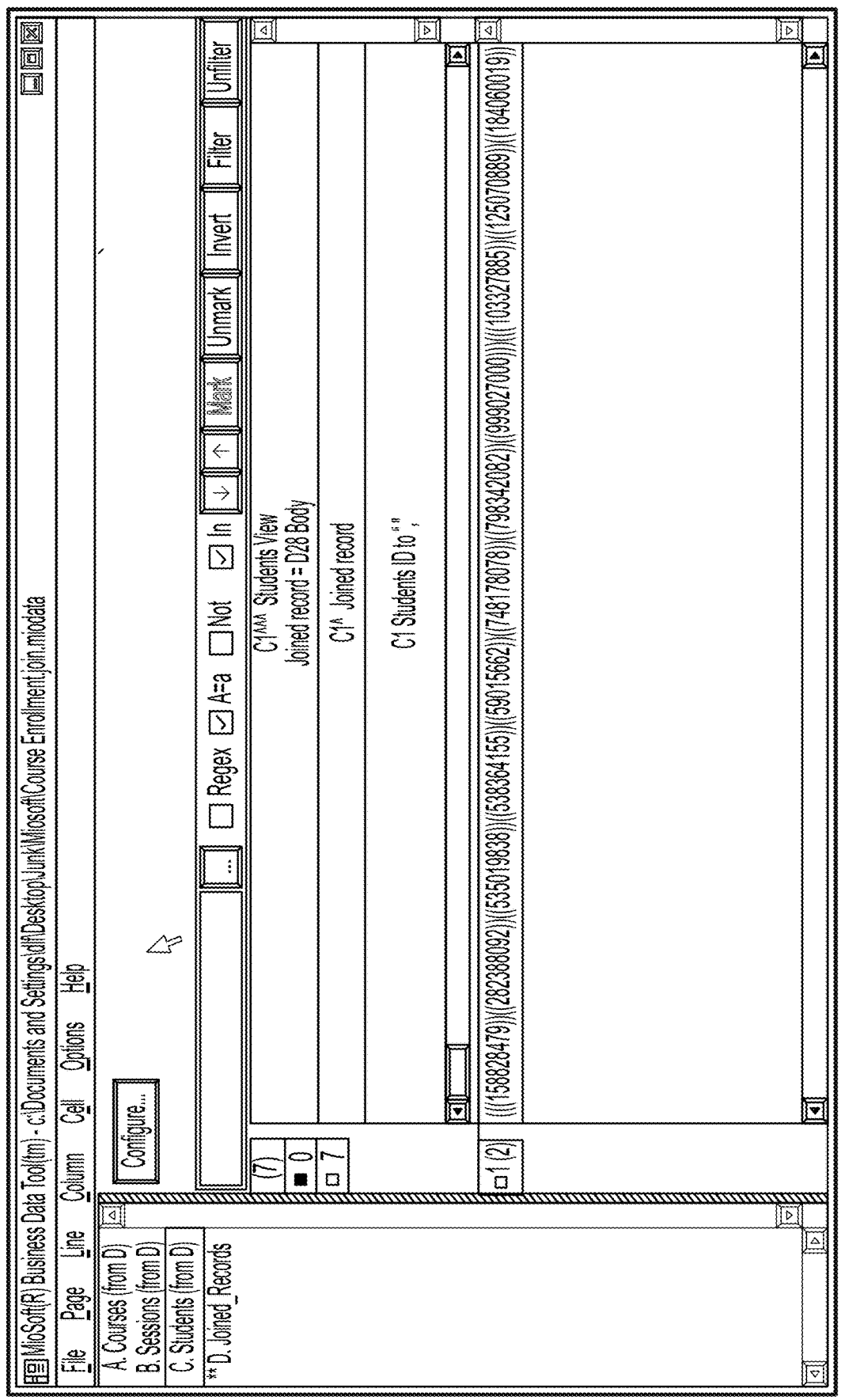

For example, as shown in FIG. 11, suppose the user is interested in the course Configurable Parser, represented by the second record of file D, and so marks that record and filters the file accordingly, leaving that single record displayed. Now suppose the user is interested in the detail about students registered in that course. By simply clicking on file C. Students in the pane 104, he is immediately presented with the data shown in FIG. 12, which is a single record showing all of the detailed information about students registered in the course. In addition, when the user causes the application to analyze the records for a given column for frequency statistics, the analysis carries over immediately among the views A, B, and C, as well as the view of file D. For example, suppose that, after marking and filtering on record 2 in file D, the user performs a frequency analysis on the student information in that record and gets the results shown in FIG. 13.

Therefore the integrated file produced by the join all feature enables the user to more easily view, analyze, and understand the data, the data sets, and their relationships, including repetitions that may exist.

The tool described here can be implemented on a wide variety of software platforms running on a wide variety of hardware configurations, using data sets and integrated files stored on a wide variety of storage devices.

Other implementations are within the scope of the claims.

For example, a wide variety of user interface styles can be used to display the records or other data of source data sets of the integrated file. Similarly, a wide variety of user interface devices can be provided to enable the user to mark and unmark records, filter or unfilter records, analyze and display frequency statistics, create and undo joins, create the integrated file, and view pieces or all of the data sets, the records, and the fields. The headings used to identify the fields could be displayed in different ways. Information about repetitions can be illustrated to the user in a variety of ways.

By pre-generating index information about the records of any kind of file that contains records, it is possible to enable a user to (among other things) navigate, view, scroll, mark, filter, and manipulate the file and records of the file extremely rapidly even though the file has an arbitrary file format and is very large (millions or billions of records or more) and even though the file (and even the index information) cannot all be stored in memory at once.

We describe two example applications that provide such capabilities. One is in the form of viewer, the other in the form of a migrator. By embedding the pre-generated index information with the records in an enhanced file, the viewer may provide these capabilities to the user immediately upon his loading the file, without requiring any preprocessing. The enhanced file can be transferred easily among users. The migrator, in addition to providing the capabilities to the user, also enables the user to take any arbitrary set of records and have the index information pre-generated and bundled with the records in an enhanced file, which can then be viewed on any other instance of the migrator or the viewer.

Figure 15:
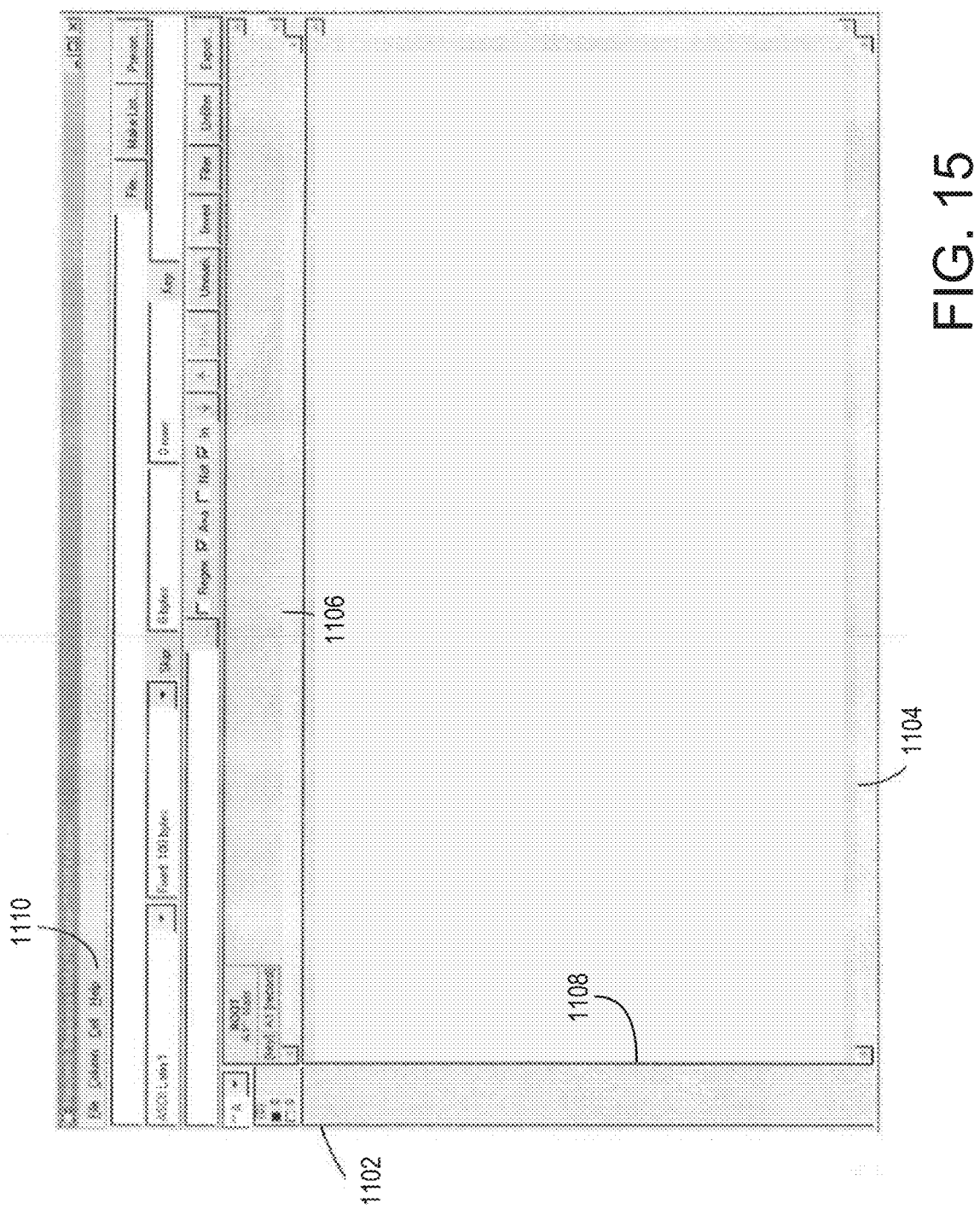

The user interfaces for the viewer and the migrating tool are similar. As shown in FIG. 15, the user interface 1102 for the migrating tool (sometimes called simply the tool) includes a data pane 1104 that is scrollable in both dimensions, a field pane 1106 that is also scrollable in two dimensions, a marking pane 1108, and a menu bar 1110.

A stream of data organized as records can be loaded into the tool whether or not it is in a native format used by the tool. The viewer can only open a file of data records that is in the native format used by the viewer.

To open a file that is in the native format, the user selects "open" from the "file" menu, navigates the file system to find a desired file, and opens it.

Figure 16:
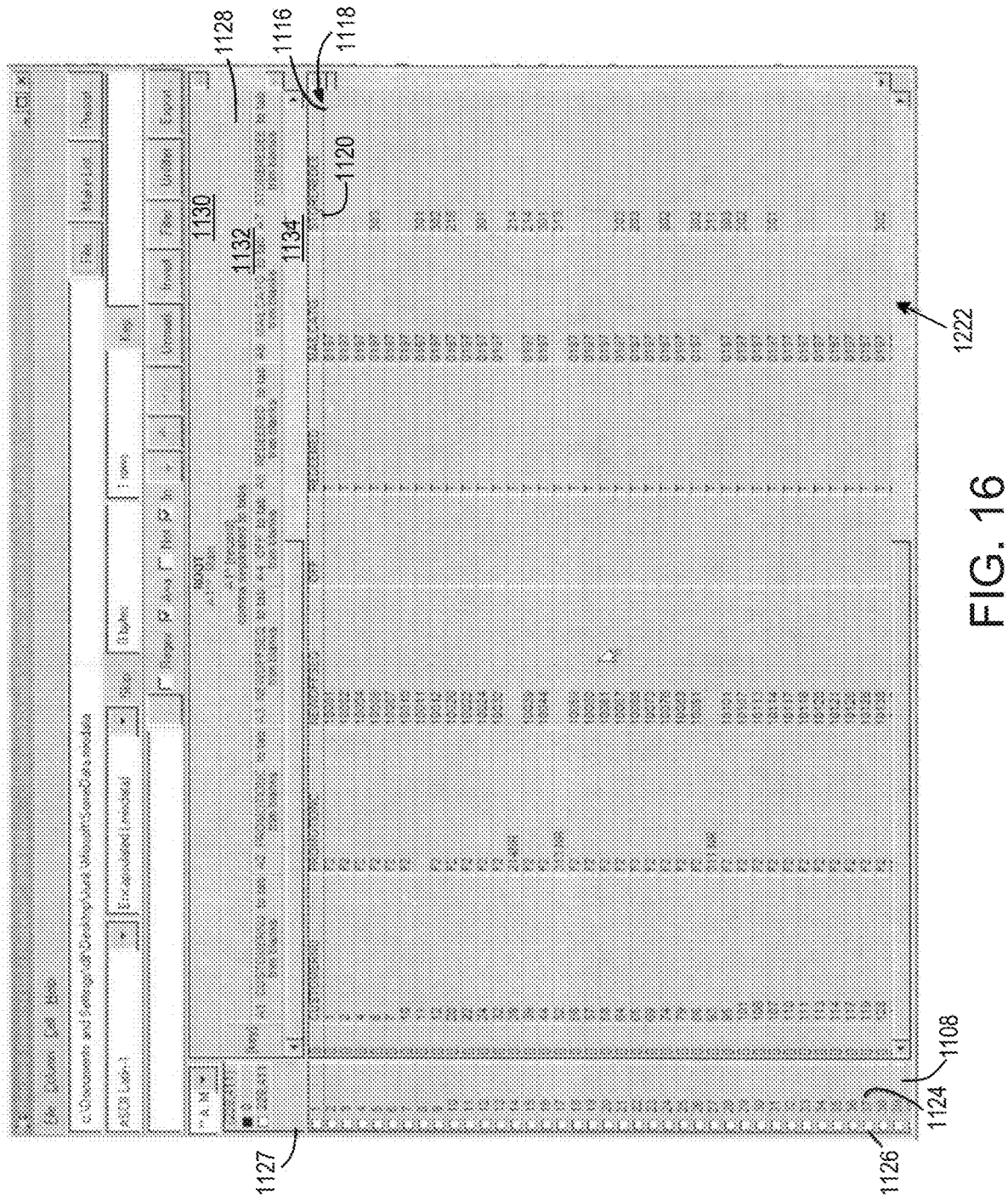

As shown in FIG. 16, when the file is opened, the program populates the data pane with a portion of the records of the file, one line 1116 per record. The first line of the data pane 1118 displays the names 1120 of the fields represented by the columns 1122 of the display. Although, in this example, the names occur in the first record of the file, that need not be so. In the marking pane 1108, an index number 1124 associated with each of the records is displayed next to a check box 1126 that indicates whether that record has been marked or not. A small tally pane 1127 above the marking pane shows the total number of records in the file and the numbers that have been marked (black box, in this case none) and not marked. Records can be marked and unmarked individually by hand using the cursor and marked and unmarked automatically in other ways.

The field pane 1106 contains information that represents a hierarchical tree that defines relationships among fields of the records of the file. The levels of the hierarchy are represented by rows 1128 of information displayed in the field pane. The top row 1130 is the root of the tree and represents the "key level" of the file. The second row 1132 in the example represents all of the records of the file. The third row 1134 in the example represents individual fields of the records of the file. Information about each of the levels of the hierarchy is set forth next to the title of the item of the hierarchy, as shown.

Not all of the fields of the data are shown in FIG. 16. The hidden fields can be exposed using the horizontal scroll bar under the field pane or the horizontal scroll bar under the data pane.

By right clicking on any of the field identifiers in the field pane, a context sensitive menu 1140 opens to list actions that can be performed, for example, with respect to that field. The same menu is also available by invoking the "column" entry in the menu bar.

Figure 17:
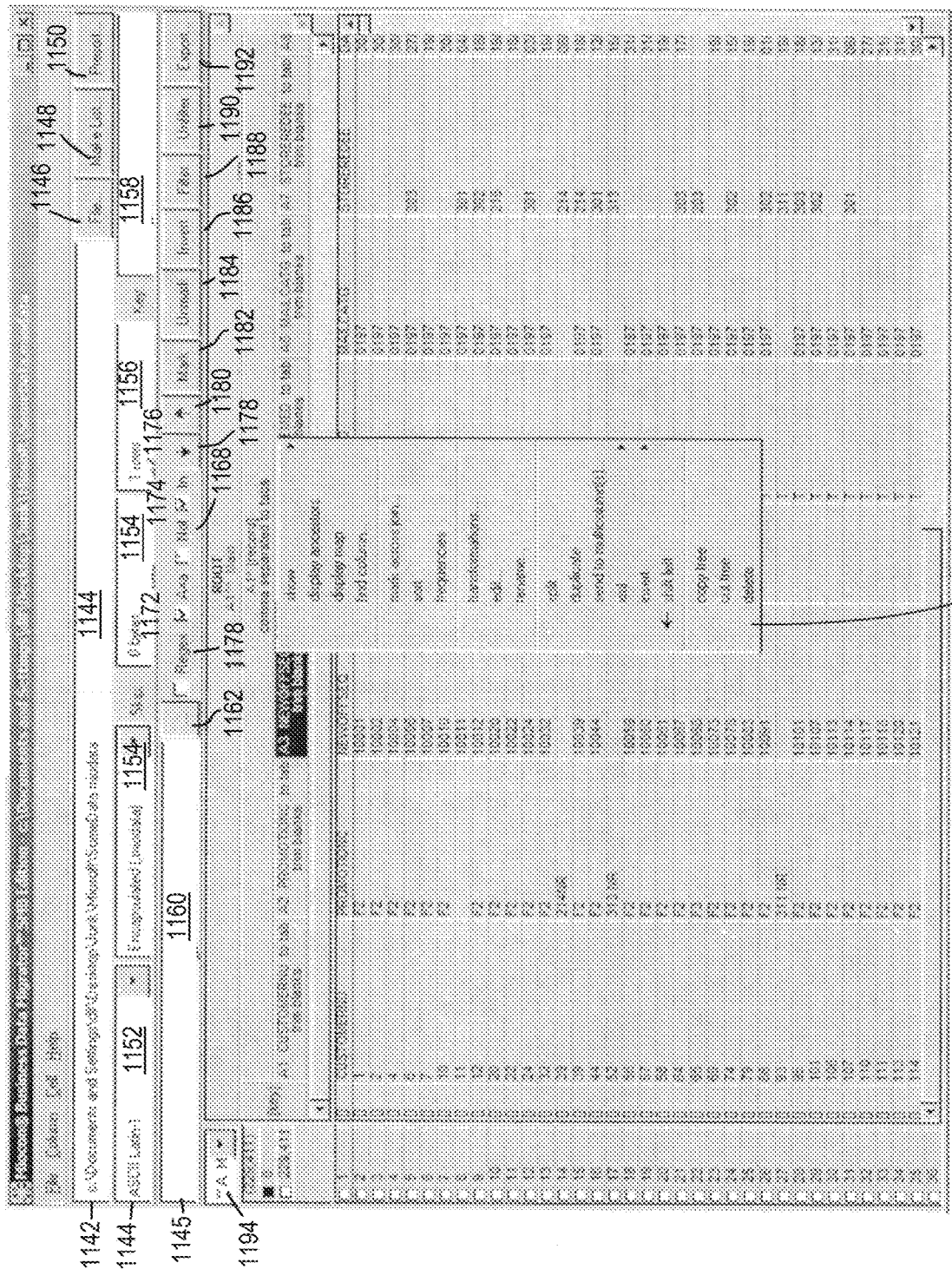
Figure 18:
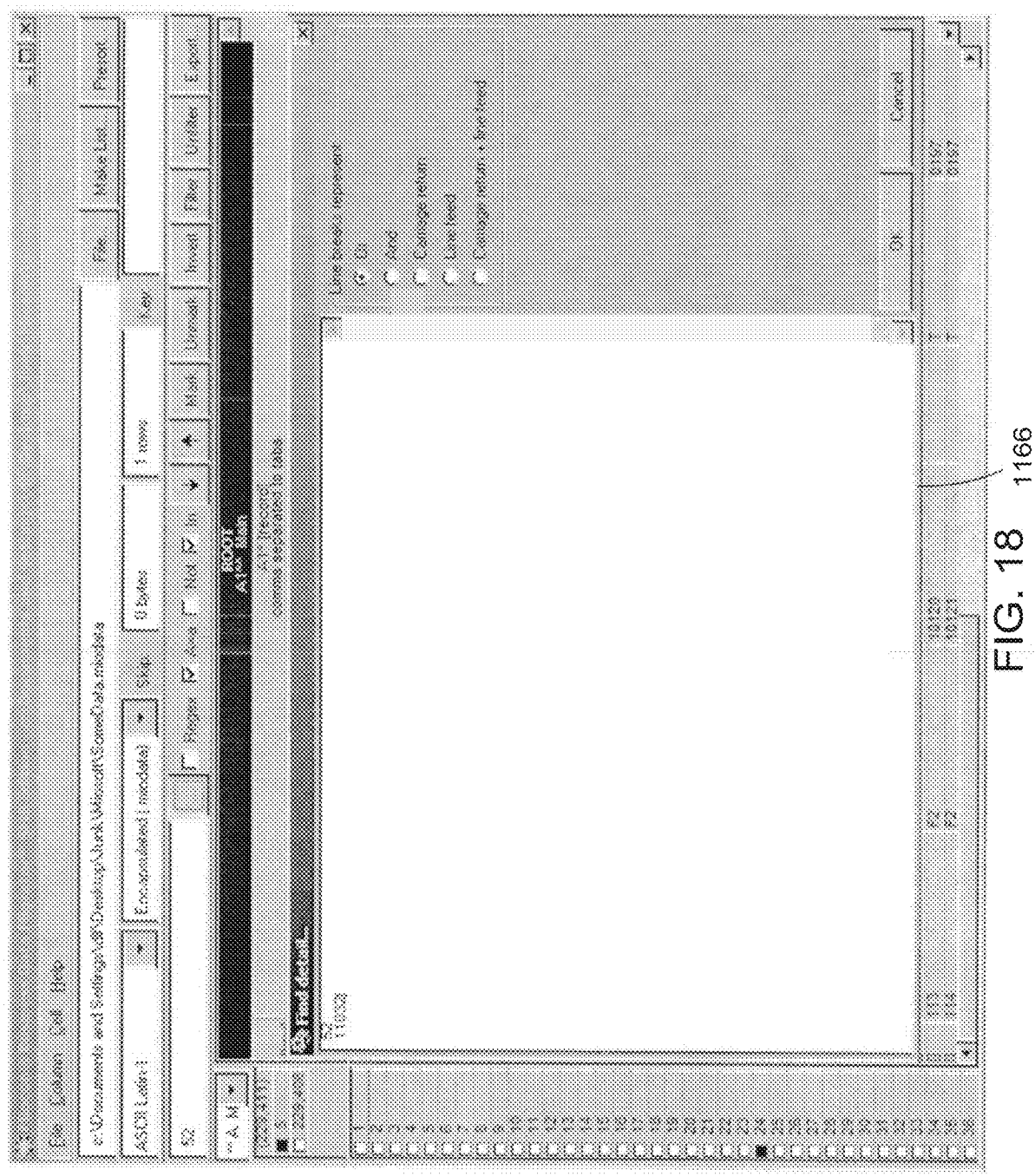

Only about 35 of the records (of a file of 229,411 records) are shown on FIG. 17. The user can scroll almost instantaneously to display any other group of records anywhere in the file using the vertical scroll bar on the right side of the data pane. Other features allow records to be selected, filtered, or sorted. In each case, a portion of the records that result from the operation appear very quickly on the screen.

Additional information and functions are made available to the user through three rows of controls 1142, 1144, 1145 near the top of the user interface of the tool. For the viewer application, only the third row is displayed.

In the tool, row 1142 includes a text box 1144 containing the path in the file system to the file whose data is currently displayed. The file can be selected either using the "file" "open" function with respect to files that are in the native format (this is the only way files are opened in the viewer), or the "file" button 1146 to the right of the text box with respect to any kind of file that contains records in any format, native or not.

Also in row 1142 are a "make list" button 1148 and a "presort" button 1150.

In row 1144, a drop down list box 1152 enables a user to specify a character set that is being used in the data. Another drop down list box 1154 enables the user to specify the way in which the records of the file are delimited, for example, fixed length, size prefixed, delimited, XML, or native format (in the example shown in FIG. 17, the native format—encapsulated (miodata)—is indicated).

The next box 1154 enables the user to indicate a number of bytes to skip at the beginning of the file and the next box 1156 that a number of the records at the beginning of the file should not be treated as data records, for example, because they are field headers (in the example shown, one header row is skipped, hence the dark line under the first row). The final box 1158 in row 1144 contains the key of the data records.

Row 1145 (which is also present in the viewer's user interface) is a row in which the user can control a search of the records. A first box 1160 enables the user to enter either a single row search criterion (for example, a number or a date). By invoking a button 1162, the user is presented with a dialog box 1166 (FIG. 18) that allows more complicated search criteria to be entered.

Returning to FIG. 18, the dialog box includes a pane in which the search criteria may be entered, one criterion per line and a set of radio buttons 1168 that define how the line breaks in the pane are to be interpreted. Continuing along the search specification row 1145, a Regex button 1170 indicates that the search criterion should be treated as a regular expression, an A=a button 1172 indicates that the search should be case-insensitive, a Not button 1174 indicates that the search should find records that do NOT match the criteria, an In button 1176 indicates that the search should find occurrences of the criteria anywhere within the data (for example, embedded, as opposed to constituting an entire field value).

Up and Down buttons 1180, 1178 execute a search through the records (up or down, respectively). Mark button 1182 marks all visible records matching the search criteria. Unmark 1184 removes all marks. An Invert button 1186 marks all visible records not already marked and unmarks all the rest that were previously marked. Filter and Unfilter buttons 1188, 1190 remove (make invisible) and restore (make visible) to the display all of the records not marked. Unfilter also restores the original order of the records if a sort has been performed by the user. An Export button 1192, which is not present in the user interface for the viewer, causes a dialog box to open in which a user can control the export of the file in a native format for use in viewers and tools. Non-native formats are also supported, such as delimiting records by line breaks.

Figure 20:
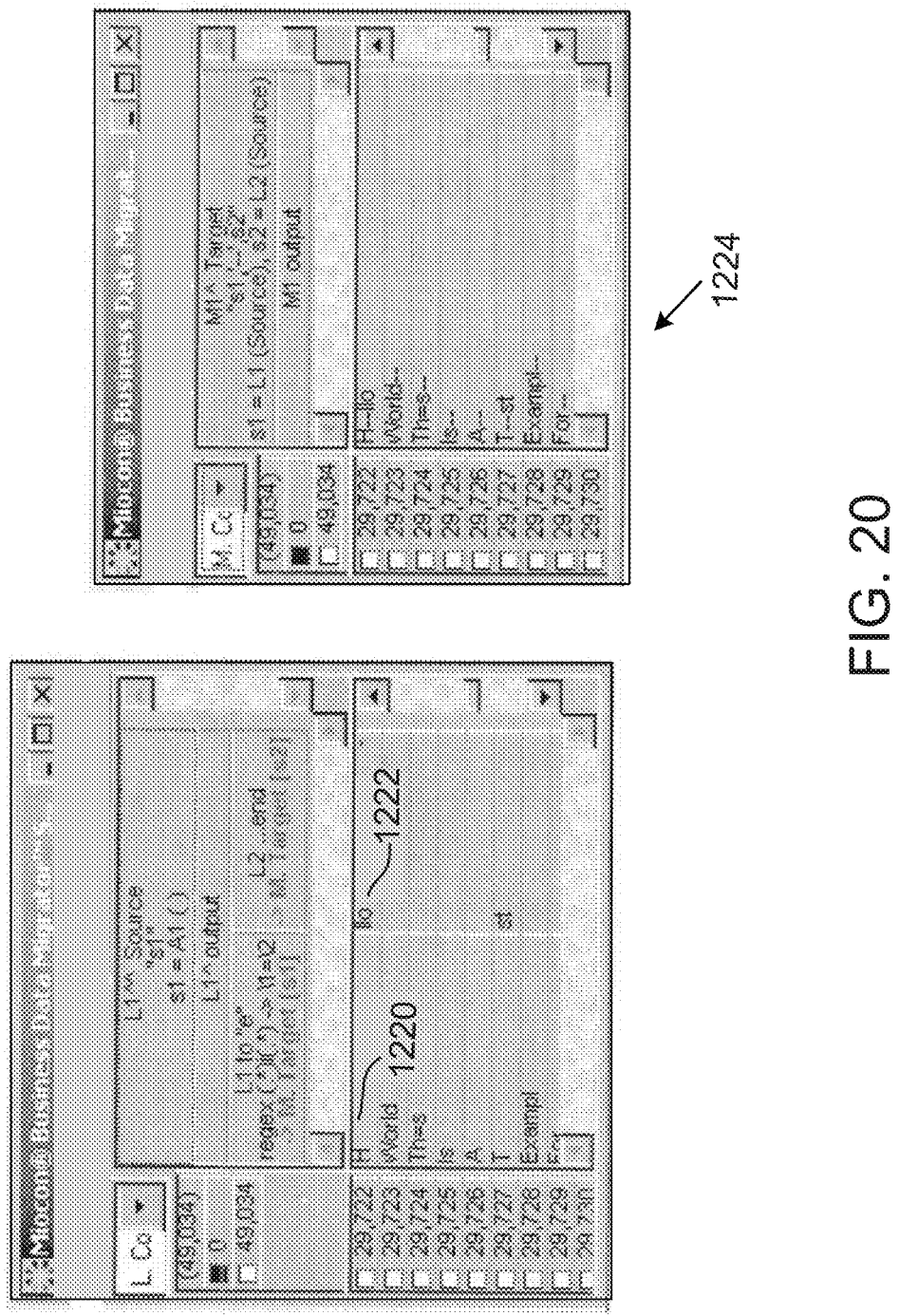

A small drop down box 1194 just above the tally pane is a multi-column edit (MCE) as illustrated in FIG. 20.

A feature of the tool and the viewer is the enabling of very fast scrolling even through arbitrary very large delimited files. Arbitrary files include files that, for example, are not in a predefined format (such as a proprietary database file or word processing file). Very large files include those, for example, for which the file (and even information about each record in the file) is too large to be kept entirely in memory at one time. Very large files may include millions or even billions of records or more. Delimited files, for example, include those for which the size of the records is not fixed.

The ability to scroll very rapidly through such a file may be achieved by automatically creating a persistent index associating a number for each record with a starting location of the record and using the persistent index to facilitate the scrolling.

Figure 19:
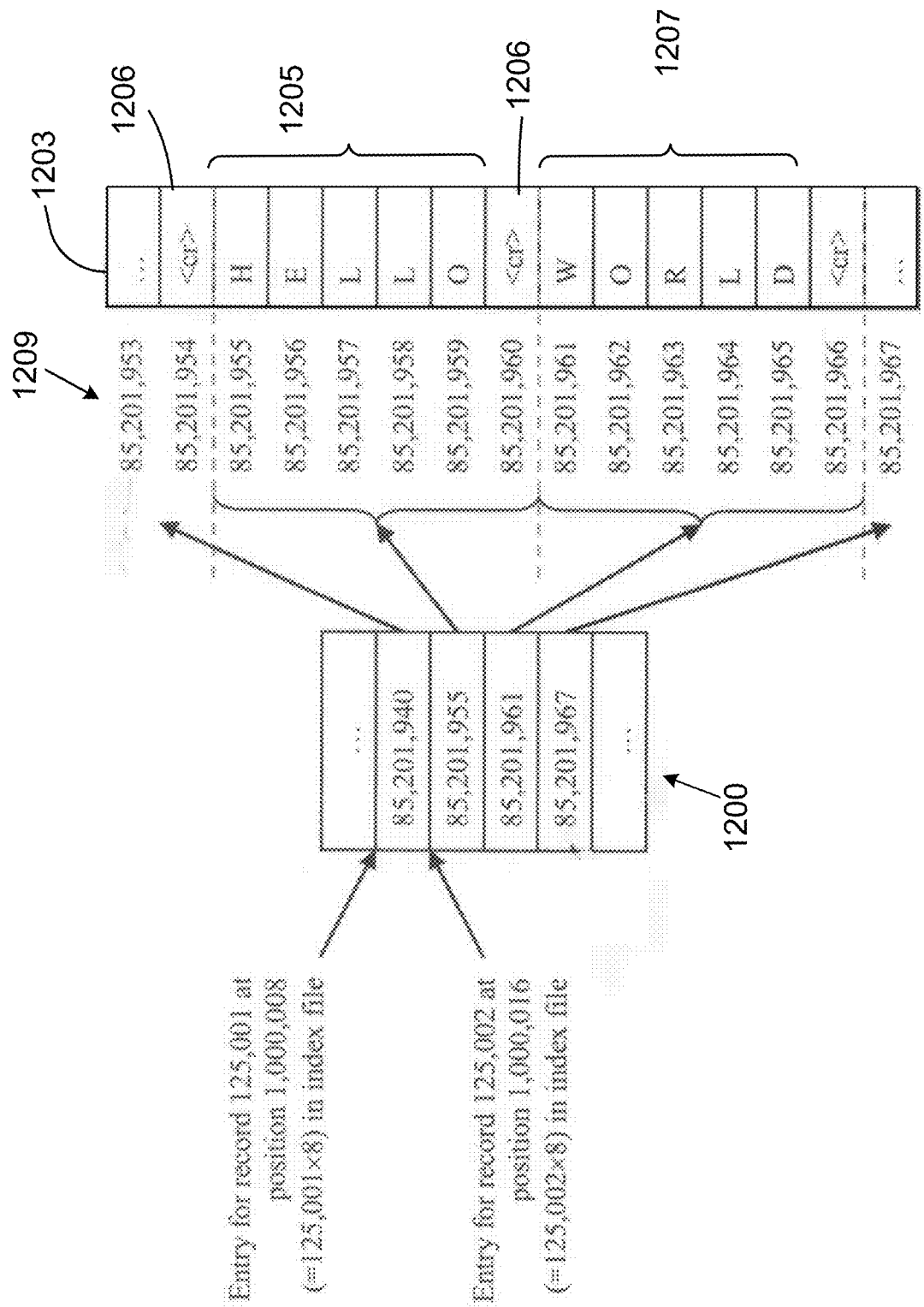

When the user asks to view a delimited file (either in the viewer or in the tool), the file is scanned for the specified record delimiter character. At the same time another file is created, which we will call the index file. An example of a portion of the structure of an index file 1200 is shown in FIG. 19. The index file consists of a series of 8-byte integers 1202. The delimited file is an ordered series of characters 1203. The successive characters may be thought of as having successive positions 1209 in the file. Groups 1205, 1207 of successive characters represent records of the file. Successive records of the file are separated by the delimiter character 1206 (in this example, a carriage return).

At the start of scanning of the delimited file 1204, a zero (not shown) is written to the index file to indicate that the first record of the delimited file occurs at position 0. As each successive delimiter character 1206 (in this example, a carriage return) is encountered in the delimited file, the file position immediately after the delimiter (which is the start of a record) is recorded as an 8-byte integer 1202 in the index file. When the end of the delimited file is reached, the index file will consist of a series of 8-byte integers, representing a sequence of positions in the delimited file at which the successive records begin. The index file has a series of positions each position corresponding to one of the records of the delimited file, each of the positions being the start of one of the 8-byte integers in the index file.

At this point, one can determine the number of records in the file by dividing the index file's size by 8 (the number of bytes in the index file for each record in the delimited file). In addition, given a record number, that is, the number of the record in the sequence of records in the delimited file (say 125,001), one can multiply it by 8 (to get 1,000,008), seek to that position in the index file, read the 8-byte integer stored there (in the example, 85,201,940), then seek to that integer offset in the delimited file. The record can then be read immediately by scanning the bytes from that position in the delimited file up to the next delimiter. Alternatively, one can avoid this scan and simply fetch all of the bytes of the record at once, by reading the next 8 bytes (if present, in the example 85,201,955) from the index file. That integer represents the start of the next record, so subtracting one yields the last byte of the current record.

To display a screenful of data (the number of records that can fit on the screen), the application intercepts the "repaint" event from the operating system and handles it directly. The application examines the current scroll position to determine which record should be displayed at the top of the list, and then uses the above technique a number of times needed to extract just those records needed to repaint the window. If a repaint event is asking for only a portion of the window to be repainted, the application avoids fetching records outside of the vertical range that needs to be redrawn.

Thus, the task of fetching records from the delimited file and repainting the screen to show some portion of them is made very quick and simple by the use of the created index file. One only needs to know the number of the record in the delimited file that is to be the first record shown on the screen.

Other techniques can be used for files that are in file formats other than those having records delimited by a character. For example, during scanning of the source file, record boundaries can be determined using regular expressions (The REGEX feature), using nested XML tags, or using bytes at the start of each record indicating the record's length. A file of fixed length records is handled without the need for a separate index file or a pre-pass to determine record positions by simply multiplying the record number times the fixed record size to locate the starting position of a record.

The file indexing mechanism described above does not demand significant storage disk resources. One or occasionally two buffers are adequate to hold the data needed from the index file for repainting a window. A contiguous region of the delimited file must be read from disk when redrawing, but a modern operating system's disk cache easily contains this. For example, displaying 50 records where each is approximately 200 bytes in length consumes 50×200=10,000 bytes of disk cache, which is trivial. Very large records or a very tall window may increase the demands on the disk cache.

Processing and storage resources are also conserved by processing records dynamically prior to their display. A record might be processed by separating it into pieces (subrecords) by scanning it for another delimiter character (e.g., a comma). It might be processed by being divided into pieces of fixed length. The resulting subsections can themselves be further processed. One can also apply transformations such as one that uses regular expression matching to locate and replace specific patterns.

As the user scrolls the window, the records are fetched from disk as needed, but are passed, one at a time, through the processing steps that the user has chosen. The resulting values are displayed in a grid, with one record occupying each row.

The processing steps involved in, for example, separating records into pieces, processing the records or the pieces, applying transformations, and other processing selected by the user or done automatically, need only be applied dynamically to those records that are fetched to be displayed at a given time.

As shown in FIG. 20, a "multi-column" edit facility brings together multiple pieces of data 1220, 1222, from different parts of each record. That concept is called a "multi-column edit". A multi-column edit is fed data from one or more parts of a record, and applies some processing to it, such as simple concatenation, or execution of a formula to produce a resulting column 1224 of data related to the record.

Additionally, only those processing steps that are necessary for displaying columns that are visible are executed. Columns that are scrolled off the left or right sides of the window do not execute their processing steps until and unless they are scrolled back onto the visible region of the window.

As mentioned earlier, the user is given the ability to mark selective records of interest in an arbitrary very large file, including the ability to change what is marked by marking more records and/or unmarking some records at a latter time. The user can then choose to view only the marked subset of records or the unmarked subset of records.

Figure 21:
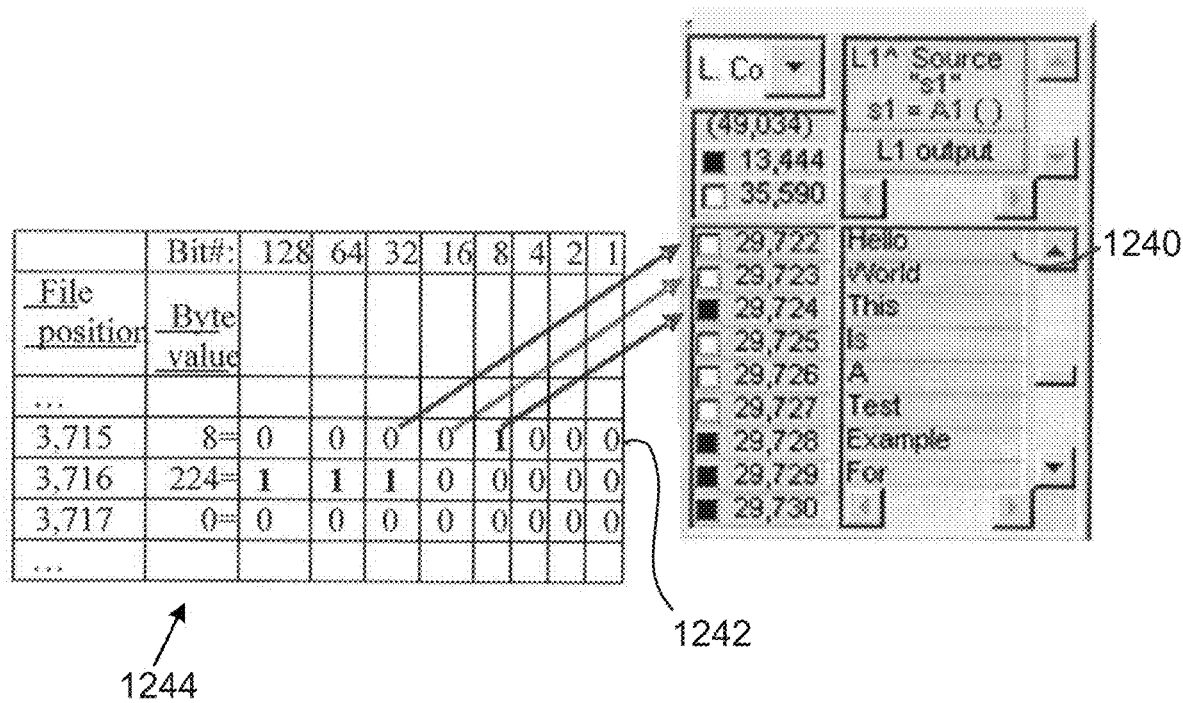

As shown in FIG. 21, a bit vector containing one bit per record is used to track the marking or unmarking of records. In the example shown, each of the records 1240 has a corresponding bit (1 or 0 for marked or unmarked) in the bit vector 1242. The bit vector is shown expressed as a series (rows) of 8-bit bytes in a series of positions 1244. The value of each byte expresses the marked or unmarked status of eight of the records.

For sufficiently large files, the bit vector is backed by a file on disk to avoid consuming inordinate amounts of memory. The threshold is currently set near 20 MB, which corresponds with approximately 160,000,000 records. Files smaller than this use a memory-based bit vector, and files larger than this use a bit vector stored on disk.

For a file of millions or billions of records it is frequently impractical for a user to manually mark each record of interest. To address this, marking can be done automatically based on a pattern. As explained before, controls in the user interface permit the user to enter and control a search pattern. This pattern may be a regular expression, a specific string, or the disjunction of many strings. Additional user interface elements control which of those choices is the correct way to interpret the search pattern, whether the pattern must match an entire cell of the grid or is allowed to occur as a substring, whether to be case sensitive or insensitive, and whether to negate the sense of the matching.

Figure 22:
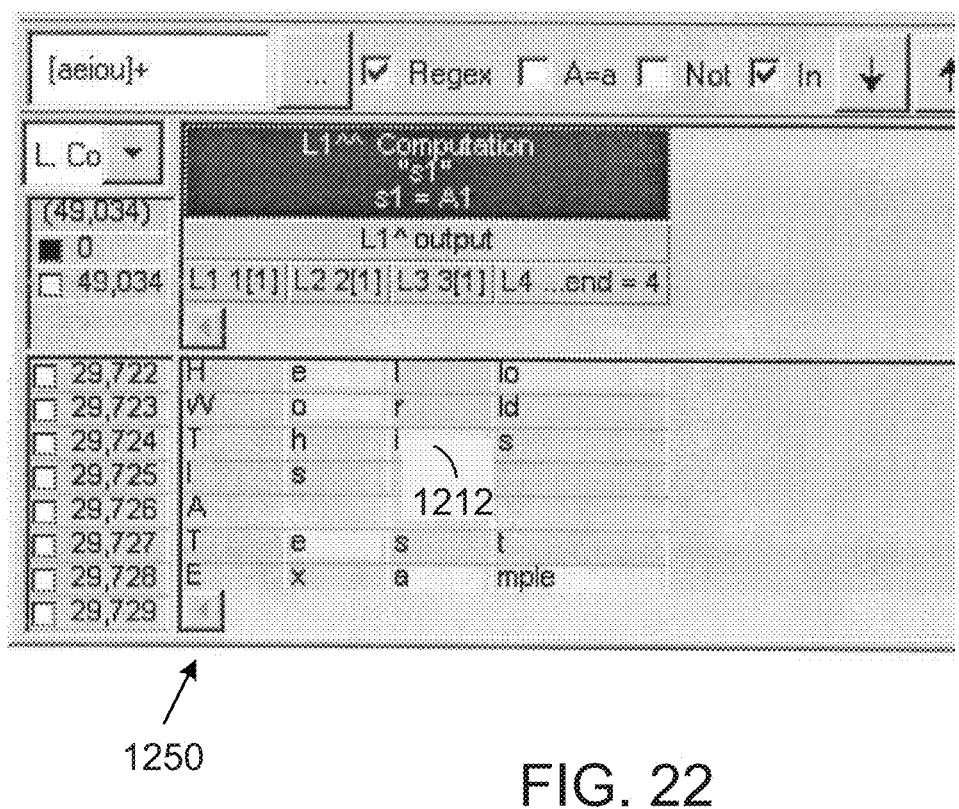

As shown in FIG. 22, in the case of a pattern, once the pattern has been specified, a column (or multiple columns) 1250 may be selected. Matching occurrences 1252 of the pattern are immediately highlighted in the column. This is accomplished in a similar manner to the mechanism for scrolling through a large file. For those columns that are selected, an additional processing step is performed that tests whether the string that is to be displayed in a cell matches the search pattern. If so, highlighting is applied to it. When a different column is selected, the window is simply redrawn.

Figure 23:
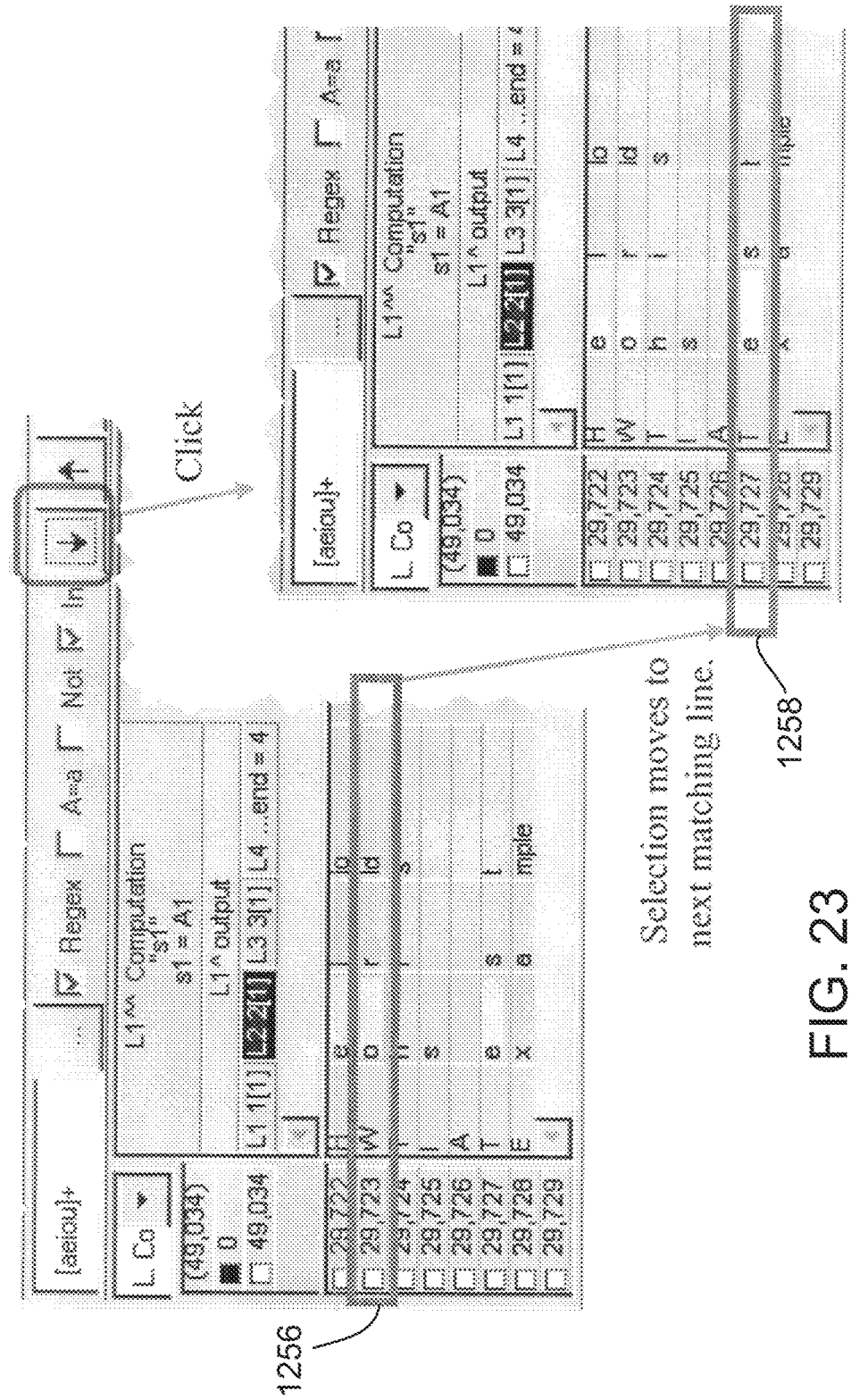

Also available to the user are "next" and "previous" buttons, labeled with a down-arrow and an up-arrow respectively. As shown in FIG. 23, when "next" is pressed, the records are examined starting at the currently selected line 256 (if any, otherwise the first record), progressing downwards (i.e., in increasing record number order). Each record is tested to determine whether the value that would be displayed for that record in the selected column matches the search pattern. If so, the window is scrolled to make that record 1258 visible, and that row is selected. If the records are exhausted without a match, the selected row (if any) is deselected and the window flashes to indicate the absence of a match. Pressing "previous" is similar, but the search proceeds in the opposite direction, starting at the end of the file if no row is selected.

Figure 24:
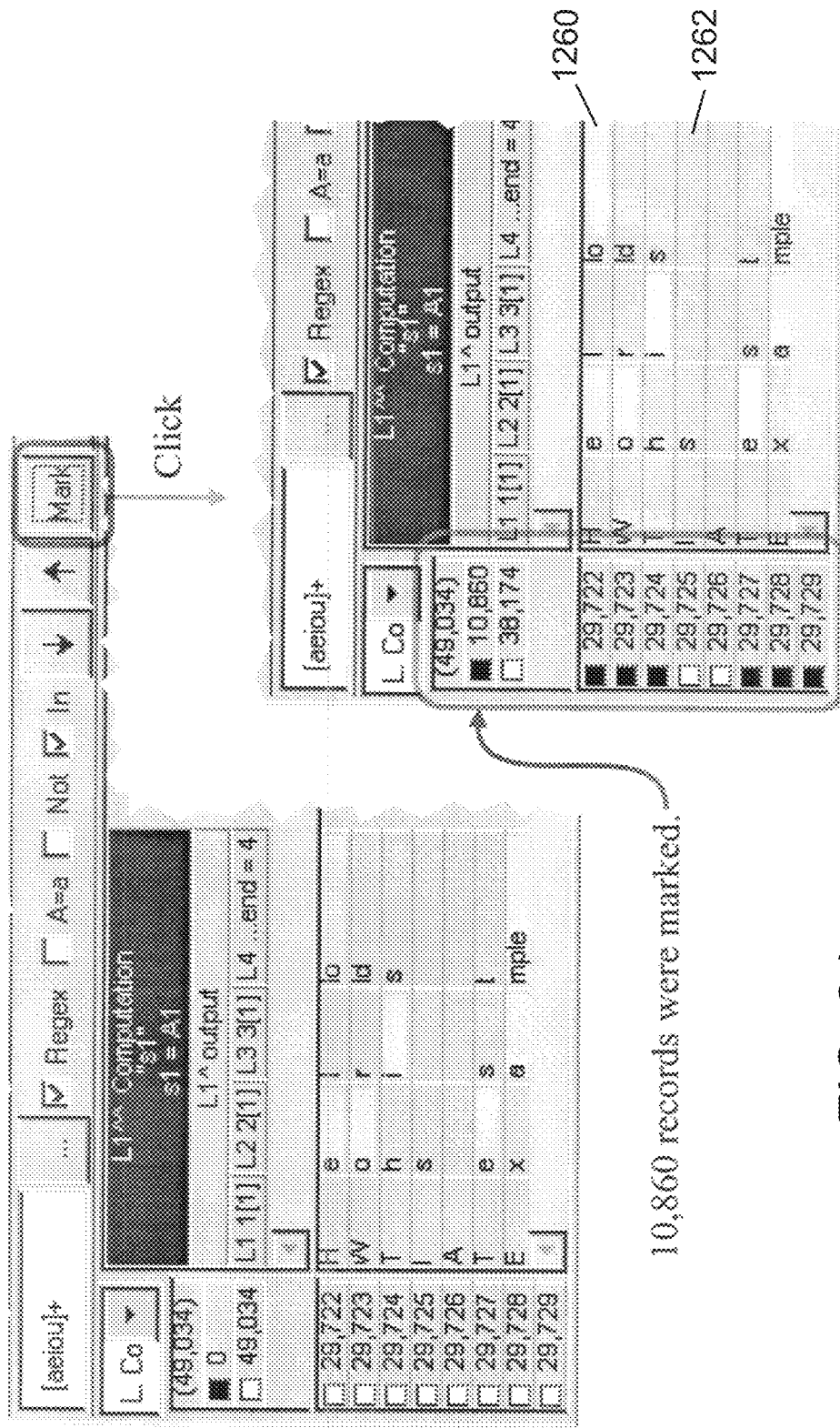

A button labeled "Mark" causes the entire file to be scanned. As shown in FIG. 24, for each record that is found to have a matching value in the selected column, that record 1260 is marked. Non-matching records 1262 are unaffected, which allows an "or"-like behavior. For example, one could first mark records that match pattern 1 and then match records that match pattern 2. The resulting marked records are those that matched either pattern 1 or pattern 2.

A button labeled "Unmark" causes all records to become unmarked.

A button labeled "Invert" causes all marked records to become unmarked, and all unmarked records to become marked. This capability, when combined with the "or"-like behavior of marking, provides an "and"-like behavior. If one marks everything not matching pattern 1 (by negating the sense of the matching as mentioned above), then marks everything not matching pattern 2, then inverts the markings, one ends up having marked only those records that match both pattern 1 and pattern 2 simultaneously.

The viewer and tool also enable a user to filter the viewed records of an arbitrary very large file to include (in the filtered set) only those that are marked. A subset of the filtered records can then be marked. Besides being able to mark records, a button labeled "Filter" allows a user to hide all unmarked records. "Unfilter" reveals all hidden records. The tally of marked and unmarked records is updated to reflect the results of filtering and marking as applied to the whole file of records.

Records that are hidden are never examined or processed when using "Next", "Previous" and "Mark". In addition, the "Invert" button operates only on the visible set of records. The "Filter" button can be used even when some records are hidden. In this case, the hidden records remain hidden, and all visible unmarked records become hidden.

Figure 25:
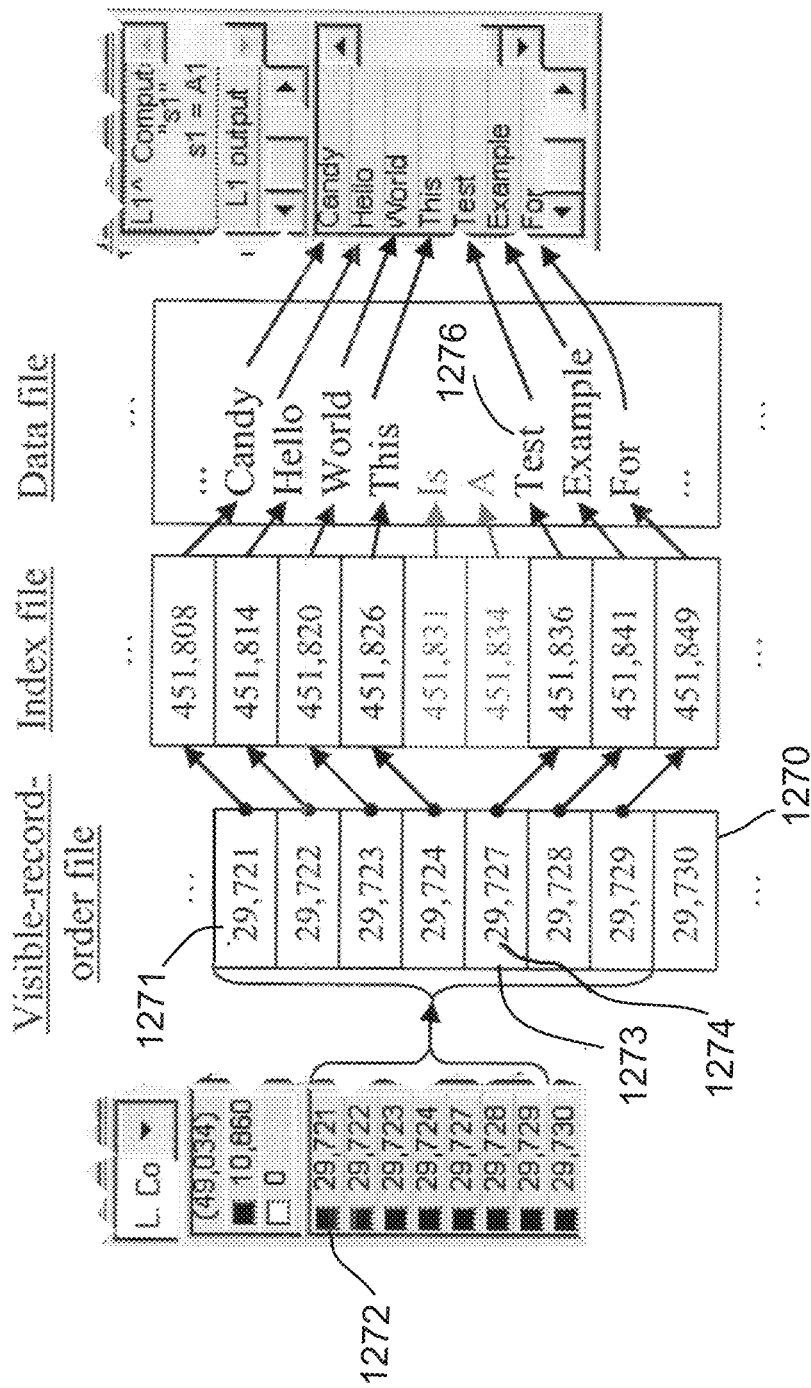

As shown in FIG. 25, in order to support scrolling through a file in which some records have been hidden, another disk file, "visible-record-order", is used to hold a list 1270 of the numbers of the visible records 1272. The record numbers 1271 are 8 bytes each. To determine the $N^{th}$ row 1273 to display on the screen, this disk file is positioned to N×8, and an 8 byte record number is read. This record number 1274 is looked up in the index file and data file as above to get the actual record data 1276, which is then processed as above to produce the data to display in the window. The number of rows visible (useful for determining the scroll bar position and size) is the size of this file 1270 divided by 8.

On-screen sorting allows one to select a column and re-order all visible rows so that the values for the column occur in ascending order (no collation policy, just raw Unicode sequences). The order of records is maintained using the "visible-record-order" disk file. For example, if its $J^{th}$ 8-byte entry is the value K, then the $J^{th}$ record from the top of the list is the $K^{th}$ record in the file.

Operations sensitive to visibility (Next, Previous, Mark, Invert, Filter) can scan the visible-record-order file in order, 8 bytes at a time, to produce record numbers. As each record number is read, the corresponding record can be read using the previously described mechanism. Although this doesn't guarantee dense reads, it at least visits the records in increasing record order, assuming an on-screen sort has not been performed.

The index file described above may be saved with (or without) the file of records to preclude the need (and delay) to create the index file when the viewer (or the tool) is first started for subsequent viewing.

In cases for which the index information is to be saved with the file records, a new file format, called the "miodata" file format, is used. A miodata file contains index information, record data, and metadata. There are two examples of different miodata formats, distinguished by a version number at the start of the file.

Figure 26:
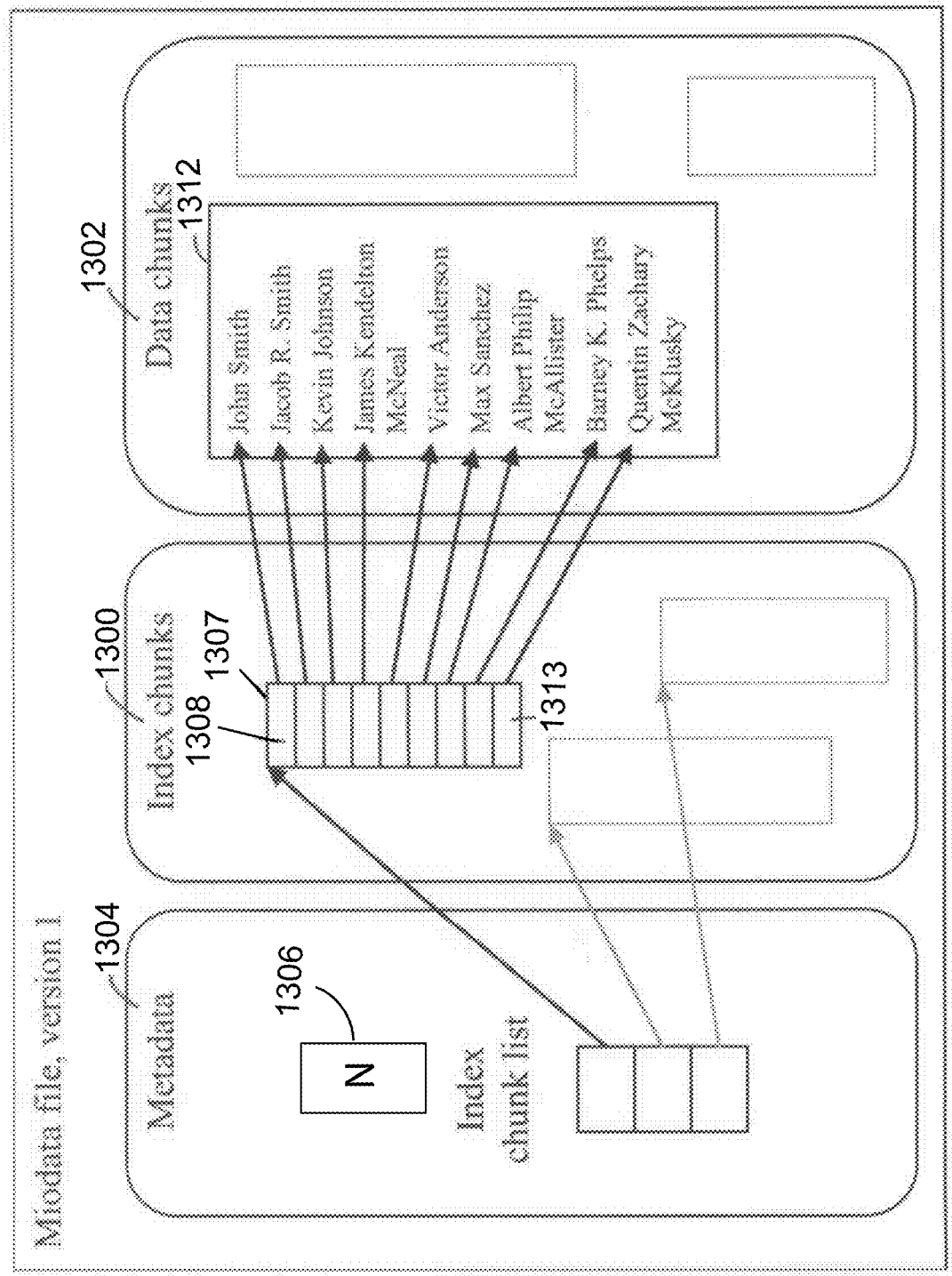
Figure 27:
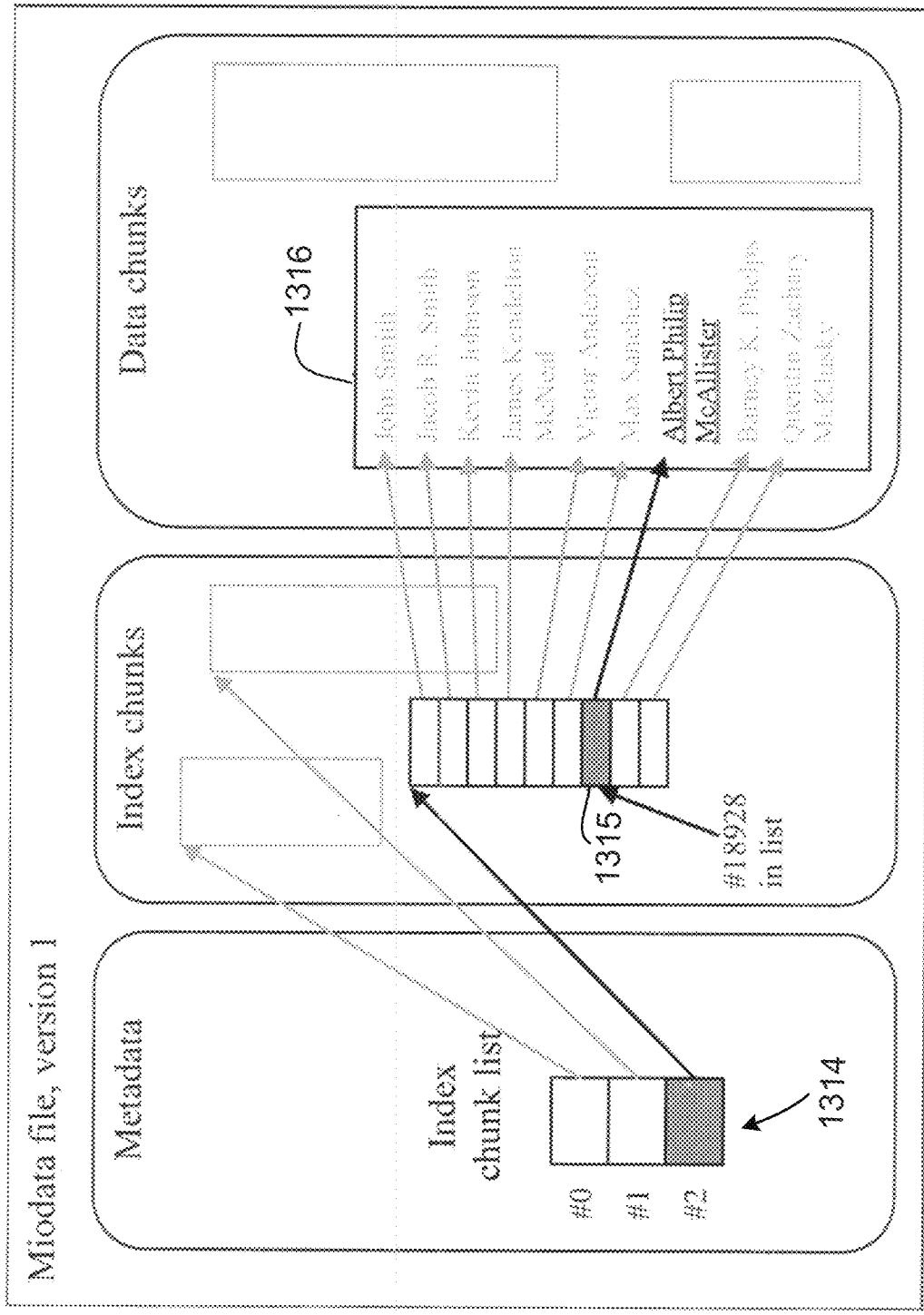

As shown in FIGS. 26 and 27, the first miodata format is the simpler of the two. It consists of an alternating sequence of index chunks 1300 and data chunks 1302, followed by metadata 1304. The index chunks are of equal size and index N records, except the last chunk, which may be shorter. The index chunk size N 1306 is stored in the file's metadata area and typically indexes 65,536 records. The program that creates miodata files can produce files for special purposes with much smaller or much larger index chunks. Each index chunk 1307 contains a list of N+1 (typically 65,537) absolute 8-byte file position values 1308 that identify the starts of records 1308 within a corresponding data chunk 1312, that is, there is a one-to-one mapping of index chunks and data chunks). The $N+1^{st}$ entry 1313 of the index chunk points to just past the end of the $N^{th}$ record of the data chunk, to eliminate a boundary condition and simplify the access protocol.

To retrieve record K, you divide K by N to find which index chunk to look at. You then look at the 16 bytes starting at offset 8×(K mod N) within the index chunk. Those 16 bytes contain two 8-byte integers, the record start position and one past the record end position. The record data can then be retrieved from that region of the file. The record is in the data chunk but since the record position is an absolute file position, that fact is not needed for retrieving the record.

Referring to FIG. 27, for example, to locate the $150,000^{th}$ entry of a data file, compute floor(150,000/65,536)=2 (where floor is the integer result of dividing the entry number by the index chunk size). Thus, we look at the index chunk list 1314 of the metadata to find a pointer to index chunk #2 (zero-based). We look at position (150,000 mod 65,536)=18,928 of that index chunk, which occurs 18,928× 8=151,424 bytes past the start of the index chunk. The 8 bytes starting at that position 1315 represent an absolute position in the file, giving the location of the start of the $150,000^{th}$ entry's data in the corresponding data chunk 1316.

The index chunks are kept in a small cache. Otherwise, a series of requests to fetch multiple records would cause the operating system to thrash by alternately transferring the page on which an index chunk occurs, followed by the page on which the corresponding data occurs.

Figure 28:
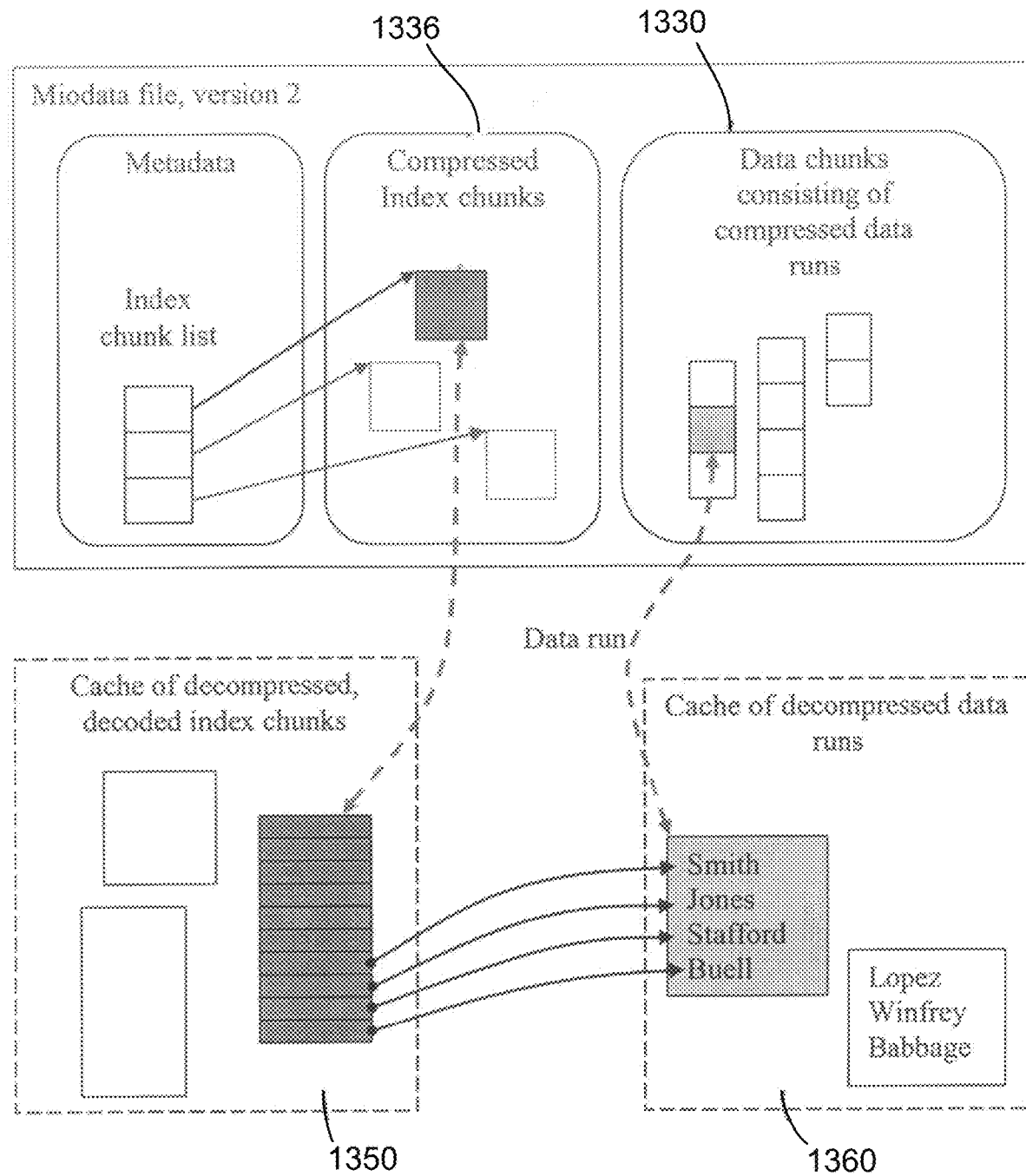
Figure 29:
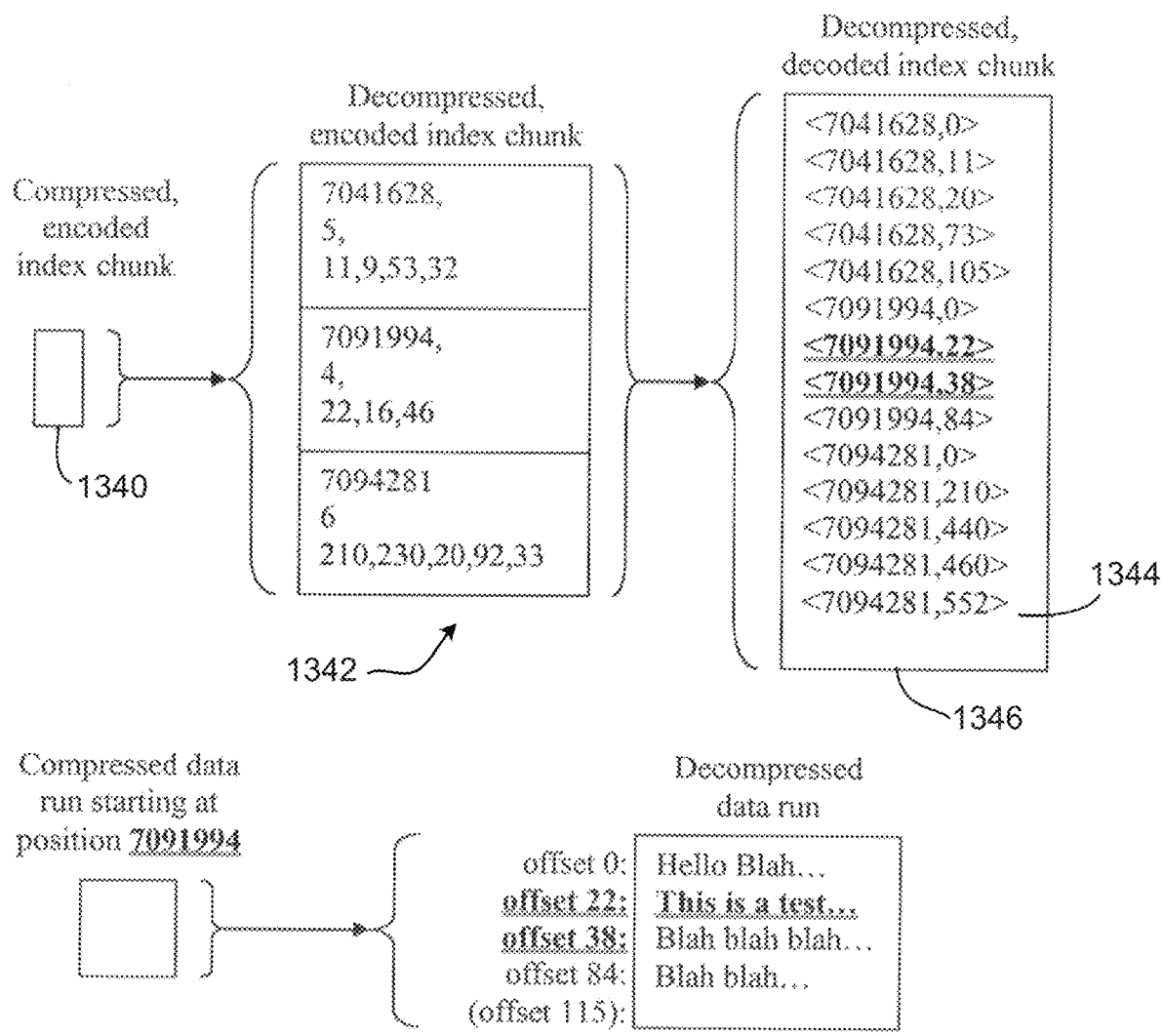

The second miodata file format version is more complex (see FIGS. 28 and 29). The data chunks discussed for the first file format are further divided (but never splitting a record) into data runs. Each data run is independently compressed 1330 using the zlib compression library. In order to keep access to the miodata file responsive, we attempt to place a rough upper bound on how much time it takes to fetch a single record. To ensure this bound is satisfied, a data run is normally no bigger than 65,536 bytes plus one record. This can easily be read from disk and decompressed in a small fraction of a second. Using a significantly smaller data run size would force the compression operations to operate on smaller runs of bytes, potentially yielding less effective compression.

The pointers contained in an index chunk that point to records are no longer 8-byte integers but rather are pairs each consisting of the absolute position of a data run in the file and the offset at which the record starts within the decompressed contents of that data run.

Index chunks 1336 undergo a form of run-length encoding prior to compression. A sequence of references into the same data run is encoded as <start-of-data-run, count, $size_1$, size$_2$, . . . size[count−1]>. The start-of-data-run is 8 bytes, the count is 4 bytes, and each size is 4 bytes (limiting a single record to no more than 4 gigabytes). These sequences are concatenated together and compressed with the zlib library.

Decompression of an index chunk follows the reverse process (see FIG. 29). First, the compressed index chunk 1340 is read from disk. It is then decompressed into another buffer 1342. That buffer is converted from its sequence of <start-of-data-run, count, size1 . . . size[count−1]> entries back into a sequence of <data-run, offset> pairs 1344 in the decompressed, decoded index chunk 1346.

Since data runs are never split across multiple index chunks, it follows that the last entry in an index chunk must refer to the last record in a data run. The data run's size is explicitly recorded with the data run for the purpose of being able to figure out how much data to feed to the decompression routine. Thus, a record's size is determined by one of three cases: It's the last entry of an index chunk. Therefore it's also the last entry of the data run, so the record ends where the data run ends.

The next entry refers to a different data run. Again, since it's the last entry of a data run, the record ends where the data run ends.

The next entry is in the same data run. In this case, the record ends just before the start of the next record.

In any particular file the record sizes often fall within a fairly limited range. Even if record sizes vary wildly, some record sizes will be much more likely than others. Thus, encoding the index chunks prior to compression greatly increases the compression ratio (decompressed size/compressed size). This high compression can be particularly useful when working with many very short records (for example, two numeric strings representing database keys), because otherwise the space used for indexing might dominate the file size. Note that the extreme case is where all records are the same length, in which case the index information takes much less than one bit per record.

Caching is used extensively to reduce not only the cost of reading from disk but also the cost of decompression. There are several caches in play:

The operating system's disk cache.

A small associative cache of decompressed, decoded index chunks 1350 (FIG. 28).

A small associative cache of decompressed data runs 1360.

With these caches in place, scrolling through a miodata file is imperceptibly slower than scrolling through a plain file of fixed length or delimited records, despite the fact that sections of the file are being retrieved, decompressed, and decoded.

Figure 31:
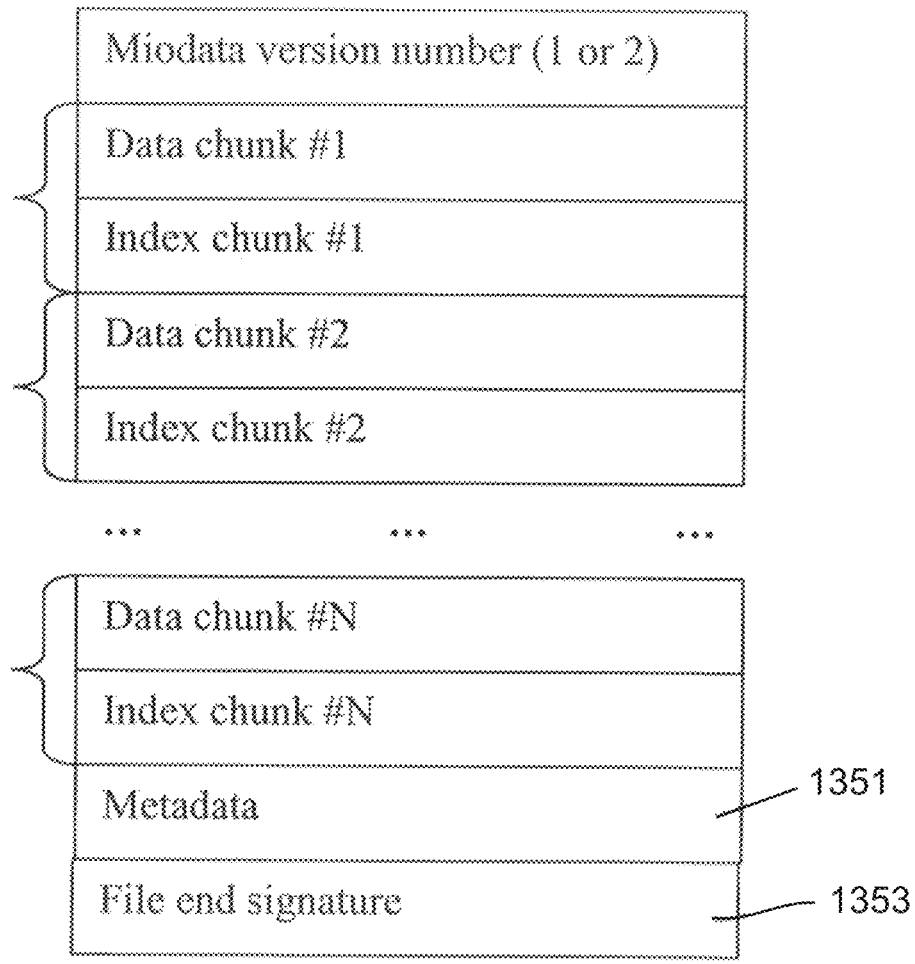

As shown in FIG. 31, in both miodata file formats, the index chunks and data chunks are interspersed in such a way that visiting the records causes the entire file to be read quasi-sequentially. This is to take advantage of the performance boost provided by existing prefetching mechanisms that are found in some operating systems and on some physical disk controllers. While the layout could be made even closer to purely sequential access by interchanging the data chunk and its corresponding index chunk, this must be traded against increased difficulty and time when creating a miodata file. If a typical record is 500 bytes and can be compressed to 50 bytes including overhead, then each data chunk would be ~320 KB on disk. Moving the disk head to the index chunk and back to the corresponding data chunk that precedes it should take ~16 ms on a 7200 RPM drive, limiting throughput to 320,000 KB/16 ms≅20 MB/s, not counting the physical transfer time. A prefetch mechanism more than 320 KB deep would avoid this limitation and only be limited by the transfer of the disk, not the seek speed. However, it's unlikely that decompression and other processing steps would proceed at this rate. Version 1 miodata data chunks would be 3.2 MB and be limited by seek speed to about 200 MB/s, well beyond the decompression rate.

In both variations of the miodata file format, there is a need to capture the list of file positions at which the index chunks occur. Since this is just a sequence of 8-byte pointers, and each chunk usually contains 65,536 entries in version 2 and 65,537 entries in version 1 (representing 65,536 records), we could store the list of index chunk addresses for ten billion records in just over one megabyte of main memory, which is an insignificant cost on modern hardware. Even a trillion records would cost just 100 MB of memory, still acceptable even on modern office computers. The list of positions of index chunks is part of the metadata area 351, and is read into memory in its entirety when the miodata file is opened.

The metadata 1351 also contains a copy of the dynamic processing steps needed to parse and transform rows of data into a visual representation. The viewer uses this portion of the file's metadata to determine how to render the data.

At the end of the file is a sequence of signature bytes 1353, which are checked before attempting to parse any other part of the file. The bytes are an ASCII representation of "eNd<lf>Mio<cr>sOft<lf><cr>PReSOrt<0><255>". These particular bytes were chosen for several reasons. They contain unusual combinations of carriage returns and line feeds, which would be irreparably mangled if the file were to be accidentally transferred by FTP in ASCII mode instead of binary mode. The final <255> byte is present to detect accidental conversion between code pages. The zero is present to protect against accidental interpretation of embedded zeros as an end-of-data indicator (as with the char* implementation in the C language). The word "miosoft" occurs (case mangled with a linefeed in the middle) because it is a registered trademark of MioSoft Corporation, and is therefore unlikely to occur in a file format defined by some other legal entity.

A feature of the viewer and tool is to provide a user the ability (with one pop-up click) to capture and view the number of occurrences of each value of a field and the location of all records containing that value in an arbitrary very large file. The feature works even when the number of distinct values present is very large (theoretical limit $2^{64}$).

Figure 30:
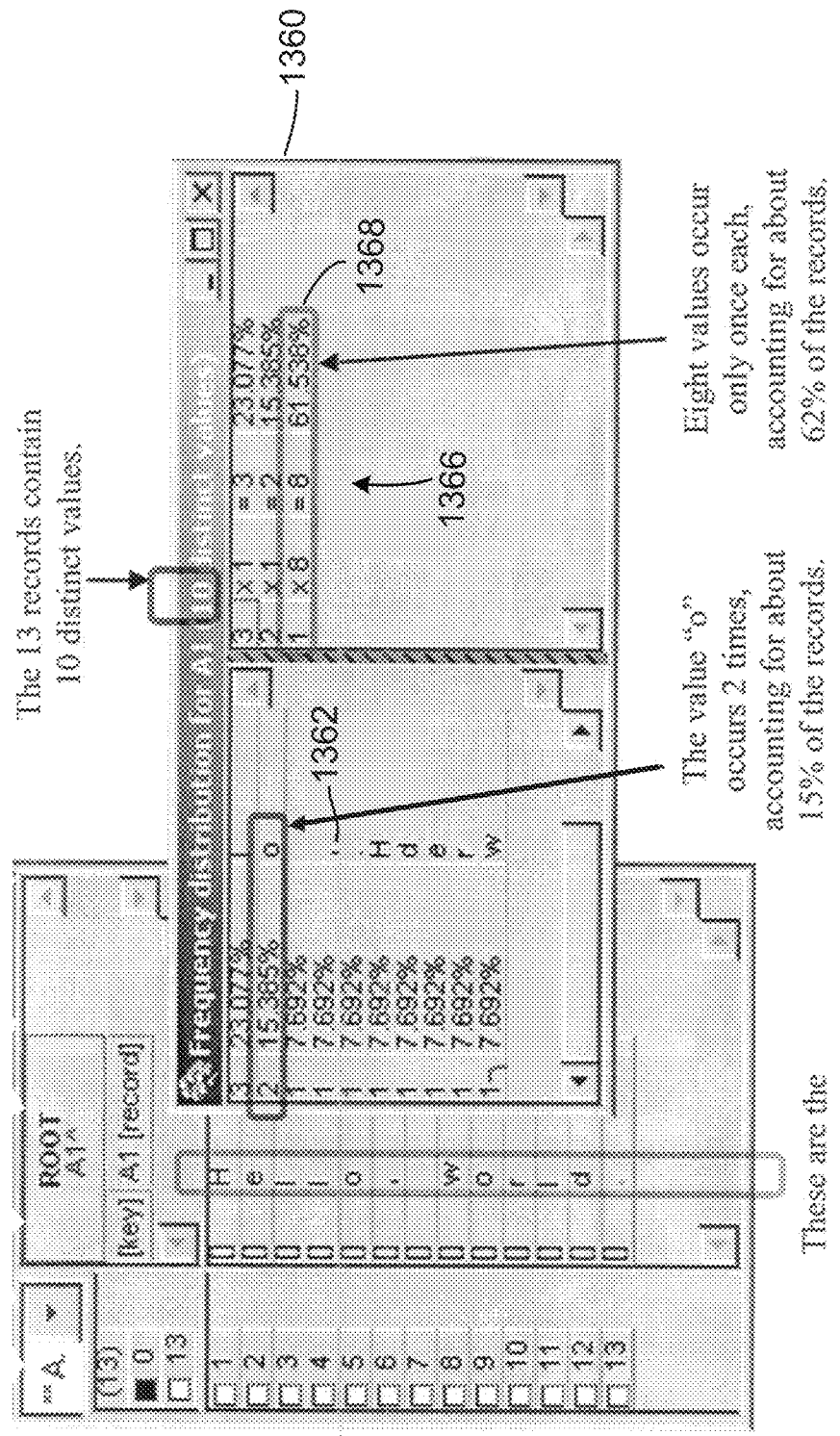

One can select a column and perform a frequency analysis on it. As shown in FIG. 30, that causes a new window 1360 to be opened showing the frequency analysis. The left half of the window contains an entry 1362 for each distinct value that occurred in that column. The entry displays the value and the number of times 1364 it occurs (its frequency). The entries are sorted by descending frequency. Faint separator lines are drawn between successive entries that have different frequencies.

In the right half of the frequency analysis window is what we call the meta-frequency. It contains a list 1366 of all frequencies that occurred in the left half entries, sorted the same way as on the left. Each row 1368 of the right half represents a summary of a contiguous subsequence of rows from the left half that all have the same frequency (and therefore no separator lines between them). The right half contains at most as many entries as there are in the left half.

Figure 32:
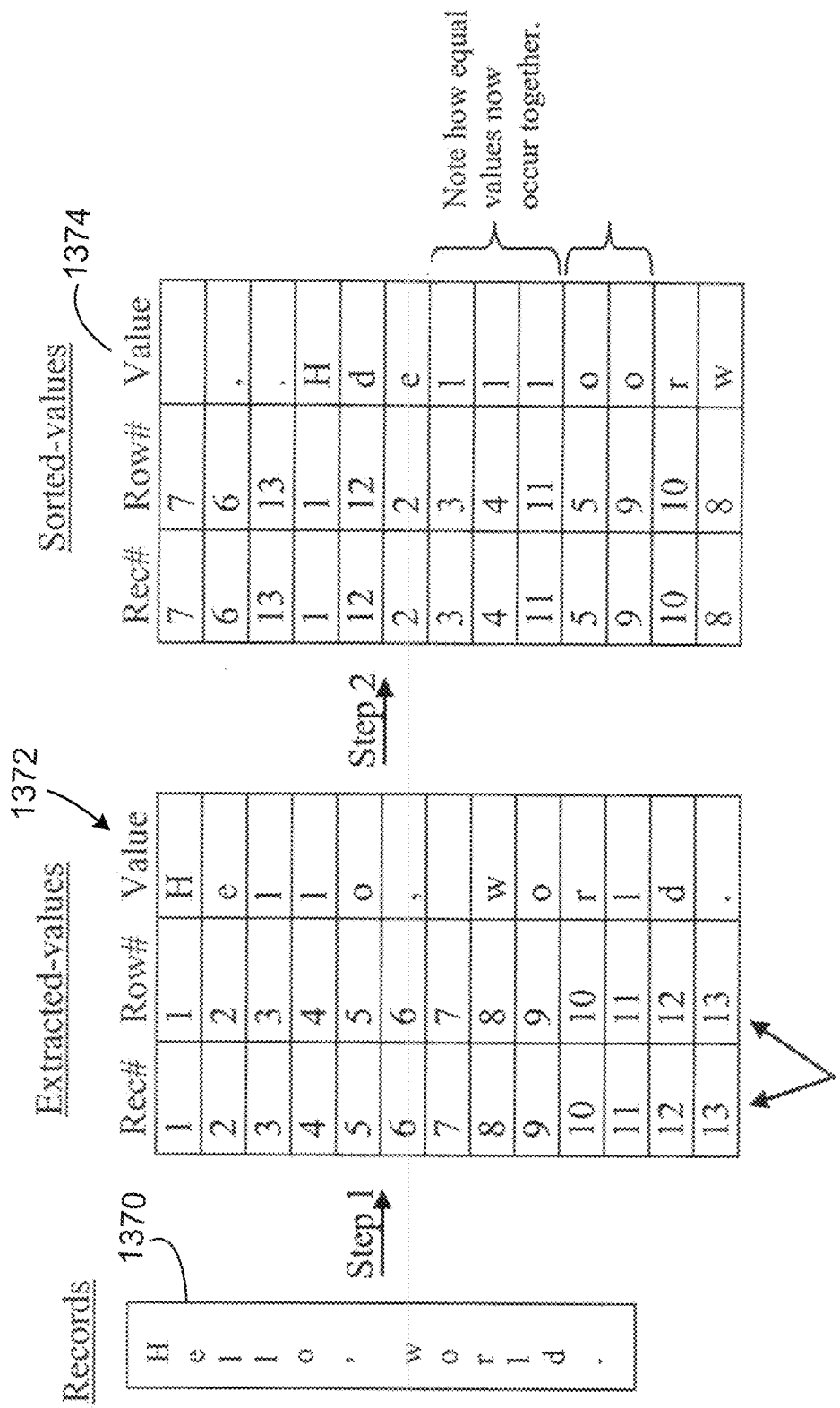

In order to support frequency analysis in the presence of many billions of records, the frequency analysis writes information into files, which are dynamically read while scrolling the left and right areas of the frequency analysis window. Here are the steps:

As shown in FIG. 32, each record 1370 is visited. The value is extracted for the selected column, and the tuple <record-number, row-number, value> is written to a file 1372 called extracted-values. The record-number and row-number will be the same if all records are visible, but if some have been filtered out, the two numbers will be different. The record-number represents which record of the file the value is from, and the row-number is used to express how far from the top of the visible list it occurs. Even in the presence of filtering these are monotonically correlated an increase in the record-number always corresponds with an increase in the row-number and vice versa. In the presence of on-screen sorting, however, this correlation no longer holds.

These extracted-values tuples are then sorted by value to create a sorted-values file 1374. The tuples are the same as for extracted-values, just reordered by ascending value.

Figure 33:
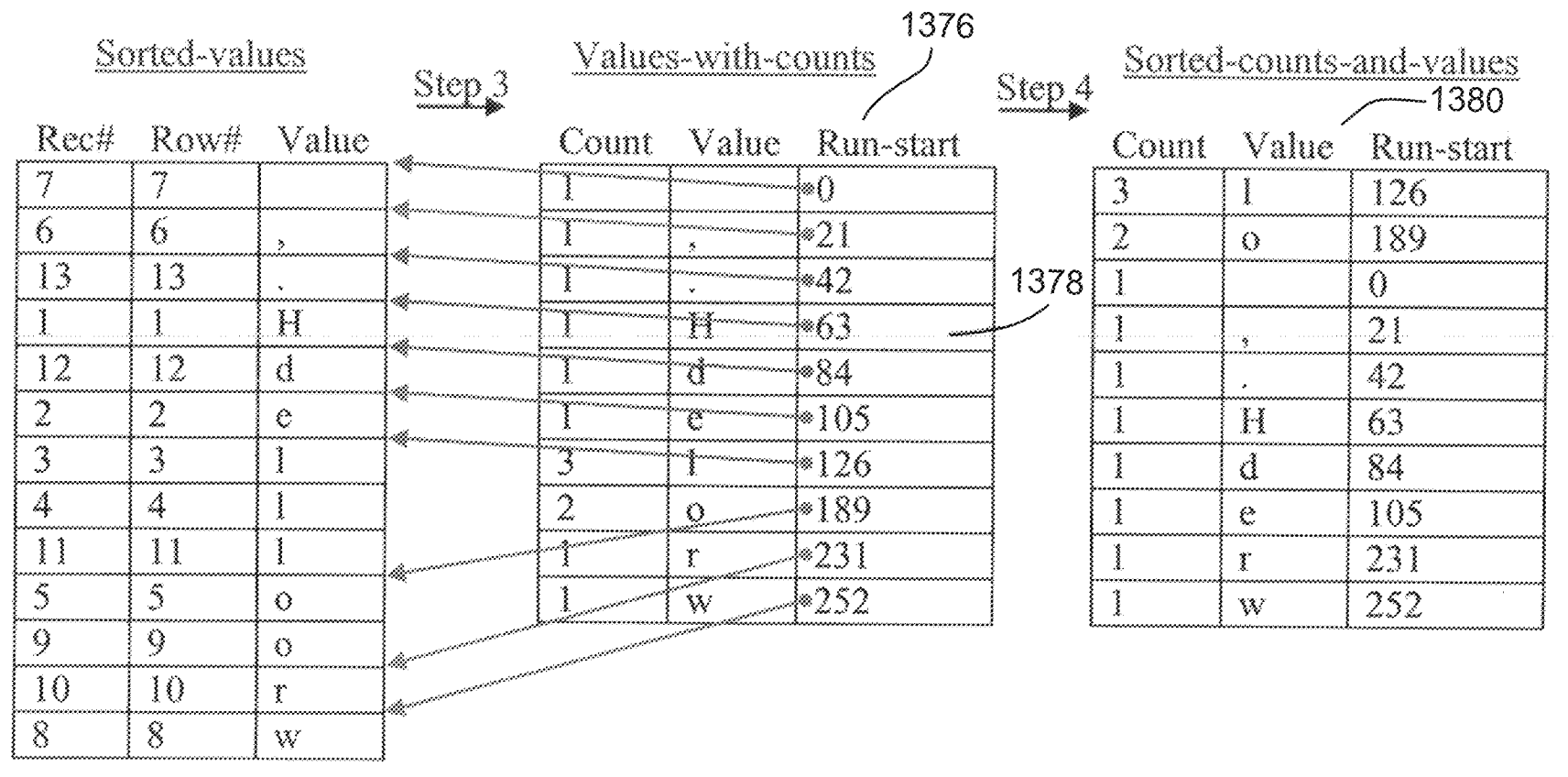

As shown in FIG. 33, the sorted-values file is then scanned, creating another file, values-with-counts 1376. This file consists of triples 1378 of the form <count, value, run-start>, where count is the number of occurrences of the value (determined by a counter that is zeroed every time a different value is encountered in the next sorted-values tuple), value is the value from the sorted-values tuple, and run-start is the file position within sorted-values at which the first tuple with that value occurred.

The values-with-counts file is then sorted by decreasing count to form the sorted-counts-and-values file 1380.

Figure 34:
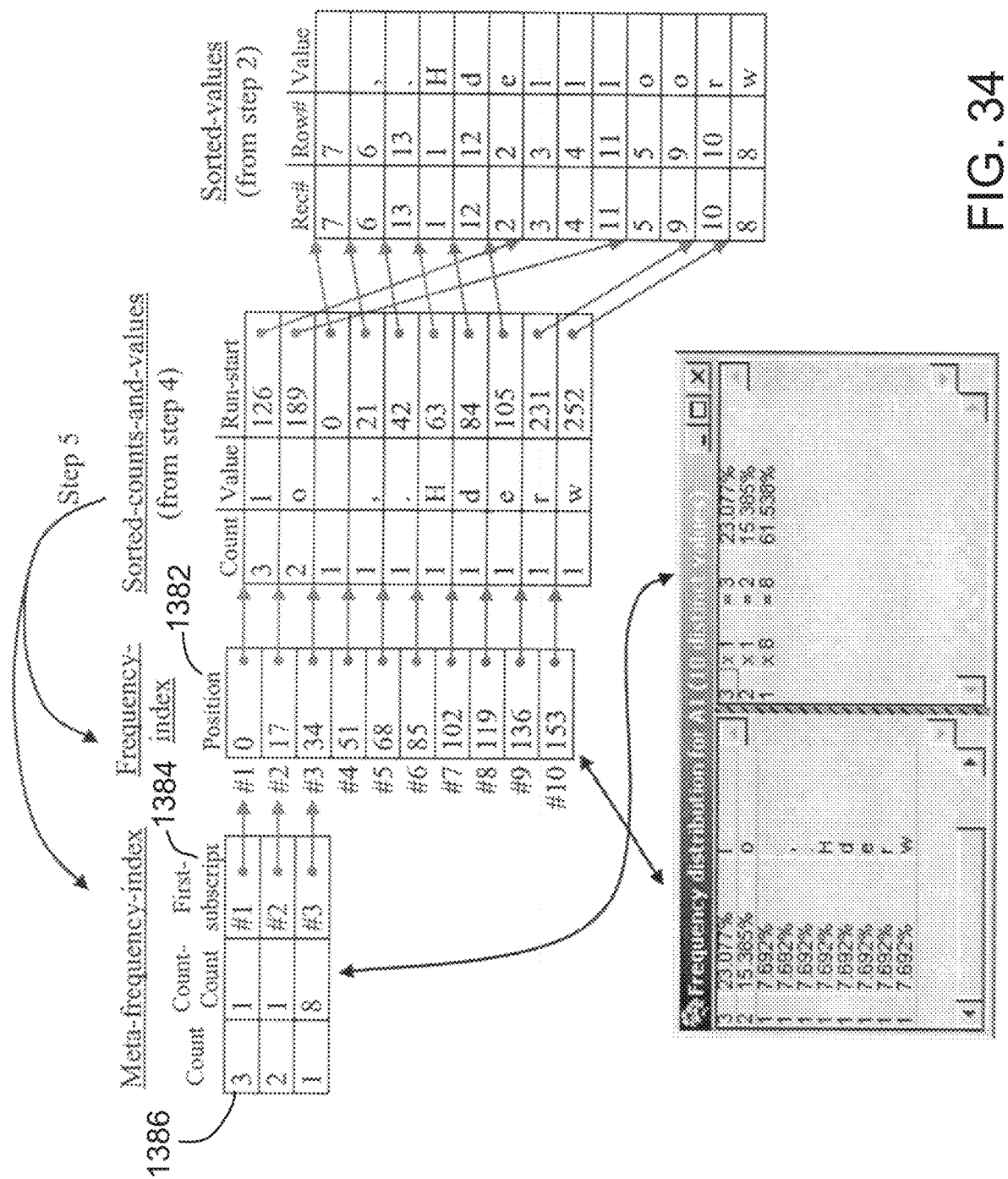

As shown in FIG. 34, the sorted-counts-and-values file is scanned. For each tuple, that tuple's position in the file is written (as an 8-byte integer) to a frequency-index file 1382. At the same time, a meta-frequency-index file 1384 is created that contains fixed-size tuples 1386 of the form <count-count, count, subscript-of-first-entry-with-given-count>.

The frequency-index file allows the left side of the frequency analysis window to be rendered. To draw the $N^{th}$ line in the left half, we read 8 bytes from the frequency-index file starting at N×8, then use that as a file pointer into the sorted-counts-and-values file, which contains both the count and the value to display on that line.

The meta-frequency-index file allows the right half of the frequency analysis window to be rendered as well. The $N^{th}$ line of the right half is found by fetching the $N^{th}$ (fixed-size) tuple from the meta-frequency-index file. The "count" part of the tuple denotes how many times a data value occurred, and the "count-count" part denotes how many times that particular number of occurrences occurred. Multiplying them gives a useful number, the total number of records represented by that line.

We intercept the operating system's repaint events for both the left half and the right half of the frequency analysis window, using the above technique to determine what to draw for each visible row. This is necessary to ensure that an enormous file of mostly unique values does not consume all memory just to keep track of what to display on each line.

The viewer and tool also provide the ability to use step 5 of FIG. 34 to mark records with either a particular value or all values with a particular frequency. Once marked, drill-down and further frequencies are possible.

Figure 35:
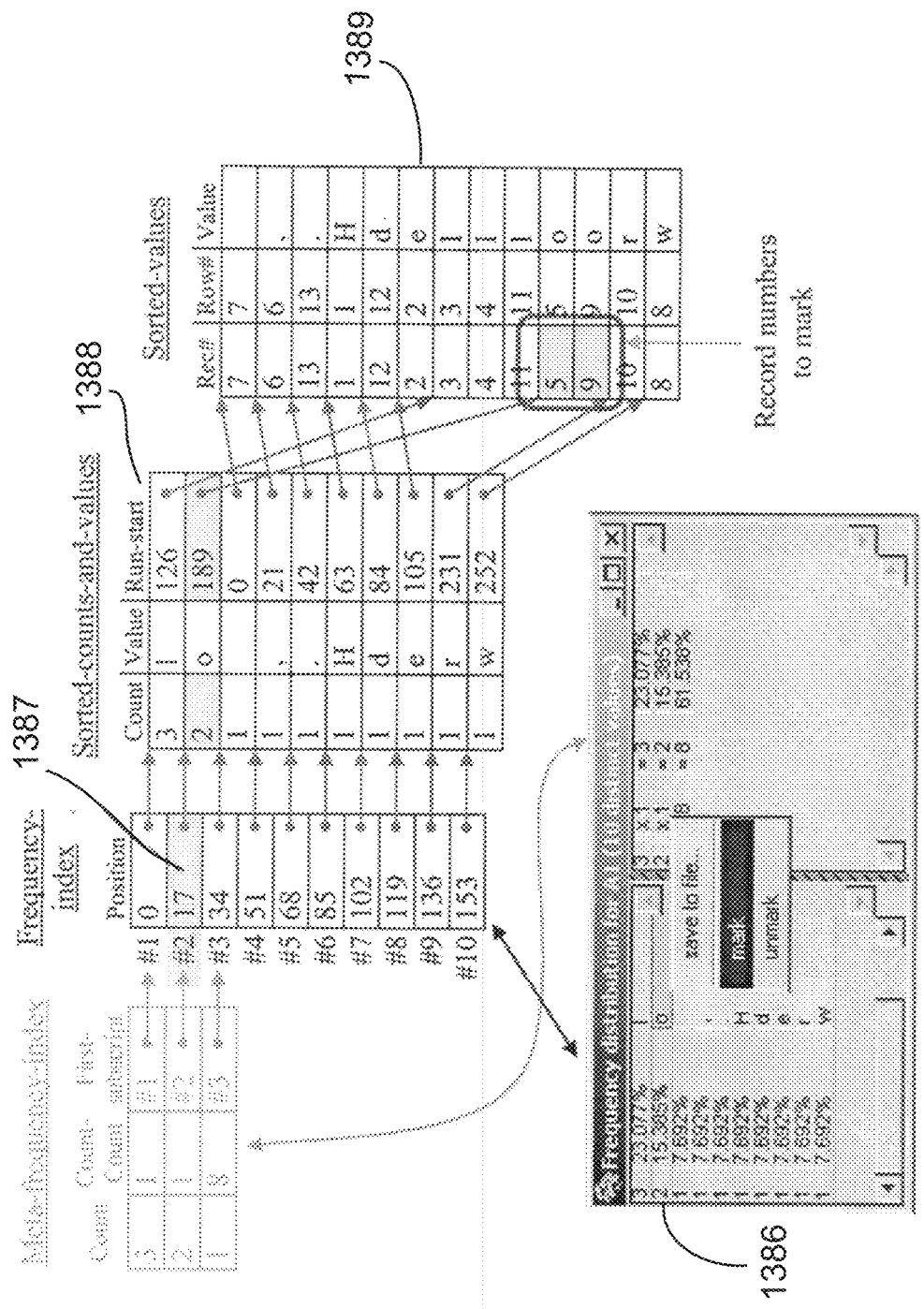

As show in FIG. 35, you can select a line 1386 in the left half of the window and then select mark from the pop-up menu. The selected row on the left half of the window is looked up 1387 in the frequency-index file and then the sorted-counts-and-values file. We then have a tuple of the form <count, value, run-start>. We use run-start 1388 as the file position 1389 within sorted-values, and read count tuples from it. Those tuples contain the record numbers of the records that contained the selected data value, so they can be immediately used as a subscript into the marking bit vector in order to mark those rows. An unmark option does the same thing except that it unmarks the rows instead of marking them.

Figure 36:
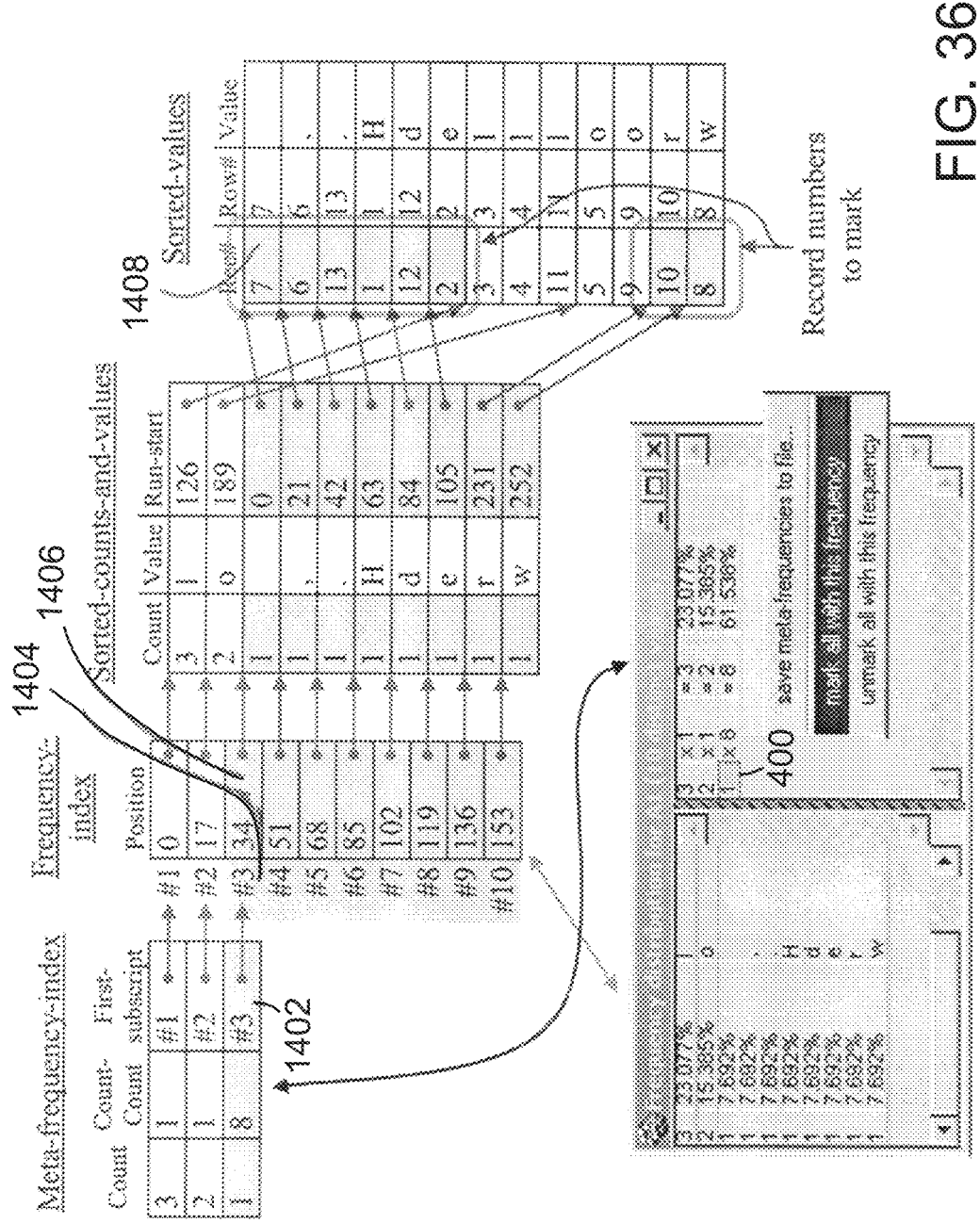

As shown in FIG. 36, if you select a line 1400 in the right half of the window and select mark from its pop-up menu, you will be able to mark every row that contains a value that occurred a given number of times. The meta-frequency-index file is consulted, producing a tuple of the form <count, count-count, subscript-of-first-entry-with-given-count>. The subscript-of-first-entry-with-given-count 1402 is used to get an integer 1404 from the frequency-index file, which gives us a starting point 1406 in the sorted-counts-and-values file. We read count×□countCount tuples from the sorted-counts-and-values file, recording the record number from each in a temporary file. We then sort the temporary file and iterate over it in ascending record-number order, marking the indicated record numbers 1408. We do this to avoid thrashing the marking bit vector with random writes, in case it's a very large file and the bit vector must reside on disk. Again, an unmark option does the same thing, except unmarking rows instead of marking them.

There can be many frequency analysis windows open simultaneously, and each one retains the independent ability to mark or unmark by either frequency (left side) or meta-frequency (right side). As an example, you could perform a frequency analysis on a list of customers by first name and by last name. You could mark all records with first names that occurred once, and then mark all records with last names that occurred once. This in effect would mark all customers with either a globally unique first name or a globally unique last name.

A wide variety of hardware, software, and firmware can be used to implement the system described above, including various kinds of available computers, operating systems, memory, storage, and communication facilities.

Figure 37:
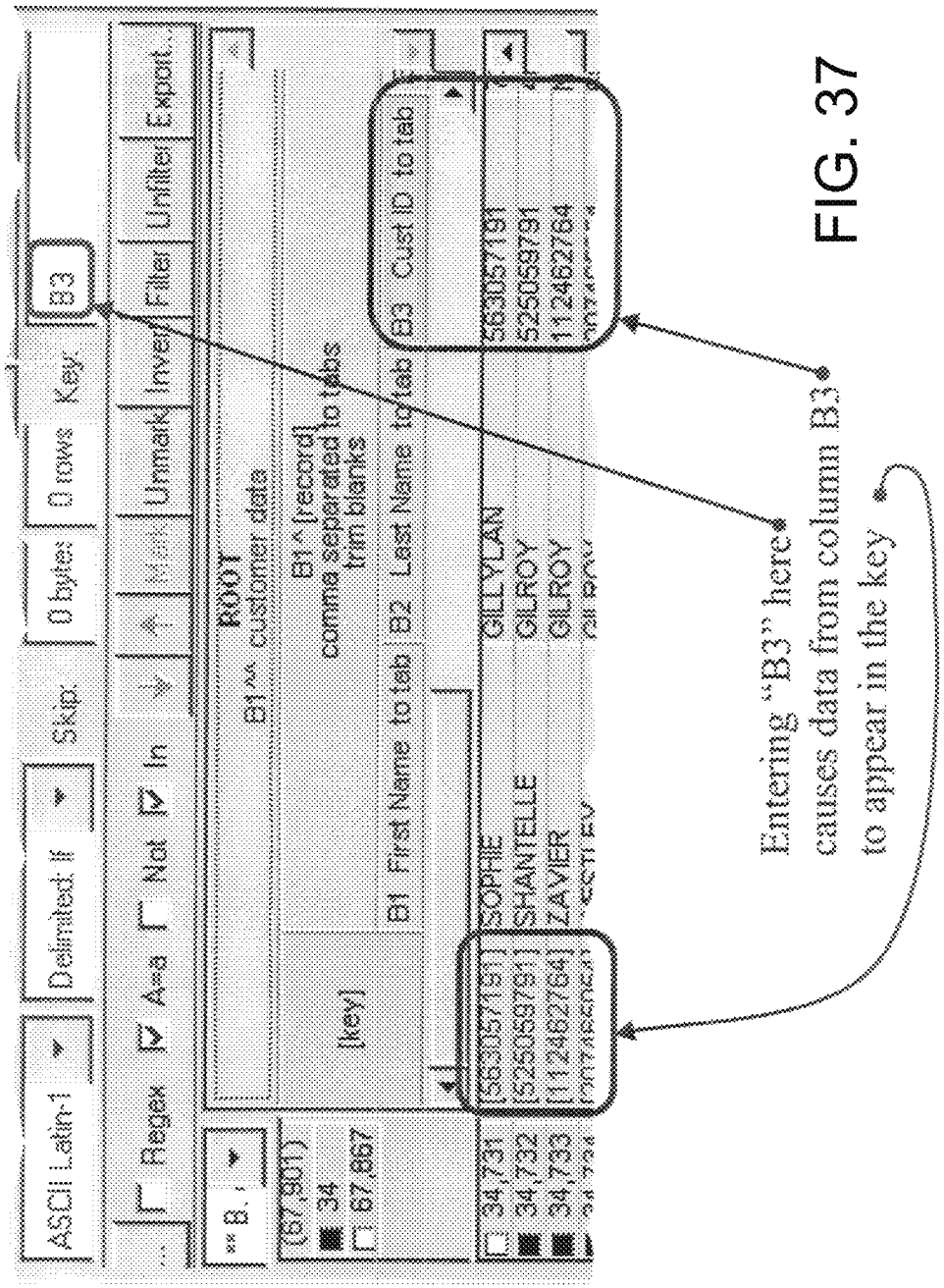

As shown in FIG. 37, a user can analyze multiple files and their relationships. In the same way that a multi-column edit provides a transformed view of multiple fields of a file, one can also work with multiple files, each with its own distinct hierarchy of processing steps.

To establish a meaningful relationship between or among files, we define the notion of a key. Each record of a file has a key value, and the record's file specifies how to construct the key value from the record. In particular, the file format has a list of columns that provide key components that will be combined to form a record's key value.

Figure 38:
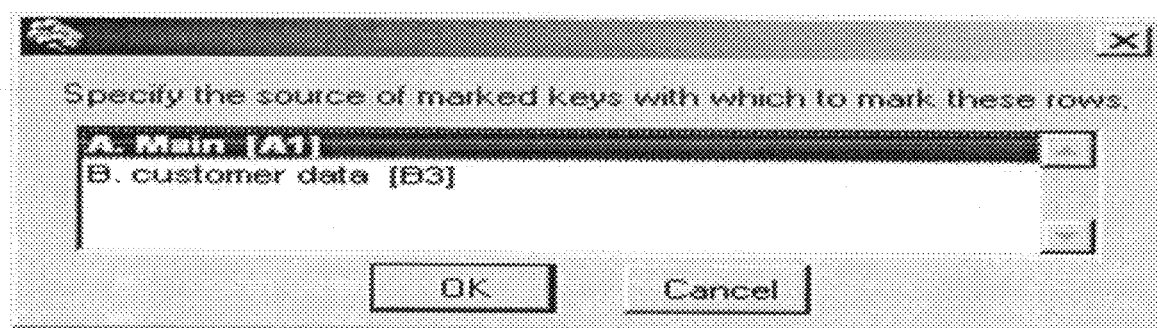

The user can cause to be marked one or more rows in one of the files (called a source file), using any of the mechanisms described previously. As shown in FIG. 38, after switching to a different file (the target file) and selecting the menu option "mark across join", the user is then asked to choose the source file. Each record in the target file that shares a key value in common with a marked source record will then be marked in the target file.

Figure 39:
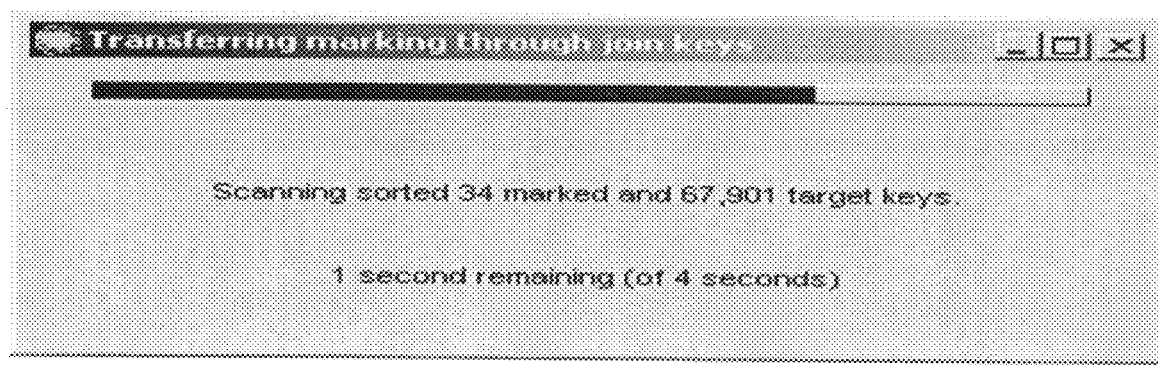

As shown in FIG. 39, the marking in the target file is accomplished efficiently without limiting the maximum scale of file that can be marked. The first step in the marking is to extract marked key values of the source file and sort them to produce a file of marked source keys that can be efficiently read in ascending key order as shown in FIG. 40.

The next step is to extract <key, record#> pairs from the target file for each visible row. For maximum efficiency the visible rows are visited in physical record order, even if the file has been sorted and/or filtered. The <key, record#> pairs are then sorted so that they can be efficiently read in ascending key order as shown in FIG. 41.

The file of marked source keys and the file of target <key, record#> pairs are then scanned together in ascending key order. For each key that occurs in the source keys file, the process scans forward in the target pair file to the first pair whose key is greater than or equal to the source key. The target pairs are scanned until the target key value exceeds the source key value. For each one, the record number is written to a file of target record numbers to mark. Finally, the current source key is skipped and the next source key is processed and so on until the source keys have been exhausted.

The resulting file contains all target record numbers that should be marked. That file is sorted by record number and the rows in the target file are marked. This final sort is only necessary if the total number of rows in the target file is so large that the marking bits are stored on disk instead of in memory (i.e., in some implementations, more than 160 million rows).

Other implementations are within the scope of the following claims.

Although the system has been described by examples that involve viewing and analysis of records of a database on a computer, a wide variety of other implementations are possible. The file to be viewed and analysed may contain simply a series of records that are accumulated into a streaming file, for example, a set of error records in an error log, or a series of data readings from a processing plant. Any file that contains distinguishable records that include a common field can be used. In addition, the platform for viewing and analysis need not be a standalone general purpose computer using programmed software but could be a wide variety of devices including handheld devices, dedicated hardware, hardwired devices, or computers that serve as clients within a networked environment. Any device that is capable of processing such a file and providing a user interface (whether simple or rich) for viewing and analyzing the records of the file could be used.

In addition, the responsibilities of presenting the data to the user and of accessing input and generated files may be delegated to two distinct computers or devices connected by a network. We may call these the user-side device and the data-side device. Because the data presented to the user is a tiny subset of the total bulk of data, the bandwidth requirement for communication in the network is relatively small. The transmitted data is almost entirely textual, allowing a high degree of compression, further reducing the bandwidth requirement. Finally, a typical interaction is for the user to scroll or resize a window, which can cause a single request for a range of data to be transmitted from the user-side device to the data-side device and a single compressed response to be transmitted back. This provides a high degree of compression by compressing as much data as possible in one step, allowing inter-record redundancy to be exploited. It also reduces the number of round-trip network communications (to exactly one), thus reducing the network's contribution to the total latency between the user's action (e.g., clicking on a scroll bar) and the display of the final effect (showing the data that is visible at the new scroll position). Another implementation variant is to have multiple data-side devices, such as a grid of computers, each storing locally a portion of the total data.

The invention claimed is:

1. A computer-implemented method comprising
determining an implicit organization of records and fields of the records within a body of characters, the implicit organization of the records and fields of the records within the body of characters being determined by a combination of automatic computer-based processes applied to the body of characters and interaction with a user,
the interaction with the user comprising
displaying portions of the body of characters to the user in a display that is based on information about represents at least a portion of the implicit organization of the records and fields of the records within the body of characters that has been determined by the automatic computer-based processes, and
receiving from the user an identification of at least one record or at least one field of records as being part of the implicit organization of the records and fields of the records within the body of characters, and
interpreting the body of characters according to the implicit organization of the records and fields of the records within the body of characters for use in processing or analysis.

2. The method of claim 1 which the automatic processes include determining possible boundaries between records based on a character or characters that appear repeatedly in the body of characters.

3. The method of claim 1 which the automatic processes include determining possible boundaries between fields based on features of characters in the body of characters.

4. The method of claim 1 which the display shows successive possible records of the body of characters on successive lines of the display.

5. The method of claim 1 which the display shows possible boundaries between fields of records.

6. The method of claim 1 which the user includes indications of changes in the boundaries of records or the boundaries of at least one of the fields.

7. The method of claim 1 which the interaction comprises enabling the user to navigate through an entire body of characters that includes at least millions of records without requiring persistent storage of any portion of the body of characters in an explicit organization that conforms to the records and fields of the records of the implicit organization.

8. The method of claim 1 which the interpretation of the body of characters for use in processing or analysis is done without requiring persistent storage of any portion of the body of characters in a structure in an explicit organization that conforms to the records and fields of the records and fields of the records of the implicit organization.

9. A computer-implemented method comprising
storing or receiving a body of characters that has meaning, the body of characters being stored or received in a form that does not explicitly express an implicit organization of the body of characters as records and fields of the records,
applying to a portion of less than all of the body of characters the implicit organization of records and fields of records within the body of characters, the implicit organization having been determined from the body of characters,
applying the determined implicit organization to identify records within the portion of the body of characters, and
making the identified records available for display, navigation, analysis, or other processing.

10. The method of claim 9 in which the body of characters is stored in memory.

11. The method of claim 9 which the derived structure is determined by a combination of automatic computer-based processes and interaction with a user of a user interface on which portions of the body of characters are displayed.

12. The method of claim 9 in which the implicit organization is applied to successive portions of the body of characters and the records are made available at successive times as needed for the display, navigation, analysis or other processing.

13. A computer-implemented method comprising
receiving a body of characters that have meaning,
interpreting the body of characters in accordance with a determined implicit organization of records and fields of records within the body of characters, which has been determined by a combination of automatic computer-based processes and human interaction with a computer, and
making the interpreted body of characters available for display, navigation, analysis, or other processing, without persistently storing an explicitly organized version of the received body of characters.

14. The method of claim 13 which the interpreting includes removing ambiguities and determining semantics of the body of characters.

15. A computer-implemented method comprising
for a body of data that does not have an explicit organization of records and for which an implicit organization of records has been determined,
in response to a user taking an action in a user interface that implies a request by the user to view a display of a particular portion of the body of data:
applying a process to the particular portion of the body of data to prepare it for display, and
displaying the particular portion of the body of data as records and fields of records that conform to the implicit organization, without requiring the particular portion of the body of data to have been stored persistently as records that explicitly conform to the implicit organization.

16. The method of claim 15 which the action in the user interface comprises indicating the particular portion that the user is requesting to view.

17. The method of claim 16 which the action in the user interface comprises scrolling in a display of a portion of the body of data.

18. The method of claim 15 which the number of records of the body of data comprises at least millions, and the particular portion of the body of data need not be any more than a portion that can be included in the display in response to the user taking the action.

19. The method of claim 18 which the particular portion can have any arbitrary location in the body of data.

20. The method of claim 15 which the processing comprises processing pieces of records.

21. The method of claim 15 in which the processing comprises separating records into pieces, processing the records or the pieces, or applying transformations, to records that are to be displayed.

22. The method of claim 15 comprising persistently storing an index of locations of the records within the body of data without storing the body of data persistently as records that conform to the structure.

23. The method of claim 15 which the process is applied only to portions of records that are within the window of the display.

24. The method of claim 15 which the data comprises values that can be interpreted as having meaning with respect to fields associated with the records, the method comprising
displaying through the user interface, a portion of the body of data to a user in a displayed arrangement that does not correspond fully to the structure or the fields or both and from which the user can identify at least one aspect based on which the displayed arrangement could be made to correspond more closely to the structure or the fields or both,
enabling a user through the user interface to indicate the identified aspect, and
based on the identified aspect, updating the displayed arrangement to correspond more closely to the structure or the fields or both.

25. A computer-implemented method comprising
receiving a body of data that can be interpreted as having an implicit organization of records and fields of the records within the body of data,
the data comprising values that can be interpreted as having meaning with respect to the fields,
displaying through a user interface, a portion of the body of data to a user in a displayed arrangement that does not correspond fully to the implicit organization of the records or the fields of the records, and from which the user can identify at least one aspect of the body of data based on which the displayed arrangement could be made to correspond more closely to the implicit organization of the records or the fields of the records,
enabling a user through the user interface to indicate the identified aspect, and
based on the identified aspect, updating the displayed arrangement to correspond more closely to the implicit organization of the records or the fields of the records.

26. The method of claim 25 comprising
enabling the user through the user interface to indicate another identified aspect based on which the displayed arrangement could be made to correspond more closely to the implicit organization of the records or the fields of the records, and
based on the other identified aspect, updating the displayed arrangement to correspond more closely to the implicit organization of the records or the fields of the records.

27. The method of claim 25 in which the identified aspect comprises at least one of the length of a field, a delimiter, a field identifier, a key, a field-related repetition, a record related repetition, or a key-related repetition.

28. The method of claim 25 comprising enabling a user to initiate an analysis of at least a portion of the body of data and, based on the initiation, analyzing the portion of the body of data.

29. The method of claim 28 which the analysis comprises at least one of a frequency analysis of values associated with the field, a frequency analysis of frequencies of values, filtering of data, or an analysis of repetitions in the data.

30. The method of claim 25 which the body of data comprises data expressed in an XML or other hierarchical format.

31. The method of claim 30 which the displaying of the portion of the body of data comprises displaying the XML data records of the body of data.

32. The method of claim 30 comprising indicating repetitions in the body of data expressed in the XML format.

33. The method of claim 25 in which the body of data comprises a file having a file format.

34. The method of claim 25 in which the implicit organization of the records or fields of the records or both comprise a key for the body of data.

35. The method of claim 25 comprising enabling the user to mark, unmark, filter, and unfilter, and perform frequency analysis of the data of the body of data.

36. The method of claim 25 comprising enabling the user to indicate transformations to be applied to the body of data.

37. The method of claim 36 which the transformations comprise regular expression matching.

38. The method of claim 25 comprising blending the body of data with another body of data and displaying the body of data and the other body of data to the user in a consistent display arrangement.

39. The method of claim 38 in which the body of data and the other body of data each comprises information from which a key can be derived, with the keys of the bodies of data being different.

40. The method of claim 39 in which the key of one of the bodies of data has a relationship with the key of another one of the bodies of data.

41. The method of claim 39 comprising determining a relationship existing among the keys of the body of data and the other body of data.

42. A computer-implemented method to improve an operation of a computer in processing a file containing a body of characters that have meaning and have an implicit organization records and fields of the records within the body of characters that is at least partially unknown, the computer-implemented method comprising
- automatically processing the body of characters by computer to identify at least one aspect of the implicit organization of records and fields of the records within the body of characters,
- by computer, displaying portions of the body of characters to the user based on the identification of the at least one aspect of the implicit organization,
- receiving from the user by interaction between the user and a computer at least one indication of a field or record that is part of the implicit organization of records and fields within the body or characters,
- by computer determining the implicit organization of records and fields within the body of characters based on the automatic processing of the body of characters and on the at least one indication received from the user, and
- by computer, interpreting the body of characters according to the determined implicit organization for use in processing or analysis.

* * * * *